United States Patent
O'Donnell et al.

(10) Patent No.: US 11,913,362 B2
(45) Date of Patent: Feb. 27, 2024

(54) THERMAL ENERGY STORAGE SYSTEM COUPLED WITH STEAM CRACKING SYSTEM

(71) Applicant: Rondo Energy, Inc., Alameda, CA (US)

(72) Inventors: John Setel O'Donnell, Oakland, CA (US); Yusef Desjardins Ferhani, Menlo Park, CA (US)

(73) Assignee: Rondo Energy, Inc., Alameda, CA (US)

( * ) Notice: Subject to any disclaimer, the term of this patent is extended or adjusted under 35 U.S.C. 154(b) by 0 days.

(21) Appl. No.: 18/204,922

(22) Filed: Jun. 1, 2023

(65) Prior Publication Data

US 2023/0313710 A1    Oct. 5, 2023

Related U.S. Application Data

(60) Continuation-in-part of application No. 18/144,134, filed on May 5, 2023, which is a continuation-in-part
(Continued)

(51) Int. Cl.
*F01K 3/02* (2006.01)
*B63H 11/00* (2006.01)
(Continued)

(52) U.S. Cl.
CPC ................ *F01K 3/02* (2013.01); *B63H 11/00* (2013.01); *F01K 3/08* (2013.01); *F01K 3/186* (2013.01);
(Continued)

(58) Field of Classification Search
CPC ... F01K 3/02; F01K 3/08; F01K 3/186; F01K 13/02; F01K 15/00; F01K 11/02;
(Continued)

(56) References Cited

U.S. PATENT DOCUMENTS 1,700,542 A    1/1929  O'Donnell
2,833,532 A    5/1958  Ries
(Continued)

FOREIGN PATENT DOCUMENTS

AU    2012292959 B2    2/2016
AU    2016204109 B2    5/2018
(Continued)

OTHER PUBLICATIONS

"Ethylene Production via Cracking of Ethane-Propane", Chemical Engineering, Nov. 1, 2015, Total p. 4.
(Continued)

*Primary Examiner* — Shafiq Mian
(74) *Attorney, Agent, or Firm* — Procopio, Cory, Hargreaves & Savitch LLP; Matt Rainey

(57) ABSTRACT

An energy storage system (TES) converts variable renewable electricity (VRE) to continuous heat at over 1000° C. Intermittent electrical energy heats a solid medium. Heat from the solid medium is delivered continuously on demand. Heat delivery via flowing gas establishes a thermocline which maintains high outlet temperature throughout discharge. The delivered heat which may be used for processes including power generation and cogeneration. In one application, the energy storage system provides higher-temperature heat to a steam cracking furnace system for converting a hydrocarbon feedstock into cracked gas, thereby increasing the efficiency of the temperature control.

36 Claims, 21 Drawing Sheets

Related U.S. Application Data of application No. 18/142,564, filed on May 2, 2023, and a continuation-in-part of application No. 18/171,602, filed on Feb. 20, 2023, said application No. 18/142,564 is a continuation-in-part of application No. 17/668,333, filed on Feb. 9, 2022, now Pat. No. 11,702,963, said application No. 18/171,602 is a division of application No. 17/650,522, filed on Feb. 9, 2022, now Pat. No. 11,585,243, said application No. 18/144,134 is a continuation of application No. PCT/US2021/061041, filed on Nov. 29, 2021, said application No. 17/668,333 is a continuation of application No. 17/537,407, filed on Nov. 29, 2021, now Pat. No. 11,603,776, and a continuation of application No. PCT/US2021/061041, filed on Nov. 29, 2021, said application No. 18/144,134 is a continuation-in-part of application No. PCT/US2021/061041, filed on Nov. 29, 2021, said application No. 17/650,522 is a continuation of application No. 17/537,407, filed on Nov. 29, 2021, now Pat. No. 11,603,776, said application No. 18/142,564 is a continuation-in-part of application No. PCT/US2021/061041, filed on Nov. 29, 2021, said application No. 18/144,134 is a continuation of application No. 17/537,407, filed on Nov. 29, 2021, now Pat. No. 11,603,776.

(60) Provisional application No. 63/459,540, filed on Apr. 14, 2023, provisional application No. 63/434,919, filed on Dec. 22, 2022, provisional application No. 63/427,374, filed on Nov. 22, 2022, provisional application No. 63/378,355, filed on Oct. 4, 2022, provisional application No. 63/347,987, filed on Jun. 1, 2022, provisional application No. 63/338,805, filed on May 5, 2022, provisional application No. 63/337,562, filed on May 2, 2022, provisional application No. 63/231,155, filed on Aug. 9, 2021, provisional application No. 63/170,370, filed on Apr. 2, 2021, provisional application No. 63/165,632, filed on Mar. 24, 2021, provisional application No. 63/155,261, filed on Mar. 1, 2021, provisional application No. 63/119,443, filed on Nov. 30, 2020.

(51) Int. Cl.

| | |
|---|---|
| *F01K 3/08* | (2006.01) |
| *F01K 3/18* | (2006.01) |
| *F01K 13/02* | (2006.01) |
| *F01K 15/00* | (2006.01) |
| *F03G 6/00* | (2006.01) |
| *F22B 29/06* | (2006.01) |
| *F22B 35/10* | (2006.01) |
| *F28D 20/00* | (2006.01) |
| *H01M 8/04007* | (2016.01) |
| *H01M 8/04014* | (2016.01) |
| *H01M 8/04029* | (2016.01) |
| *H02J 1/10* | (2006.01) |
| *H02J 3/00* | (2006.01) |
| *H02J 3/04* | (2006.01) |
| *H02M 1/00* | (2006.01) |
| *B63H 11/12* | (2006.01) |
| *B63H 11/14* | (2006.01) |
| *B63H 11/16* | (2006.01) |
| *F01K 11/02* | (2006.01) |
| *F01K 19/04* | (2006.01) |
| *F03D 9/18* | (2016.01) |

(52) U.S. Cl.
CPC .............. *F01K 13/02* (2013.01); *F01K 15/00* (2013.01); *F03G 6/071* (2021.08); *F22B 29/06* (2013.01); *F22B 35/10* (2013.01); *F28D 20/00* (2013.01); *H01M 8/04014* (2013.01); *H01M 8/04029* (2013.01); *H01M 8/04037* (2013.01); *H01M 8/04052* (2013.01); *H01M 8/04074* (2013.01); *H02J 1/102* (2013.01); *H02J 3/00* (2013.01); *H02J 3/04* (2013.01); *H02M 1/0003* (2021.05); *H02M 1/007* (2021.05); *B63H 11/12* (2013.01); *B63H 11/14* (2013.01); *B63H 11/16* (2013.01); *F01K 11/02* (2013.01); *F01K 19/04* (2013.01); *F03D 9/18* (2016.05); *F28D 2020/0004* (2013.01); *Y02E 60/14* (2013.01)

(58) Field of Classification Search
CPC .......... F01K 19/04; F22B 29/06; F22B 35/10; H01M 8/04014; H01M 8/04029; H01M 8/04052; H01M 8/04074; H02J 1/102; H02J 3/00; H02J 3/04; H02M 1/007; H02M 1/0003; F28D 20/00; F28D 2020/0004; F03D 9/18; B63H 11/12; B63H 11/14; B63H 11/16; B63H 11/00
See application file for complete search history.

(56) References Cited

U.S. PATENT DOCUMENTS

| | | |
|---|---|---|
| 3,381,113 A | 4/1968 | Jacques et al. |
| 3,788,066 A | 1/1974 | Nebgen |
| 4,110,987 A | 9/1978 | Cahn et al. |
| 4,124,061 A | 11/1978 | Mitchell et al. |
| 4,127,161 A | 11/1978 | Clyne et al. |
| 4,146,057 A | 3/1979 | Friedman et al. |
| 4,172,442 A | 10/1979 | Boblitz |
| 4,222,365 A | 9/1980 | Thomson |
| 4,234,782 A | 11/1980 | Barabas et al. |
| 4,438,630 A | 3/1984 | Rowe |
| 5,154,224 A | 10/1992 | Yasui et al. |
| 5,286,472 A | 2/1994 | Fulford |
| 5,384,489 A | 1/1995 | Bellac |
| 5,416,416 A | 5/1995 | Bisher |
| 5,553,604 A | 9/1996 | Frei |
| 7,213,409 B1 | 5/2007 | Nuckols |
| 7,693,402 B2 | 4/2010 | Hudson et al. |
| 8,544,275 B2 | 10/2013 | Shinnar |
| 8,701,773 B2 | 4/2014 | O'Donnell et al. |
| 8,960,182 B2 | 2/2015 | Magaldi et al. |
| 9,370,044 B2 | 6/2016 | McDonald |
| 9,512,826 B2 | 12/2016 | Rodionov et al. |
| 9,816,490 B2 | 11/2017 | Conlon |
| 9,948,140 B2 | 4/2018 | Pietsch et al. |
| 9,989,271 B1 | 6/2018 | Becker |
| 10,113,535 B2 | 10/2018 | Conlon |
| 10,345,050 B2 | 7/2019 | Pietsch et al. |
| 10,775,111 B2 | 9/2020 | Kerth |
| 10,876,521 B2 | 12/2020 | Anderson et al. |
| 11,352,951 B2 | 6/2022 | Apte et al. |
| 11,459,944 B2 | 10/2022 | Robinson |
| 2004/0062063 A1 | 4/2004 | Siri |
| 2004/0099261 A1 | 5/2004 | Litwin |
| 2004/0148922 A1 | 8/2004 | Pinkerton |
| 2004/0182081 A1 | 9/2004 | Sim et al. |
| 2006/0174622 A1 | 8/2006 | Skowronski |
| 2006/0179840 A1 | 8/2006 | Murphy et al. |
| 2006/0211777 A1 | 9/2006 | Severinsky |
| 2006/0266039 A1 | 11/2006 | Skowronski et al. |
| 2008/0000231 A1 | 1/2008 | Litwin et al. |
| 2008/0127647 A1 | 6/2008 | Leitner |
| 2009/0038668 A1 | 2/2009 | Plaisted |
| 2009/0090109 A1 | 4/2009 | Mills et al. |
| 2009/0117633 A1 | 5/2009 | Bradley et al. |
| 2009/0208402 A1 | 8/2009 | Rossi |

(56) References Cited

U.S. PATENT DOCUMENTS

| | | |
|---|---|---|
| 2009/0320828 A1 | 12/2009 | Koketsu et al. |
| 2010/0132391 A1 | 6/2010 | Barot |
| 2010/0178156 A1 | 7/2010 | Rivas Cortes et al. |
| 2010/0229523 A1 | 9/2010 | Holt et al. |
| 2010/0251711 A1 | 10/2010 | Howes et al. |
| 2010/0295306 A1 | 11/2010 | Ridnik et al. |
| 2011/0226440 A1 | 9/2011 | Bissell et al. |
| 2011/0286902 A1 | 11/2011 | Fan et al. |
| 2011/0289924 A1 | 12/2011 | Pietsch |
| 2012/0102950 A1 | 5/2012 | Turchi |
| 2012/0131898 A1 | 5/2012 | Mokheimer et al. |
| 2012/0167559 A1 | 7/2012 | Havel |
| 2012/0255309 A1 | 10/2012 | Venetos et al. |
| 2013/0047976 A1 | 2/2013 | Kaftori |
| 2013/0081394 A1 | 4/2013 | Perry |
| 2013/0118169 A1 | 5/2013 | Milam et al. |
| 2013/0175006 A1 | 7/2013 | Robinson et al. |
| 2014/0053554 A1 | 2/2014 | Tartibi et al. |
| 2014/0074314 A1 | 3/2014 | Niknafs et al. |
| 2014/0102073 A1 | 4/2014 | Pang et al. |
| 2014/0190469 A1 | 7/2014 | O'Donnell |
| 2014/0216717 A1 | 8/2014 | O'Donnell et al. |
| 2014/0223906 A1 | 8/2014 | Gee et al. |
| 2014/0224469 A1 | 8/2014 | Mirmobin et al. |
| 2014/0366536 A1 | 12/2014 | Muren |
| 2015/0033740 A1 | 2/2015 | Anderson et al. |
| 2015/0053266 A1 | 2/2015 | Chen et al. |
| 2015/0143806 A1 | 5/2015 | Friesth |
| 2015/0224850 A1 | 8/2015 | Bank et al. |
| 2015/0276234 A1 | 10/2015 | Muro et al. |
| 2015/0354545 A1 | 12/2015 | Conlon |
| 2016/0130709 A1 | 5/2016 | Hong et al. |
| 2016/0146110 A1 | 5/2016 | Hackstein et al. |
| 2016/0164451 A1 | 6/2016 | Lenert et al. |
| 2016/0208657 A1 | 7/2016 | Brückner et al. |
| 2016/0214910 A1 | 7/2016 | King |
| 2017/0051949 A1 | 2/2017 | Uselton |
| 2017/0093163 A1 | 3/2017 | Johnson et al. |
| 2017/0204741 A1 | 7/2017 | Hogen et al. |
| 2017/0241669 A1 | 8/2017 | Von Behrens |
| 2017/0283713 A1* | 10/2017 | Stephens ............... F23C 5/00 |
| 2017/0362090 A1 | 12/2017 | Melsert et al. |
| 2018/0003445 A1 | 1/2018 | Bergan et al. |
| 2018/0028967 A1 | 2/2018 | Balfe et al. |
| 2018/0038352 A1 | 2/2018 | Conlon |
| 2018/0073777 A1 | 3/2018 | O'Donnell et al. |
| 2018/0083449 A1 | 3/2018 | Green |
| 2018/0163574 A1 | 6/2018 | Bailey et al. |
| 2018/0179955 A1 | 6/2018 | Apte et al. |
| 2018/0207557 A1 | 7/2018 | Nellis |
| 2018/0216010 A1 | 8/2018 | Hong |
| 2018/0231316 A1 | 8/2018 | Watremetz et al. |
| 2018/0245485 A1 | 8/2018 | Conlon |
| 2018/0292097 A1 | 10/2018 | Specter |
| 2018/0347406 A1* | 12/2018 | Friesth ............... F24S 25/50 |
| 2018/0372420 A1 | 12/2018 | Ahadi et al. |
| 2019/0003308 A1 | 1/2019 | Laughlin |
| 2019/0043624 A1 | 2/2019 | Fork et al. |
| 2019/0045617 A1 | 2/2019 | Fork et al. |
| 2019/0162482 A1 | 5/2019 | Kerth |
| 2019/0226462 A1 | 7/2019 | Conlon |
| 2019/0331098 A1 | 10/2019 | von Behrens et al. |
| 2019/0359894 A1 | 11/2019 | Heidel et al. |
| 2020/0172815 A1* | 6/2020 | Stephens ............... F23D 14/70 |
| 2020/0232345 A1 | 7/2020 | Zwinkels |
| 2020/0332201 A1* | 10/2020 | Koseoglu ............... C07C 2/06 |
| 2020/0346165 A1 | 11/2020 | Lu et al. |
| 2020/0386447 A1 | 12/2020 | Wang |
| 2021/0094834 A1 | 4/2021 | Chen et al. |
| 2021/0143446 A1 | 5/2021 | Ponec et al. |
| 2021/0172685 A1 | 6/2021 | Bergan et al. |
| 2021/0190044 A1 | 6/2021 | Anderson et al. |
| 2021/0207527 A1 | 7/2021 | Robinson |
| 2021/0328544 A1 | 10/2021 | Johnson et al. |
| 2022/0049615 A1 | 2/2022 | Truong |
| 2022/0060142 A1 | 2/2022 | Akhavan-Tafti |
| 2022/0085603 A1 | 3/2022 | McNamara et al. |
| 2022/0090827 A1 | 3/2022 | Magaldi et al. |
| 2022/0132633 A1 | 4/2022 | Forsberg et al. |
| 2022/0146205 A1 | 5/2022 | Eronen et al. |
| 2022/0228271 A1 | 7/2022 | Ashok et al. |
| 2022/0228772 A1 | 7/2022 | Murata et al. |

FOREIGN PATENT DOCUMENTS

| | | |
|---|---|---|
| CN | 1559893 A | 1/2005 |
| CN | 101592439 B | 4/2011 |
| CN | 105605957 A | 5/2016 |
| CN | 105948037 A | 9/2016 |
| CN | 107246732 A | 10/2017 |
| CN | 107872196 A | 4/2018 |
| CN | 108204760 A | 6/2018 |
| CN | 108362151 A | 8/2018 |
| CN | 108612634 A | 10/2018 |
| CN | 111256364 A | 6/2020 |
| CN | 210802160 U | 6/2020 |
| CN | 111655989 A | 9/2020 |
| CN | 212157096 U | 12/2020 |
| DE | 19808810 C1 | 6/1999 |
| DE | 102009020531 B3 | 4/2011 |
| DE | 102017212684 A1 | 1/2019 |
| EP | 794161 B1 | 7/1996 |
| EP | 1930587 A2 | 6/2008 |
| EP | 2372116 A1 | 10/2011 |
| EP | 2722496 A2 | 4/2014 |
| EP | 3081770 A1 | 10/2016 |
| EP | 3324018 A1 | 5/2018 |
| EP | 3486594 A1 | 5/2019 |
| EP | 2837086 B1 | 11/2019 |
| EP | 3245388 B1 | 11/2019 |
| EP | 3725917 A1 | 10/2020 |
| EP | 2909547 B1 | 9/2021 |
| EP | 3642296 A1 | 1/2022 |
| GB | 2109026 A | 5/1983 |
| GB | 2477801 A | 8/2011 |
| IL | 284451 | 8/2021 |
| JP | 2006145200 A | 6/2006 |
| KR | 2001-0100320 A | 11/2001 |
| KR | 102308531 B1 | 10/2021 |
| MA | 40029 A | 12/2015 |
| TW | 202100240 A | 1/2021 |
| WO | WO 1980/000170 | 2/1980 |
| WO | WO 2007/108014 A1 | 9/2007 |
| WO | WO 2008/052249 A1 | 5/2008 |
| WO | WO 2008/108870 A1 | 9/2008 |
| WO | WO 2009/152562 A1 | 12/2009 |
| WO | WO 2011/077248 A2 | 6/2011 |
| WO | WO 2011/109514 A1 | 9/2011 |
| WO | WO 2012/123853 A1 | 9/2012 |
| WO | WO 2012/127178 A1 | 9/2012 |
| WO | WO 2012/150969 A1 | 11/2012 |
| WO | WO 2013/020176 A1 | 2/2013 |
| WO | WO 2014/063191 A1 | 5/2014 |
| WO | WO 2014/151843 A2 | 9/2014 |
| WO | WO 2015/149124 A1 | 10/2015 |
| WO | WO 2015/187423 A2 | 12/2015 |
| WO | WO 2016/065191 A1 | 4/2016 |
| WO | WO 2016/150455 A1 | 9/2016 |
| WO | WO 2017/049320 A1 | 3/2017 |
| WO | WO 2017/147022 A1 | 8/2017 |
| WO | WO 2018/011363 A1 | 1/2018 |
| WO | WO 2018/101989 A1 | 6/2018 |
| WO | WO 2019/020562 A1 | 1/2019 |
| WO | WO 2019/149623 A1 | 8/2019 |
| WO | WO 2019/224538 A1 | 11/2019 |
| WO | WO 2020/068758 A1 | 4/2020 |
| WO | WO 2020/254001 A1 | 12/2020 |
| WO | WO 2022/086630 A1 | 4/2022 |

(56) References Cited

FOREIGN PATENT DOCUMENTS

WO 2022/187903 A1 9/2022
ZA 201603514 B 11/2018

OTHER PUBLICATIONS

"Matching Time Of Use Periods With Grid Conditions Maximizes Use Of Renewable Resources", California ISO, Outcropping Way, Folsom, 2015, Total p. 2.
"Miscibility Gap Alloys", University of Newcastle, accessed at https://miscibilitygapalloy.blogspot.com/p/how-did-it-stater-ted.html on Apr. 2, 2022.
Aaron Rimpel et al., "Liquid Air Combined Cycle (LACC) for Power and Storage", Thermal-Mechanical-Chemical Energy Storage (TMCES) Workshop, Aug. 10-11, 2021, Total p. 6.
Alexis Mckittrick, "Low Temperature & Coproduced Resources Reservoir Thermal Energy Storage (RTES) Portfolio", Geothermal Technologies Office, U.S. Department of Energy, Total p. 4.
Anthony Rawson et al., "Effective conductivity of Cu—Fe and Sn—Al miscibility gap alloys", International Journal of Heat and Mass Transfer, vol. 77, Oct. 2014, pp. 395-405, Total p. 11.
Antoni Gil et al., "State of the art on high temperature thermal energy storage for power generation. Part 1—Concepts, materials and modellization", Renewable and Sustainable Energy Reviews, vol. 14, Issue 1, Jan. 2010, pp. 31-55, Total p. 25.
Audrey Barucchi, "Calix files a new patent for zero emissions iron and steel", https://www.calix.global/co2-mitigation-focus-area/new-patent-for-zero-emissions-iron-and-steel/, Nov. 23, 2021, Total p. 5.
Bao Truong, "Malta Pumped Heat Energy Storage System Green Heat & Power Application", Energy Storage for Manufacturing and Industrial Decarbonization Workshop, Feb. 9, 2022, Total p. 5.
Ben Bollinger, "Malta Pumped Heat Energy Storage", Malta, Aug. 10, 2021, Total p. 9.
Cédric Philibert, "Renewable Energy for Industry", Renewable Energy Division, International Energy Agency, Nordic Pavillion, COP23, Fidji-Bonn, Nov. 15, 2017, Total p. 7.
Charles Forsberg et al., "Coupling heat storage to nuclear reactors for variable electricity output with baseload reactor operation", The Electricity Journal, vol. 31, Issue 3, Apr. 2018, pp. 23-31, Total p. 9.
Charles Forsberg et al., "Variable Electricity from Base-load Nuclear Power Plants Using Stored Heat", International Congress on Advances in Nuclear Power Plants (ICAPP 2015), May 2015, Total p. 12.
Charles Forsberg, "Heat Storage and the Electricity Grid Integrating Nuclear and Renewables into a Low-Carbon Economic Grid", Massachusetts Institute of Technology, Jan. 2017, Massachusetts, Cambridge, Total p. 114.
Charles Forsberg, "Hybrid systems to address seasonal mismatches between electricity production and demand in nuclear renewable electrical grids", Energy Policy, vol. 62, Nov. 2013, pp. 333-341, Total p. 9.
Charles W Forsberg et al., "Converting excess low-price electricity into high-temperature stored heat for industry and high-value electricity production", The Electricity Journal, vol. 30, Issue 6, Jul. 2017, pp. 42-52, Total p. 11.
Christopher Fraughton, "Electro-Thermal Energy Storage General Presentation", Man Energy Solutions, Aug. 2021, Total p. 23.
CK-12 Foundation, "Saturated Hydrocarbon", Apr. 2, 2022, Total p. 8.
Clifford K. Ho, "High-Temperature Thermal Storage in Moving and Fixed Particle Beds", Thermal-Mechanical-Chemical Energy Storage (TMCES) Workshop, San Antonio, TX, Total p. 13.
Cowper Stove An overview ScienceDirect Topics, Sep. 13, 2021, Total p. 25.
D. Fernandes et al., Thermal energy storage: "How previous findings determine current research priorities", Energy, vol. 39, Issue 1, Mar. 2012, pp. 246-257, Total p. 12.
Daniel C Stack et al., "Performance of firebrick resistance-heated energy storage for industrial heat applications and round-trip electricity storage", Applied Energy, vol. 242, May 15, 2019, pp. 782-796, Total p. 15.
Daniel Christopher Stack, "Conceptual Design and Performance Characteristics of Firebrick Resistance-Heated Energy Storage for Industrial Heat Supply and Variable Electricity Production", Thesis, Master of Science in Nuclear Science and Engineering, Massachusetts Institute of Technology, Feb. 2017, Total p. 166.
Daniel Christopher Stack, "Development of high-temperature firebrick resistance-heated energy storage (Fires) using doped ceramic heating system", Thesis, Doctor of Philosophy in Nuclear Science and Engineering, Massachusetts Institute of Technology, Feb. 2021, Total p. 121.
Daniel Stack et al., "Joule Hive-Replacing fire with renewable heat", Total p. 15.
David Bierman, "Clean, affordable, and reliable heat & electricity", Antora Energy, Total p. 9.
David L. Chandler "MIT News: Turning desalination waste into a useful resource" MIT News Office, Feb. 13, 2019 (Cited in NFOA dated Sep. 14, 2022 in related U.S. Appl. No. 17/650,522.).
David Roberts, "Solar power's greatest challenge was discovered 10 years ago. It looks like a duck", www.vox.com, Aug. 29, 2018, Total p. 19.
Dr. Avi Shultz, "Concentrating Solar-thermal Power and Thermal Energy Storage", U.S. Department of Energy, Total p. 7.
Dr. Avi Shultz, "Industrial Decarbonization:Renewable Process Heating from Concentrating Solar Thermal", U.S. Department of Energy, Total p. 6.
Dr. Eric L. Miller, "The Hydrogen Energy Earthshot and H2@Scale: Importance to Industrial Decarbonization", Energy StorM Panel, Feb. 8, 2022, Total p. 9.
Dr. Gianluca Ambrosetti et al., "Cement Production", Energy Storage for Manufacturing and Industrial Decarbonization Workshop "Energy StorM", Feb. 8, 2022, Total p. 10.
Echogen, "CO2-Based Pumped-Thermal Energy Storage Technical Overview & Status", Echogen Power System, Total p. 20.
Elizabeth Endler, "Energy Storage for Manufacturing Petrochemical Industry Perspective", Feb. 2022, "Energy StorM" Workshop, US Department of Energy, Total p. 14.
Elliott Group, "Materials for Hydrogen Compression", Thermo-Mechanical-Chemical Energy Storage Workshop, Elliott, Aug. 10-11, 2021, Total p. 25.
Emiliano Bellini, "Long-duration thermal storage system based on silica sand", pv magazine International, Nov. 5, 2021, Total p. 6.
Emiliano Bellini, "Storing wind, solar power with silica sands", pv magazine International, Sep. 2021, Total p. 10.
Gregory C Staple, "California's Grid Geeks: Flattening the 'duck curve'", Jan. 25, 2017, www.greenbiz.com, Total Page Count 9.
Grid Energy Storage, U.S. Department of Energy, Dec. 2013, Total p. 67.
Haisheng Chen et al., "Progress in electrical energy storage system: A critical review", Progress in Natural Science, vol. 19, Issue 3, Mar. 10, 2009, pp. 291-312, Total p. 22.
Heber Sugo, "Miscibility gap alloys with inverse microstructures and high thermal conductivity for high energy density thermal storage applications", Applied Thermal Engineering, vol. 51, Issues 1-2, Mar. 2013, pp. 1345-1350, Total p. 6.
Hélder Da Silva, "Energy Storage for Manufacturing and Industrial Decarbonization Workshop "Energy StorM"", Feb. 8, 2022, Total p. 11.
Hitesh Bindra et al., "Sliding flow method for exergetically efficient packed bed thermal storage", Applied Thermal Engineering, vol. 64, Issues 1-2, Mar. 2014, pp. 201-208, Total p. 8.
Hitesh Bindra et al., "Thermal analysis and exergy evaluation of packed bed thermal storage systems", Applied Thermal Engineering, vol. 52, Issue 2, Apr. 15, 2013, pp. 255-263, Total p. 9.
Ilievski D, "New Two-Stage Calcination Technology", Proceedings of the 9th International Alumina Quality Workshop, Alcoa World Alumina, Technology Delivery Group, Western Australia, 2012, Total p. 7.
Industrial Decarbonization using Electric Thermal Energy Storage (ETES), Jan. 25, 2022, Total p. 11.

(56) References Cited

OTHER PUBLICATIONS

International Search Report dated Sep. 14, 2022 for International Application No. PCT/US2021/061041, 41 pages.
Jaume Gasia et al., "Review on system and materials requirements for high temperature thermal energy storage. Part 1: General requirements", Renewable and Sustainable Energy Reviews, vol. 75, Aug. 2017, pp. 1320-1338, Total p. 19.
Jay Fitzgerald, "Bioenergy and Chemical Energy Storage", Energy Storage for Manufacturing & Industrial Decarbonization Workshop, Feb. 8-9, 2022, Total p. 6.
Jeff Moore, "Development of sCO2 Turbomachinery and its Application to Energy Storage", Thermal Mechanical-Chemical-Energy-Storage Workshop, Aug. 10-11, 2021, San Antonio, TX, Total p. 41.
Jeff Moore, "Oxygen Storage Incorporated into the Allam OxyFuel Power Cycle", Southwest Research Institute, Total p. 8.
Joe Cresko, "Energy Storage for Manufacturing", Energy Storage for Manufacturing & Industrial Decarbonization Workshop, Feb. 8-9, 2022, Total p. 11.
Joe Paladino, "Transformation of the Electric Grid", Energy StorM Workshop, Feb. 4, 2022, Total p. 5.
Joe Stekli, "LCRI Update TMCES 2021", Low-Carbon Resources Initiative, Electric Power Research Institute, Aug. 2021, Total p. 31.
Joshua Schmitt, "Development of An Advanced Hydrogen Energy Storage System Using Aerogel In A Cryogenic Flux Capacitor (Cfc)", Southwest Research Institute, Total p. 8.
Lion Hirth, "The market value of variable renewables: The effect of solar wind power variability on their relative price", Energy Economics, vol. 38, Jul. 2013, pp. 218-236, Total p. 19.
Lion Hirth, "The Optimal Share of Variable Renewables: How the Variability of Wind and Solar Power affects their Welfare-optimal Deployment", The Energy Journal, vol. 36, No. 1, p. 149-184, Total p. 36.
Lori Schaefer-Weaton, "Solar & Battery Energy Solution Agri-Industrial Plastics Co.", Agri-Industrial Plastics Company, Total p. 12.
Luisa F Cabeza, "Advances in Thermal Energy Storage Systems Methods and Applications", Woodhead Publishing Series in Energy, No. 66, 2015, Total p. 592.
M Gajendiran et al., "Application of Solar Thermal Energy Storage for Industrial Process Heating", Advanced Materials Research, vols. 984-985, Jul. 2019, Total p. 7.
Marc Medrano et al., "State of the art on high-temperature thermal energy storage for power generation. Part 2-Case studies", Renewable and Sustainable Energy Reviews, vol. 14, Issue 1, Jan. 2010, pp. 56-72, Total 17.
Mathieu Hubert, "Lecture 3: Basics of industrial glass melting furnaces", IMI-NFG Course in Processing of Glass, Spring 2015, Total p. 75.
Michael Pesin, "The Office of Electricity Grid Modernization R&D Portfolio", Aug. 2, 2021, Total p. 18.
Mike Gravely, "The Role of Energy Storage in Helping California Meet the State's Future Zero Carbon Energy Goals", Energy Research and Development Division, California, Total p. 23.
Natalie Smith et al., "Integration of Pumped Heat Energy Storage with a Fossil-Fired Power Plant", U.S. Department of Energy, Total p. 6.
PCT; Invitation to Pay Additional Fees issued in International Patent Application No. PCT/US2021/061041; dated Mar. 24, 2022; 21 Pages.
Pintail Power LLC, "Liquid Air Combined Cycle Hybrid Energy Storage", Pintail Power LLC, TMCES Workshop, Aug. 10-11, 2021, San Antonio, TX, Total p. 12.
Office Action in U.S. Appl. No. 17/650,519 dated Apr. 20, 2022, 10 pages.
R. B. Laughlin, "Variable Blading in Closed-Cycle Brayton Energy Storage", TMCES, Aug. 10, 2021, San Antonio, Total p. 26.
Rainer Kurz, "Hydrogen Pipelines & Storage", Mar. 8, 2021, Total p. 16.
Revterra, "Revterra Company Overview", TMCES 2021, Total p. 14.
Reyad Sawafta, "Thermal Energy Storage—Cold Storage", Energy Storage for Manufacturing and Industrial Decarbonization Workshop, Feb. 9, 2022, Total p. 11.
Richard Brody, "Powering the Carbon-Free Electric Future, Modular Geomechanical Pumped Storage (GPS)", Quidnet Energy, 3rd TMCES-Storage Deployment Panel, Aug. 11, 2021, Total p. 7.
Richard T. Ibekwe, "Induction Heating of Firebricks for the Large-Scale Storage of Nuclear and Renewable Energy", Massachusetts Institute of Technology, Jun. 2018, Total p. 40.
Robert J. Krane, "A second law analysis of a thermal energy storage system with Joulean heating of the storage element", American Society of Mechanical Engineers, Winter Annual Meeting, Miami Beach, Florida, USA, Nov. 17-21, 1985, Total p. 10.
Russ Weed, "Market Needs & Technology Overview", Thermal-Mechanical-Chemical Energy Storage Workshop-Storage Deployment, Aug. 11, 2021, Total p. 20.
S. W. Sucech et al., "Alcoa Pressure Calcination Process for Alumina", Light Metals 1986, R.E. Miller, 669-674, Total p. 6.
Sanjoy Banerjee, "Energy Storage to Decarbonize the Industrial Sector Through Direct Electrification", Energy Storage for Manufacturing and Industrial Decarbonization Workshop, Feb. 8, 2022, Total p. 9.
Scott Hume, "Mid-Duration Energy Storage (MDES) Benefits and Challenges", 3rd TMCES Workshop, 10 Aug. 10, 2021, Total p. 11.
Sempra Energy Utility, "SoCalGas", Total p. 6.
Shaun Sullivan, "Reversible Counter-Rotating Turbomachine to Enable Brayton-Laughlin Cycle", 3rd Thermal-Mechanical-Chemical Energy Storage Workshop, Aug. 10, 2021, San Antonio TX, Total p. 7.
Siemens AG, "Compressed Air Energy Storage (CAES)", 3rd Thermal-Mechanical-Chemical Energy Storage Workshop, Siemens Energy, Aug. 2021, Total p. 17.
Siemens Gamesa, "Electric Thermal Energy Storage (ETES)—Industrial Decarbonization", Siemens Gamesa Renewable Energy, Total p. 9.
Soteris Kalogirou, "The potential of solar industrial process heat applications", Applied Energy, vol. 76, Issue 4, Dec. 2003, pp. 337-361, Total p. 25.
Steffes, ThermElect Hydronic, Demand-Free, Off-Peak Heating, Total p. 2.
Stefica Nicol Bikes, "Australian engineers patent thermal block to store renewable energy", www.reuters.com, Oct. 27, 2021, Total p. 6.
Storworks Power, 3rd Thermal-Mechanical-Chemical Energy Storage Workshop, Aug. 10, 2021, Total p. 8.
Swagelok Energy Advisors Inc, "Steam Quality—Plant Operations Require A High Steam Quality", Steam Systems Best Practices, Document No. 23, 2009, Total p. 3.
T. Fiedler et al., "Thermal capacitors made from Miscibility Gap Alloys (MGAs)", WIT Transactions on Ecology and The Environment, vol. 186, 2014, Total p. 8.
Thomas A. Buscheck, "Hybrid-energy technology enabled by heat storage and oxy- combustion for power and industrial-heat applications with near-zero or negative CO2 emissions", Thermal-Mechanical-Chemical Energy Storage Workshop, San Antonio, Texas, Total p. 22.
Timothy C. Allison, "Thermal-Mechanical-Chemical Energy Storage Technology Overview and Research Activities", Southwest Research Institute, Aug. 9, 2021, Total p. 22.
Todd Brix, "Converting Carbon. Storing Energy", Richland, Washington U.S.A, Total p. 13.
Tony Bowdery et al., "Heat Exchangers For Thermal Energy Storage: Challenges And Mitigation", Meggitt, Aug. 2021, Total p. 20.
Torbjörn Lindquist, "Powering the evolution of a renewable society, by redefining energy infrastructure", Azelio, Total p. 10.
Travis Mcling et al., "Dynamic Earth Energy Storage: Grid Scale Energy Storage using Planet Earth as a Thermal Battery (RTES)", Total p. 7.
Trevor Brown, "Ammonia: the other hydrogen", Energy Storage for Manufacturing and Industrial Decarbonization Workshop "Energy StorM", Feb. 9, 2022, Total p. 13.

(56) References Cited

OTHER PUBLICATIONS

Veera Gnaneswar Gude, "Energy storage for desalination processes powered by renewable energy and waste heat sources", Applied Energy, vol. 137, Jan. 1, 2015, pp. 877-898, Total p. 22.
Vishal Sardeshpande, "Performance analysis for glass furnace regenerator", Applied Energy, vol. 88, Issue 12, Dec. 2011, pp. 4451-4458, Total p. 8.
Whitlock, "NREL scientists partnering with Antora Energy and MIT on TPV projects" Renewable Energy Magazine Dec. 10, 2021, htttps://www.renewableenergymagazine.com/pv_solar/nrel-scientists-partnering-with-antoraenergy-and-20211210.
Written Opinion of the International Searching Authority dated Sep. 14, 2022 for PCT/US2021/061041, 25 pages.
Dr. Jeffrey Goldmeer, "Power to Gas: Hydrogen for Power Generation Fuel Flexible Gas Turbines as Enablers for a Low or Reduced Carbon Energy Ecosystem," GE Power, Feb. 2019, 19 pages.
GE Energy Storage Unit RSU-4000, Modular, Scalable Energy Storage Solution for Utility-Scale Applications; www/ge.com/energystorage; 2020, 1 page.
Hamish Andrew Miller, et al. "Green hydrogen from anion exchange membrane water electrolysis: a review of recent developments in critical materials and operating conditions," rsc.li/sustainable-energy; DOI: 10.1039/c9se01240k; Received Dec. 14, 2019; Accepted Mar. 4, 2020; 20 pages.
How thermal power plants can benefit from the energy transition, The Future of Energy 2019, Siemens Gamesa Renewable Energy, 10 pages.
Office of Fossil Energy and Carbon Management, "U.S. Department of Energy Selects 12 Projects to Improve Fossil-Based Hydrogen Production, Transport, Storage and Utilization", dated Jul. 7, 2021, in 8 pages.

\* cited by examiner

THERMAL ENERGY STORAGE SYSTEM COUPLED WITH STEAM CRACKING SYSTEM

CROSS-REFERENCE TO RELATED APPLICATIONS

The present application is a continuation-in-part of U.S. patent application Ser. No. 18/144,134, filed May 5, 2023[1]. This application also claims priority under 35 USC § 119(e) to:

U.S. Provisional Patent Application No. 63/347,987 filed on Jun. 1, 2022,
U.S. Provisional Patent Application No. 63/378,355 filed on Oct. 4, 2022,
U.S. Provisional Patent Application No. 63/427,374 filed on Nov. 22, 2022,
U.S. Provisional Patent Application No. 63/434,919 filed on Dec. 22, 2022, and
U.S. Provisional Patent Application No. 63/459,540 filed on Apr. 14, 2023, The contents of these priority applications are incorporated by reference in their entirety and for all purposes.

BACKGROUND

Technical Field

The present disclosure relates to thermal energy storage and utilization systems. More particularly, the present disclosure relates to an energy storage system that stores electrical energy in the form of thermal energy, which can be used for the continuous supply of hot air, carbon dioxide ($CO_2$), steam or other heated fluids, for various applications including the supply of heat for power generation. More specifically, the energy storage system provides higher-temperature heat to a steam cracking furnace system for converting a hydrocarbon feedstock into cracked gas, thereby increasing the efficiency of the temperature control. New disclosure in this application (beyond what was disclosed in the parent application Ser. No. 17/668,333) appears primarily at paragraphs [32-44], [52-56], [66-881], and [178-219], and in FIGS. 7-17.

Related Art

I. Thermal Energy Systems
A. Variable Renewable Electricity

The combustion of fossil fuels has been used as a heat source in thermal electrical power generation to provide heat and steam for uses such as industrial process heat. The use of fossil fuels has various problems and disadvantages, however, including global warming and pollution. Accordingly, there is a need to switch from fossil fuels to clean and sustainable energy.

Variable renewable electricity (VRE) sources such as solar power and wind power have grown rapidly, as their costs have reduced as the world moves towards lower carbon emissions to mitigate climate change. But a major challenge relating to the use of VRE is, as its name suggests, its variability. The variable and intermittent nature of wind and solar power does not make these types of energy sources natural candidates to supply the continuous energy demands of electrical grids, industrial processes, etc. Accordingly, there is an unmet need for storing VRE to be able to efficiently and flexibly deliver energy at different times.

Moreover, the International Energy Agency has reported that the use of energy by industry comprises the largest portion of world energy use, and that three-quarters of industrial energy is used in the form of heat, rather than electricity. Thus, there is an unmet need for lower-cost energy storage systems and technologies that utilize VRE to provide industrial process energy, which may expand VRE and reduce fossil fuel combustion.

B. Storage of Energy as Heat

Thermal energy in industrial, commercial, and residential applications may be collected during one time period, stored in a storage device, and released for the intended use during another period. Examples include the storage of energy as sensible heat in tanks of liquid, including water, oils, and molten salts; sensible heat in solid media, including rock, sand, concrete and refractory materials; latent heat in the change of phase between gaseous, liquid, and solid phases of metals, waxes, salts and water; and thermochemical heat in reversible chemical reactions which may absorb and release heat across many repeated cycles; and media that may combine these effects, such as phase-changing materials embedded or integrated with materials which store energy as sensible heat. Thermal energy may be stored in bulk underground, in the form of temperature or phase changes of subsurface materials, in contained media such as liquids or particulate solids, or in self-supporting solid materials.

Electrical energy storage devices such as batteries typically transfer energy mediated by a flowing electrical current. Some thermal energy storage devices similarly transfer energy into and out of storage using a single heat transfer approach, such as convective transfer via a flowing liquid or gas heat transfer medium. Such devices use "refractory" materials, which are resistant to high temperatures, as their energy storage media. These materials may be arranged in configurations that allow the passage of air and combustion gases through large amounts of material.

Some thermal energy systems may, at their system boundary, absorb energy in one form, such as incoming solar radiation or incoming electric power, and deliver output energy in a different form, such as heat being carried by a liquid or gas. But thermal energy storage systems must also be able to deliver storage economically. For sensible heat storage, the range of temperatures across which the bulk storage material—the "storage medium"—can be heated and cooled is an important determinant of the amount of energy that can be stored per unit of material. Thermal storage materials are limited in their usable temperatures by factors such as freezing, melting, softening, boiling, or thermally driven decomposition or deterioration, including chemical and mechanical effects.

Further, different uses of thermal energy—different heating processes or industrial processes—require energy at different temperatures. Electrical energy storage devices, for example, can store and return electrical energy at any convenient voltage and efficiently convert that voltage up or down with active devices. On the other hand, the conversion of lower-temperature heat to higher temperatures is intrinsically costly and inefficient. Accordingly, a challenge in thermal energy storage devices is the cost-effective delivery of thermal energy with heat content and at a temperature sufficient to meet a given application.

Some thermal energy storage systems store heat in a liquid that flows from a "cold tank" through a heat exchange device to a "hot tank" during charging, and then from the hot tank to the cold tank during discharge, delivering relatively isothermal conditions at the system outlet during discharge.

Systems and methods to maintain sufficient outlet temperature while using lower-cost solid media are needed.

Thermal energy storage systems generally have costs that are primarily related to their total energy storage capacity (how many MWh of energy are contained within the system) and to their energy transfer rates (the MW of instantaneous power flowing into or out of the energy storage unit at any given moment). Within an energy storage unit, energy is transferred from an inlet into storage media, and then transferred at another time from storage media to an outlet. The rate of heat transfer into and out of storage media is limited by factors including the heat conductivity and capacity of the media, the surface area across which heat is transferring, and the temperature difference across that surface area. High rates of charging are enabled by high temperature differences between the heat source and the storage medium, high surface areas, and storage media with high heat capacity and/or high thermal conductivity.

Each of these factors can add significant cost to an energy storage device. For example, larger heat exchange surfaces commonly require 1) larger volumes of heat transfer fluids, and 2) larger surface areas in heat exchangers, both of which are often costly. Higher temperature differences require heat sources operating at relatively higher temperatures, which may cause efficiency losses (e.g. radiation or convective cooling to the environment, or lower coefficient of performance in heat pumps) and cost increases (such as the selection and use of materials that are durable at higher temperatures). Media with higher thermal conductivity and heat capacity may also require selection of costly higher-performance materials or aggregates.

Another challenge of systems storing energy from VRE sources relates to rates of charging. A VRE source, on a given day, may provide only a small percentage of its energy during a brief period of the day, due to prevailing conditions. For an energy storage system that is coupled to a VRE source and that is designed to deliver continuous output, all the delivered energy must be absorbed during the period when incoming VRE is available. As a result, the peak charging rate may be some multiple of the discharge rates (e.g., 3-5×), for instance, in the case of a solar energy system, if the discharge period (overnight) is significantly longer than the charge period (during daylight). In this respect, the challenge of VRE storage is different from, for example, that of heat recuperation devices, which typically absorb and release heat at similar rates. For VRE storage systems, the design of units that can effectively charge at high rates is important and may be a higher determinant of total system cost than the discharge rate.

C. Thermal Energy Storage Problems and Disadvantages

The above-described approaches have various problems and disadvantages. Earlier systems do not take into account several critical phenomena in the design, construction, and operation of thermal energy storage systems, and thus does not facilitate such systems being built and efficiently operated. More specifically, current designs fail to address "thermal runaway" and element failure due to non-uniformities in thermal energy charging and discharging across an array of solid materials, including the design of charging, discharging, and unit controls to attain and restore balances in temperature across large arrays of thermal storage material.

Thermal energy storage systems with embedded radiative charging and convective discharging are in principle vulnerable to "thermal runaway" or "heat runaway" effects. The phenomenon may arise from imbalances, even small imbalances, in local heating by heating elements and in cooling by heat transfer fluid flow. The variations in heating rate and cooling rate, unless managed and mitigated, may lead to runaway temperatures that cause failures of heaters and/or deterioration of refractory materials. Overheating causes early failures of heating elements and shortened system life. In Stack, for example, the bricks closest to the heating wire are heated more than the bricks that are further away from the heating wire. As a result, the failure rate for the wire is likely to increase, reducing heater lifetime.

One effect that further exacerbates thermal runaway is the thermal expansion of air flowing in the air conduits. Hotter air expands more, causing a higher outlet velocity for a given inlet flow, and thus a higher hydraulic pressure drop across the conduit, which may contribute to a further reduction of flow and reduced cooling during discharge. Thus, in successive heating and cooling cycles, progressively less local cooling can occur, resulting in still greater local overheating.

The effective operation of heat supply from thermal energy storage relies upon continuous discharge, which is a particular challenge in systems that rely upon VRE sources to charge the system. Solutions are needed that can capture and store that VRE energy in an efficient manner and provide the stored energy as required to a variety of uses, including a range of industrial applications, reliably and without interruption.

Previous systems do not adequately address problems associated with VRE energy sources, including variations arising from challenging weather patterns such as storms, and longer-term supply variations arising from seasonal variations in VRE generation. In this regard, there is an unmet need in the art to provide efficient control of energy storage system charging and discharging in smart storage management. Current designs do not adequately provide storage management that considers a variety of factors, including medium-term through short-term weather forecasts, VRE generation forecasts, and time-varying demand for energy, which may be determined in whole or in part by considerations such as industrial process demand, grid energy demand, real-time electricity prices, wholesale electricity market capacity prices, utility resource adequacy value, and carbon intensity of displaced energy supplies. A system is needed that can provide stored energy to various demands that prioritizes by taking into account these factors, maximizing practical utility and economic efficiencies.

There are a variety of unmet needs relating generally to energy, and more specifically, to thermal energy. Generally, there is a need to switch from fossil fuels to clean and sustainable energy. There is also a need to store VRE to deliver energy at different times in order to help meet society's energy needs. There is also a need for lower-cost energy storage systems and technologies that allow VRE to provide energy for industrial processes, which may expand the use of VRE and thus reduce fossil fuel combustion. There is also a need to maintain sufficient outlet temperature while using lower-cost solid media.

Still further, there is a need to design VRE units that can be rapidly charged at low cost, supply dispatchable, continuous energy as required by various industrial applications despite variations in VRE supply, and that facilitate efficient control of charging and discharging of the energy storage system.

II. Steam Cracking Applications

A. Steam Cracking Concepts and Methods

Steam cracking is a widely used process in the petrochemical industry to produce a variety of chemicals, including ethylene and propylene, which are used as the building blocks for plastics, rubber, and other materials. The process involves the thermal decomposition of hydrocarbons at high temperatures and is typically carried out in a cracking furnace or coil. The operation of a steam cracking system can be broken down into several key steps. First, a feedstock of hydrocarbons, typically derived from crude oil or natural gas, is prepared and mixed with steam. The steam helps to control the reaction and prevent the formation of unwanted by-products. The mixture is then fed into a furnace or coil, where it is heated to high temperatures, typically around 850° C.

The heat from the furnace breaks the chemical bonds in the heavy hydrocarbons, resulting in the formation of smaller molecules, including ethylene, propylene, and other by-products. The reaction is highly exothermic, meaning that it releases heat, and the high temperatures required for the reaction to proceed are maintained by the heat released by the reaction itself.

Once the cracking reaction is complete, the mixture is rapidly cooled using a quenching agent, such as water or a quench oil. This step is critical to stopping the reaction and preventing further unwanted by-product formation. The cooled reaction mixture is then separated into different components, including the desired products (ethylene, propylene, etc.) and any by-products or unreacted feedstock.

The separated products may then be further purified to remove impurities and achieve the desired product quality. Any unreacted feedstock or by-products may be recycled back into the process as burner fuel to maximize the overall energy efficiency of the process. While steam cracking is a highly efficient and versatile process, it does have some limitations and drawbacks. The high temperatures required for the reaction to proceed mean that the process can be energy-intensive and require significant amounts of fuel or electricity. The process can also produce large amounts of greenhouse gases, contributing to climate change.

B. Steam Cracking Unit

The operation of a steam cracking unit can be divided into several key steps. First, the hydrocarbon feedstock is prepared by removing impurities and contaminants, such as sulfur and nitrogen compounds, which can interfere with the cracking reaction. The feedstock may be preheated before it is then mixed with dilution steam, which helps to control the reaction and prevent the formation of unwanted by-products.

The mixture of hydrocarbons and steam is then fed into a furnace or cracking coil, where it is heated to high temperatures. The furnace is typically lined with refractory materials, which can withstand the high temperatures and corrosive environment of the cracking process. The mixture of hydrocarbons and steam is heated by burners or other heat sources, and the heat released by the cracking reaction itself helps to maintain the high temperatures required for the process to proceed.

As the mixture of hydrocarbons and steam passes through the furnace or coil, the chemical bonds in the hydrocarbons are broken, resulting in the formation of smaller molecules, including ethylene, propylene, and other by-products. The reaction is highly exothermic, meaning that it releases heat, and the high temperatures required for the reaction to proceed are maintained by the heat released by the reaction itself.

Once the cracking reaction is complete, the mixture of products and by-products is rapidly cooled using a quenching agent, such as water or a hydrocarbon stream. This step is critical to stopping the reaction and preventing further unwanted by-product formation. The cooled mixture is then separated into different components, including the desired products (ethylene, propylene, etc.) and any by-products or unreacted feedstock. The separated products may then be further purified to remove impurities and achieve the desired product quality. Any unreacted feedstock or by-products may be recycled back into the process to maximize the yield of desired products.

C. Problems and Disadvantages of Steam Cracking

One of the most significant environmental impacts of steam cracking is its contribution to greenhouse gas emissions. The process releases large amounts of carbon dioxide and other greenhouse gases, which contribute to climate change. This has become a growing concern in recent years, as the world seeks to reduce its carbon footprint and transition to a more sustainable energy system.

From a technological perspective, steam cracking has some limitations and drawbacks. The high temperatures and energy requirements of the process make it relatively expensive and energy intensive. As a result, there is a constant drive to develop more efficient and cost-effective technologies to reduce the energy consumption and environmental impacts of the process.

SUMMARY

The example implementations advance the art of thermal energy storage and enable the practical construction and operation of high-temperature thermal energy storage systems which are charged by VRE, store energy in solid media, and deliver high-temperature heat.

I. Thermal Energy Storage System

This Section I of the Summary relates to the disclosure as it appears in U.S. patent application Ser. No. 17/668,333, of which this application is a continuation-in-part.

Aspects of the example implementations relate to a system for thermal energy storage, including an input, (e.g., electricity from a variable renewable electricity (VRE) source), a container having sides, a roof and a lower platform, a plurality of vertically oriented thermal storage units (TSUs), inside the container, the TSUs each including a plurality of stacks of bricks and heaters attached thereto, each of the heaters being connected to the input electricity via switching circuitry, an insulative layer interposed between the plurality of TSUs, the roof and at least one of the sides, a duct formed between the insulative layer and a boundary formed by the sides, an inner side of the roof and the lower platform of the container, a blower that blows relatively cooler fluid such as air or another gas (e.g. $CO_2$) along the flow path, an output (e.g., hot air at prescribed temperature to industrial application), a controller that controls and co-manages the energy received from the input and the hot air generated at the output based on a forecast associated with an ambient condition (e.g., season or weather) or a condition (e.g., output temperature, energy curve, etc.). The exterior and interior shapes of the container may be rectangular, cylindrical (in which case "sides" refers to the cylinder walls), or other shapes suitable to individual applications.

The terms air, fluid and gas are used interchangeably herein to refer to a fluid heat transfer medium of any suitable type, including various types of gases (air, $CO_2$, oxygen and other gases, alone or in combination), and when one is mentioned, it should be understood that the others can equally well be used. Thus, for example, "air" can be any suitable fluid or gas or combinations of fluids or gases.

Thermal energy storage (TES) systems according to the present designs can advantageously be integrated with or coupled to steam generators, including heat recovery steam generators (HRSGs) and once-through steam generators (OTSGs). The terms "steam generator", "HRSG", and "OTSG" are used interchangeably herein to refer to a heat exchanger that transfers heat from a first fluid into a second fluid, where the first fluid may be air circulating from the TSU and the second fluid may be water (being heated and/or boiled), oil, salt, air, $CO_2$, or another fluid. In such implementations, the heated first fluid is discharged from a TES unit and provided as input to the steam generator, which extracts heat from the discharged fluid to heat a second fluid, including producing steam, which heated second fluid may be used for any of a variety of purposes (e.g., to drive a turbine to produce shaft work or electricity). After passing through a turbine, the second fluid still contains significant heat energy, which can be used for other processes. Thus, the TES system may drive a cogeneration process. The first fluid, upon exiting the steam generator, can be fed back as input to the TES, thus capturing waste heat to effectively preheat the input fluid. Waste heat from another process may also preheat input fluid to the TES.

According to another aspect, a dynamic insulation system include a container having sides, a roof and a lower platform, a plurality of vertically oriented thermal storage units (TSUs) spaced apart from one another, an insulative layer interposed between the plurality of TSUs, the roof and at least one of the sides and floor, a duct formed between the insulative layer and a boundary formed by the sides, an inner side of the roof and the lower platform of the container, and a blower that blows unheated air along the air flow path, upward from the platform to a highest portion of the upper portion, such that the air path is formed from the highest portion of the roof to the platform, and is heated by the plurality of TSUs, and output from the TES apparatus. The unheated air along the flow path forms an insulated layer and is preheated by absorbing heat from the insulator.

II. Steam Cracking System and Applications

This Section II of the Summary relates to the newly added disclosure of this continuation-in-part application.

An inventive system and process includes a thermal energy storage system (TES) that captures and stores intermittent electrical energy by converting it to high-temperature heat stored in a medium, and discharges high temperature heat externally to a steam cracking system. Additional aspects may include a steam cracking application that includes the TES unit coupled to a steam cracking furnace system. The steam cracking process shown in FIGS. 7-15 is derived from an example, conventional, "fuel-fired" naphtha steam cracking plant. In some process integrations, an electric steam cracker is assumed to fulfill the duty of the "radiant zone" in a conventional process where preheated feedstock is subjected to rapid heating to cracking temperature before being promptly cooled or quenched. In this integration, the heat battery or TES is intended to fulfil the heat duty of the "convective zone" in a conventional process. The three process integrations are intended to show increasing levels of replacement in the conventional steam cracking process. The electrified cases are sized to produce the same amount of product cracked gas as the reference conventional case would, given a corresponding fuel input. Dilution steam is assumed to be available from other processes around a petrochemical plant. The hot gas discharge from the heat battery or TES is designed to heat all desired components with a pinch temperature of at least 15° C. before being recirculated to the heat battery at a temperature between 125° C. and 200° C.

An aspect of the invention includes a preheat process. This aspect of the invention is the simplest process integration where hot gas from a TES, which is charged using electricity derived from renewable clean energy and/or from a grid, indirectly preheats some or all feedstock components prior to their being passed into an electric cracker reactor. Another aspect of the invention includes a preheat and economizer. This next level of integration is intended as a partial fulfillment of heat recovery steam generation of a conventional process. Conventionally, steam cracking processes have been designed to recover the large amount of heat contained in flue gasses from the burners in the "radiant zone." Because of this, steam cracking furnaces are often considered the 'heart' of a petrochemical plant, as other petrochemical processes are built around the cracker to utilize the waste heat it produces. Often times, waste heat is used to generate steam for use in another process or for power generation. In this process integration, high pressure boiler feedwater which is ultimately used to quench the cracked product gas, is heated, in-line with the high temperature cracked gas stream exiting the radiant zone, to generate high pressure steam. The integrated system provides export steam in addition to quenched cracked gas.

Additional aspects may include a feedstock/dilution steam preheat, boiler feedwater economizer, and export steam superheat. This process integration is configured to serve as an electrified, drop-in replacement of a conventional steam cracker, either alone or along with other emission reduction technologies such that the TES integration addresses operational trade-offs that other emission reducing technologies may introduce. In the latter class of integrations, the integration of the TES may enable the modified process to produce steam of the same quantity and conditions of the reference, conventional process.

BRIEF DESCRIPTION OF DRAWINGS

The accompanying drawings are included to provide a further understanding of the present disclosure and are incorporated in and constitute a part of this specification. The drawings illustrate example implementations of the present disclosure and, together with the description, serve to explain the principles of the present disclosure.

In the drawings, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

FIG. 1 illustrates a schematic diagram of the thermal energy storage system architecture according to the example implementations.

FIG. 2 illustrates a schematic diagram of a system according to the example implementations.

FIG. 3 illustrates a schematic diagram of a storage-fired once-through steam generator (OTSG) according to the example implementations.

FIG. 4 illustrates an example view of a system being used as an integrated cogeneration system according to the example implementations.

FIG. 5 illustrates dynamic insulation according to the example implementations.

FIG. 6 provides an isometric view of the thermal storage unit with multiple vents closures open, according to some implementations.

FIG. 7 illustrates a flow sheet of a conventional, "fuel-fired" naphtha steam cracking furnace.

FIG. 8 illustrates a simplified example system of a thermal storage system replacing heat from an efficiency improvement in the radiant section.

FIG. 9 illustrates an implementation of a thermal energy storage system (TES) supporting the adoption of oxyfuel fired technology in a steam cracking furnace.

FIG. 10 illustrates an integration with an oxyfuel fired system with the only change being the use of an electric booster heater to raise the temperature of the TES to higher temperatures in a cracking furnace.

FIG. 11 illustrates a simplified example system of a thermal storage system that includes the addition of an electric booster heater to produce higher temperature gas than the TES alone may be able to supply in a steam cracking furnace.

FIG. 12 illustrates an abstracted schematic of a TES replacing all the preheating and export steam heating of a steam cracking system that uses and electric cracker to perform the cracking reaction.

FIG. 13 illustrates an electric booster that may be used to further boost the temperature of the gas to higher temperatures than the thermal storage system can provide in a steam cracking furnace.

FIG. 14 illustrates how the TES may supply high temperature gas at temperatures much higher than conventional flame temperatures used in the radiant zone in a steam cracking furnace.

FIG. 15 illustrates a variation of a TES supplying all heat for the steam cracking process with radiant tubing interacting directly with the TES.

FIG. 16 illustrates a steam cracking system integrated with a thermal storage system which supplies heat for feedstock preheating and steam generation for power generation to power an electrically heated cracker.

FIG. 17 illustrates a steam cracking system integrated with a thermal storage system which supplies heat for feedstock preheating and cracking and steam generation for power generation.

DETAILED DESCRIPTION

Aspects of the example implementations, as disclosed herein, relate to systems, methods, materials, compositions, articles, and improvements for a thermal energy storage system for power generation for various industrial applications.

I. Thermal Energy Storage System

This Section I of the Summary relates to the disclosure as it appears in U.S. Pat. No. 11,603,776, of which this application is a continuation-in-part.

U.S. Pat. No. 11,603,776 relates to the field of thermal energy storage and utilization systems and addresses the above-noted problems. A thermal energy storage system is disclosed that stores electrical energy in the form of thermal energy in a charging mode and delivers the stored energy in a discharging mode. The discharging can occur at the same time as charging; i.e., the system may be heated by electrical energy at the same time that it is providing a flow of convectively heated air. The discharged energy is in the form of hot air, hot fluids in general, steam, heated $CO_2$, heated supercritical $CO_2$, and/or electrical power generation, and can be supplied to various applications, including industrial uses. The disclosed implementations include efficiently constructed, long-service-life thermal energy storage systems having materials, fabrication, physical shape, and other properties that mitigate damage and deterioration from repeated temperature cycling.

Optionally, heating of the elements of the storage unit may be optimized, so as to store a maximum amount of heat during the charging cycle. Alternatively, heating of elements may be optimized to maximize heating element life, by means including minimizing time at particular heater temperatures, and/or by adjusting peak charging rates and/or peak heating element temperatures. Still other alternatives may balance these competing interests. Specific operations to achieve these optimizations are discussed further below.

Example implementations employ efficient yet economical thermal insulation. Specifically, a dynamic insulation design may be used either by itself or in combination with static primary thermal insulation. The disclosed dynamic insulation techniques provide a controlled flow of air inside the system to restrict dissipation of thermal energy to the outside environment, which results in higher energy storage efficiency.

System Overview as Disclosed in U.S. Pat. No. 11,603,776

Figure 1:
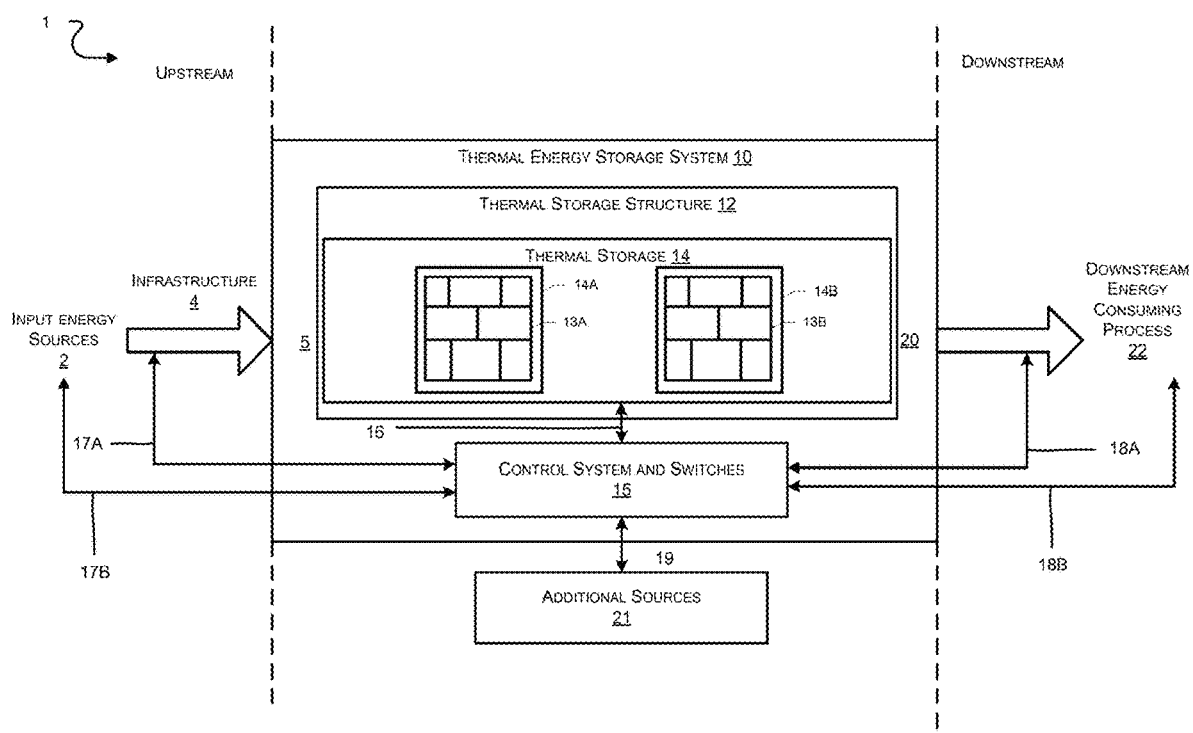
FIGS. 1 to 6 appear in parent U.S. patent application Ser. No. 17/668,333.

FIG. 1 is a block diagram of a system 1 that includes a thermal energy storage system 10, according to one implementation. In the implementation shown, thermal energy storage system 10 is coupled between an input energy source 2 and a downstream energy-consuming process 22. For ease of reference, components on the input and output sides of system 1 may be described as being "upstream" and "downstream" relative to system 10.

In the depicted implementation, thermal energy storage system 10 is coupled to input energy source 2, which may include one or more sources of electrical energy. Source 2 may be renewable, such as photovoltaic (PV) cell or solar, wind, geothermal, etc. Source 2 may also be another source, such as nuclear, natural gas, coal, biomass, or other. Source 2 may also include a combination of renewable and other sources. In this implementation, source 2 is provided to thermal energy storage system 10 via infrastructure 4, which may include one or more electrical conductors, commutation equipment, etc. In some implementations, infrastructure 4 may include circuitry configured to transport electricity over long distances; alternatively, in implementations in which input energy source 2 is located in the immediate vicinity of thermal energy storage system 10, infrastructure 4 may be greatly simplified. Ultimately, infrastructure 4 delivers energy to input 5 of thermal energy storage system 10 in the form of electricity.

The electrical energy delivered by infrastructure 4 is input to thermal storage structure 12 within system 10 through switchgear, protective apparatus and active switches controlled by control system 15. Thermal storage structure 12 includes thermal storage 14, which in turn includes one more assemblages (e.g., 14A, 14B) of solid storage media (e.g., 13A, 13B) configured to store thermal energy. These assemblages are variously referred to throughout this disclosure as "stacks," "arrays," and the like. These terms are intended to be generic and not connote any particular orientation in space, etc. In general, an array can include any material that is suitable for storing thermal energy and can be oriented in any given orientation (e.g., vertically, horizontally, etc.). Likewise, the solid storage media within the assemblages may variously be referred to as thermal storage blocks, bricks, etc. In implementations with multiple arrays, the arrays may be thermally isolated from one another and are separately controllable, meaning that they are capable of being charged or discharged independently from one another. This arrangement provides maximum flexibility, permitting multiple arrays to be charged at the same time, multiple arrays to be charged at different times or at different rates, one array to be discharged while the other array remains charged, etc.

Thermal storage 14 is configured to receive electrical energy as an input. The received electrical energy may be provided to thermal storage 14 via resistive heating elements that are heated by electrical energy and emit heat, primarily as electromagnetic radiation in the infrared and visible spectrum. During a charging mode of thermal storage 14, the electrical energy is released as heat from the resistive heating elements, transferred principally by radiation emitted both by the heating elements and by hotter solid storage media, and absorbed and stored in solid media within storage 14. When an array within thermal storage 14 is in a discharging mode, the heat is discharged from thermal storage structure 12 as output 20. As will be described, output 20 may take various forms, including a fluid such as hot air. (References to the use of "air" and "gases" within the present disclosure may be understood to refer more generally to a "fluid.") The hot air may be provided directly to a downstream energy consuming process 22 (e.g., an industrial application), or it may be passed through a steam generator (not shown) to generate steam for process 22.

Additionally, thermal energy storage system 10 includes a control system 15. Control system 15, in various implementations, is configured to control thermal storage 14, including through setting operational parameters (e.g., discharge rate), controlling fluid flows, controlling the actuation of electromechanical or semiconductor electrical switching devices, etc. The interface 16 between control system 15 and thermal storage structure 12 (and, in particular thermal storage 14) is indicated in FIG. 1. Control system 15 may be implemented as a combination of hardware and software in various embodiments.

Control system 15 may also interface with various entities outside thermal energy storage system 10. For example, control system 15 may communicate with input energy source 2 via an input communication interface 17B. For example, interface 17B may allow control system 15 to receive information relating to energy generation conditions at input energy source 2. In the implementation in which input energy source 2 is a photovoltaic array, this information may include, for example, current weather conditions at the site of source 2, as well as other information available to any upstream control systems, sensors, etc. Interface 17B may also be used to send information to components or equipment associated with source 2.

Similarly, control system 15 may communicate with infrastructure 4 via an infrastructure communication interface 17A. In a manner similar to that explained above, interface 17A may be used to provide infrastructure information to control system 15, such as current or forecast VRE availability, grid demand, infrastructure conditions, maintenance, emergency information, etc. Conversely, communication interface 17A may also be used by control system 15 to send information to components or equipment within infrastructure 4. For example, the information may include control signals transmitted from the control system 15, that controls valves or other structures in the thermal storage structure 12 to move between an open position and a closed position, or to control electrical or electronic switches connected to heaters in the thermal storage 14. Control system 15 uses information from communication interface 17A in determining control actions, and control actions may adjust closing or firing of switches in a manner to optimize the use of currently available electric power and maintain the voltage and current flows within infrastructure 4 within chosen limits.

Control system 15 may also communicate downstream using interfaces 18A and/or 18B. Interface 18A may be used to communicate information to any output transmission structure (e.g., a steam transmission line), while interface 18B may be used to communicate with downstream process 22. For example, information provided over interfaces 18A and 18B may include temperature, industrial application demand, current or future expected conditions of the output or industrial applications, etc. Control system 15 may control the input, heat storage, and output of thermal storage structure based on a variety of information. As with interfaces 17A and 17B, communication over interfaces 18A and 18B may be bidirectional—for example, system 10 may indicate available capacity to downstream process 22. Still further, control system 15 may also communicate with any other relevant data sources (indicated by reference numeral 21 in FIG. 1) via additional communication interface 19. Additional data sources 21 are broadly intended to encompass any other data source not maintained by either the upstream or downstream sites. For example, sources 21 might include third-party forecast information, data stored in a cloud data system, etc.

Thermal energy storage system 10 is configured to efficiently store thermal energy generated from input energy source 2 and deliver output energy in various forms to a downstream process 22. In various implementations, input energy source 2 may be from renewable energy and downstream process 22 may be an industrial application that requires an input such as steam or hot air. Through various techniques, including arrays of thermal storage blocks that use radiant heat transfer to efficiently storage energy and a lead-lag discharge paradigm that leads to desirable thermal properties such as the reduction of temperature nonuniformities within thermal storage 14, system 10 may advantageously provide a continuous (or near-continuous) flow of output energy based on an intermittently available source. The use of such a system has the potential to reduce the reliance of industrial applications on fossil fuels.

Figure 2:
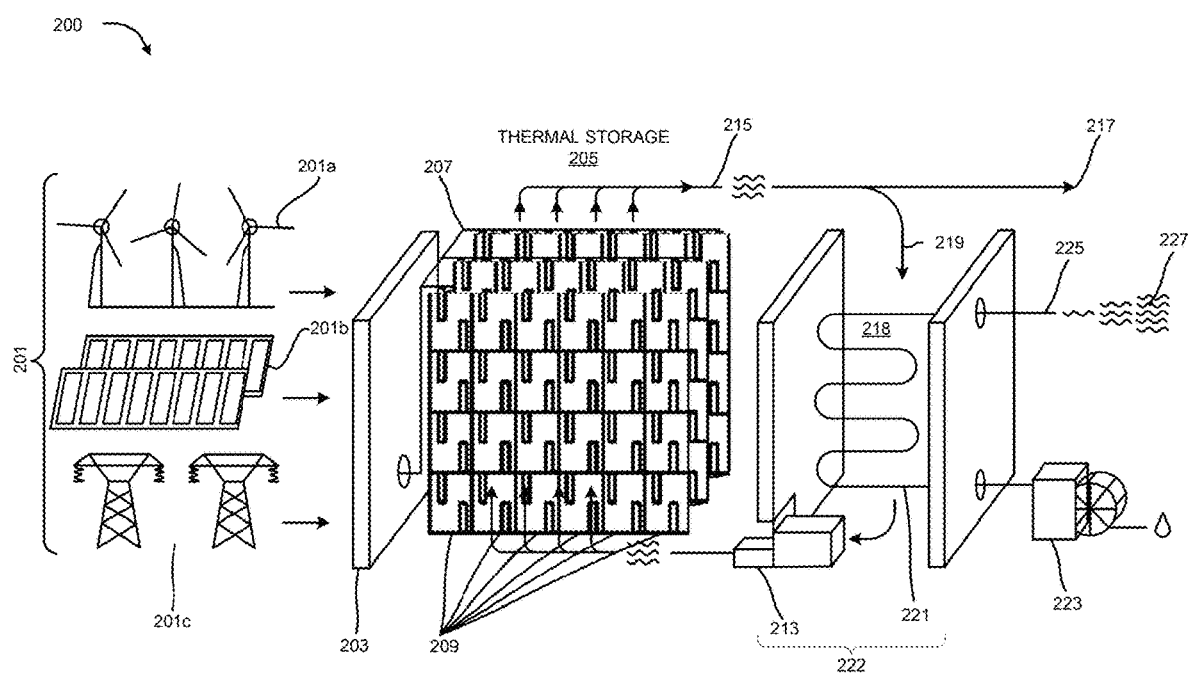

FIG. 2 provides a schematic view of one implementation of a system 200 for storing thermal energy, and further illustrates components and concepts just described with respect to FIG. 1. As shown, one or more energy sources 201 provide input electricity. For example, and as noted above, renewable sources such as wind energy from wind turbines 201a, solar energy from photovoltaic cells 201b, or other energy sources may provide electricity that is variable in availability or price because the conditions for generating the electricity are varied. For example, in the case of wind turbine 201a, the strength, duration and variance of the wind, as well as other weather conditions causes the amount of energy that is produced to vary over time. Similarly, the amount of energy generated by photovoltaic cells 201*b* also varies over time, depending on factors such as time of day, length of day due to the time of year, level of cloud cover due to weather conditions, temperature, other ambient conditions, etc. Further, the input electricity may be received from the existing power grid 201*c*, which may in turn vary based on factors such as pricing, customer demand, maintenance, and emergency requirements.

The electricity generated by source 201 is provided to the thermal storage structure within the thermal energy storage system. In FIG. 2, the passage of electricity into the thermal storage structure is represented by wall 203. The input electrical energy is converted to heat within thermal storage 205 via resistive heating elements 207 controlled by switches (not shown). Heating elements 207 provide heat to solid storage media 209. Thermal storage components (sometimes called "bricks") within thermal storage 205 are arranged to form embedded radiative chambers. FIG. 2 illustrates that multiple thermal storage arrays 209 may be present within system 200. These arrays may be thermally isolated from one another and may be separately controllable. FIG. 2 is merely intended to provide a conceptual representation of how thermal storage 205 might be implemented—one such implementation might, for example, include only two arrays, or might include six arrays, or ten arrays, or more.

In the depicted implementation, a blower 213 drives air or other fluid to thermal storage 205 such that the air is eventually received at a lower portion of each of the arrays 209. The air flows upward through the channels and chambers formed by bricks in each of the arrays 209, with flow controlled by louvers. By the release of heat energy from the resistive heating elements 207, heat is radiatively transferred to arrays 209 of bricks during a charging mode. Relatively hotter brick surfaces reradiate absorbed energy (which may be referred to as a radiative "echo") and participate in heating cooler surfaces. During a discharging mode, the heat stored in arrays 209 is output, as indicated at 215.

Once the heat has been output in the form of a fluid such as hot air, the fluid may be provided for one or more downstream applications. For example, hot air may be used directly in an industrial process that is configured to receive the hot air, as shown at 217. Further, hot air may be provided as a stream 219 to a heat exchanger 218 of a steam generator 222, and thereby heats a pressurized fluid such as air, water, $CO_2$ or other gas. In the example shown, as the hot air stream 219 passes over a line 221 that provides the water from the pump 223 as an input, the water is heated and steam is generated as an output 225, which may be provided to an industrial application as shown at 227.

Figure 3:
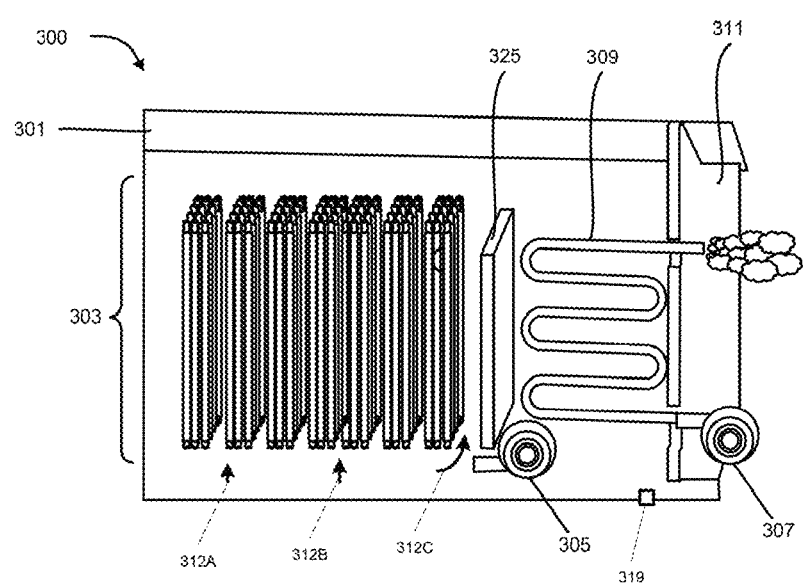

A thermal storage structure such as that depicted in FIGS. 1-2 may also include output equipment configured to produce steam for use in a downstream application. FIG. 3, for example, depicts a block diagram of an implementation of a thermal storage structure 300 that includes a storage-fired once-through steam generator (OTSG). An OTSG is a type of heat recovery stream generator (HRSG), which is a heat exchanger that accepts hot air from a storage unit, returns cooler air, and heats an external process fluid. The depicted OTSG is configured to use thermal energy stored in structure 300 to generate steam at output 311.

As has been described, thermal storage structure 300 includes outer structure 301 such walls, a roof, as well as thermal storage 303 in a first section of the structure. The OTSG is located in a second section of the structure, which is separated from the first section by thermal barrier 325. During a charging mode, thermal energy is stored in thermal storage 303. During a discharging mode, the thermal energy stored in thermal storage 303 receives a fluid flow (e.g., air) by way of a blower 305. These fluid flows may be generated from fluid entering structure 300 via an inlet valve 319 and include a first fluid flow 312A (which may be directed to a first stack within thermal storage 303) and a second fluid flow 312B (which may be directed to a second stack within thermal storage 303).

As the air or other fluid directed by blower 305 flows through the thermal storage 303 from the lower portion to the upper portion, it is heated and is eventually output at the upper portion of thermal storage 303. The heated air, which may be mixed at some times with a bypass fluid flow 312C that has not passed through thermal storage 302, is passed over a conduit 309 through which flows water, or another fluid pumped by the water pump 307. As the hot air heats up the water in the conduit, steam is generated at 311. The cooled air that has crossed the conduit (and transferred heat to the water flowing through it) is then fed back into the brick heat storage 303 by blower 305. As explained below, the control system can be configured to control attributes of the steam, including steam quality, or fraction of the steam in the vapor phase, and flow rate.

As shown in FIG. 3, an OTSG does not include a recirculating drum boiler. Properties of steam produced by an OTSG are generally more difficult to control than those of steam produced by a more traditional HRSG with a drum, or reservoir. The steam drum in such an HRSG acts as a phase separator for the steam being produced in one or more heated tubes recirculating the water; water collects at the bottom of the reservoir while the steam rises to the top. Saturated steam (having a steam quality of 100%) can be collected from the top of the drum and can be run through an additional heated tube structure to superheat it and further assure high steam quality. Drum-type HRSGs are widely used for power plants and other applications in which the water circulating through the steam generator is highly purified and stays clean in a closed system. For applications in which the water has significant mineral content, however, mineral deposits form in the drum and tubes and tend to clog the system, making a recirculating drum design infeasible.

For applications using water with a higher mineral content, an OTSG may be a better option. One such application is oil extraction, in which feed water for a steam generator may be reclaimed from a water/oil mixture produced by a well. Even after filtering and softening, such water may have condensed solid concentrations on the order of 10,000 ppm or higher. The lack of recirculation in an OTSG enables operation in a mode to reduce mineral deposit formation; however, an OTSG needs to be operated carefully in some implementations to avoid mineral deposits in the OTSG water conduit. For example, having some fraction of water droplets present in the steam as it travels through the OTSG conduit may be required to prevent mineral deposits by retaining the minerals in solution in the water droplets. This consideration suggests that the steam quality (vapor fraction) of steam within the conduit must be maintained below a specified level. On the other hand, a high steam quality at the output of the OTSG may be important for the process employing the steam. Therefore, it is advantageous for a steam generator powered by VRE through TES to maintain close tolerances on outlet steam quality. There is a sensitive interplay among variables such as input water temperature, input water flow rate and heat input, which must be managed to achieve a specified steam quality of output steam while avoiding damage to the OTSG.

Implementations of the thermal energy storage system disclosed herein provide a controlled and specified source of heat to an OTSG. The controlled temperature and flow rate available from the thermal energy storage system allows effective feed-forward and feedback control of the steam quality of the OTSG output. In one implementation, feed-forward control includes using a target steam delivery rate and steam quality value, along with measured water temperature at the input to the water conduit of the OTSG, to determine a heat delivery rate required by the thermal energy storage system for achieving the target values. In this implementation, the control system can provide a control signal to command the thermal storage structure to deliver the flowing gas across the OTSG at the determined rate. In one implementation, a thermal energy storage system integrated with an OTSG includes instrumentation for measurement of the input water temperature to the OTSG.

In one implementation, feedback control includes measuring a steam quality value for the steam produced at the outlet of the OTSG, and a controller using that value to adjust the operation of the system to return the steam quality to a desired value. Obtaining the outlet steam quality value may include separating the steam into its liquid and vapor phases and independently monitoring the heat of the phases to determine the vapor phase fraction. Alternatively, obtaining the outlet steam quality value may include measuring the pressure and velocity of the outlet steam flow and the pressure and velocity of the inlet water flow, and using the relationship between values to calculate an approximation of the steam quality. Based on the steam quality value, a flow rate of the outlet fluid delivered by the thermal storage to the OTSG may be adjusted to achieve or maintain the target steam quality. In one implementation, the flow rate of the outlet fluid is adjusted by providing a feedback signal to a controllable element of the thermal storage system. The controllable element may be an element used in moving fluid through the storage medium, such as a blower or other fluid moving device, a louver, or a valve.

The steam quality measurement of the outlet taken in real time may be used as feedback by the control system to determine the desired rate of heat delivery to the OTSG. To accomplish this, an implementation of a thermal energy storage system integrated with an OTSG may include instruments to measure inlet water velocity and outlet steam flow velocity, and, optionally, a separator along with instruments for providing separate measurements of the liquid and vapor heat values. In some implementations, the tubing in an OTSG is arranged such that the tubing closest to the water inlet is positioned in the lowest temperature portion of the airflow, and that the tubing closest to the steam exit is positioned in the highest temperature portion of the airflow. In some implementations of the present innovations, the OTSG may instead be configured such that the highest steam quality tubes (closest to the steam outlet) are positioned at some point midway through the tubing arrangement, so as to enable higher inlet fluid temperatures from the TSU to the OTSG while mitigating scale formation within the tubes and overheating of the tubes, while maintaining proper steam quality. The specified flow parameters of the heated fluid produced by thermal energy storage systems as disclosed herein may in some implementations allow precise modeling of heat transfer as a function of position along the conduit. Such modeling may allow specific design of conduit geometries to achieve a specified steam quality profile along the conduit.

Figure 4:
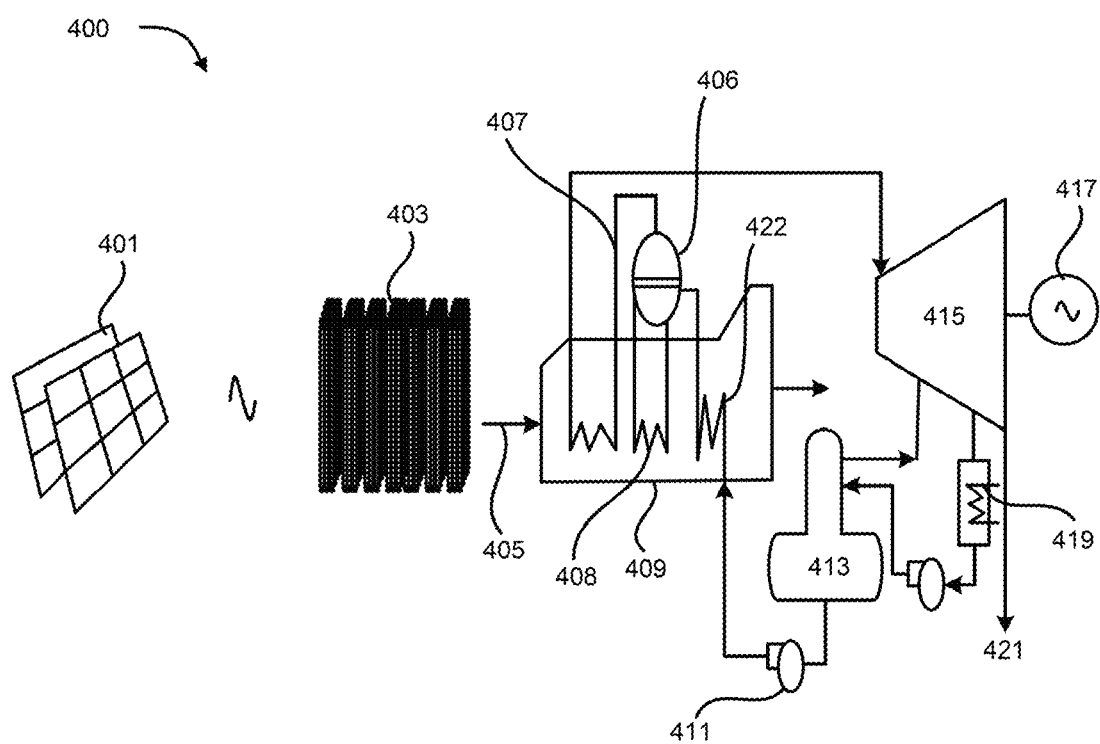

As shown in FIG. 4, the output of the thermal energy storage system may be used for an integrated cogeneration system 400. As previously explained, an energy source 401 provides electrical energy that is stored as heat in the heat storage 403 of the TSU. During discharge, the heated air is output at 405. As shown in FIG. 4, lines containing a fluid, in this case water, are pumped into a drum 406 of an HRSG 409 via a preheating section of tubing 422. In this implementation, HRSG 409 is a recirculating drum type steam generator, including a drum or boiler 406 and a recirculating evaporator section 408. The output steam passes through line 407 to a superheater coil, and is then provided to a turbine at 415, which generates electricity at 417. As an output, the remaining steam 421 may be expelled to be used as a heat source for a process or condensed at 419 and optionally passed through to a deaeration unit 413 and delivered to pump 411 in order to perform subsequent steam generation.

Certain industrial applications may be particularly well-suited for cogeneration. For example, some applications use higher temperature heat in a first system, such as to convert the heat to mechanical motion as in the case of a turbine, and lower-temperature heat discharged by the first system for a second purpose, in a cascading manner; or an inverse temperature cascade may be employed. One example involves a steam generator that makes high-pressure steam to drive a steam turbine that extracts energy from the steam, and low-pressure steam that is used in a process, such as an ethanol refinery, to drive distillation and electric power to run pumps. Still another example involves a thermal energy storage system in which hot gas is output to a turbine, and the heat of the turbine outlet gas is used to preheat inlet water to a boiler for processing heat in another steam generator (e.g., for use in an oilfield industrial application). In one application, cogeneration involves the use of hot gas at e.g., 840° C. to power or co-power hydrogen electrolysis, and the lower temperature output gas of the hydrogen electrolyzer, which may be at about 640° C., is delivered alone or in combination with higher-temperature heat from a TSU to a steam generator or a turbine for a second use. In another application, cogeneration involves the supply of heated gas at a first temperature e.g., 640° C. to enable the operation of a fuel cell, and the waste heat from the fuel cell which may be above 800° C. is delivered to a steam generator or a turbine for a second use, either alone or in combination with other heat supplied from a TSU.

A cogeneration system may include a heat exchange apparatus that receives the discharged output of the thermal storage unit and generates steam. Alternately, the system may heat another fluid such as supercritical carbon dioxide by circulating high-temperature air from the system through a series of pipes carrying a fluid, such as water or $CO_2$, (which transfers heat from the high-temperature air to the pipes and the fluid), and then recirculating the cooled air back as an input to the thermal storage structure. This heat exchange apparatus is an HRSG, and in one implementation is integrated into a section of the housing that is separated from the thermal storage.

The HRSG may be physically contained within the thermal storage structure or may be packaged in a separate structure with ducts conveying air to and from the HRSG. The HRSG can include a conduit at least partially disposed within the second section of the housing. In one implementation, the conduit can be made of thermally conductive material and be arranged so that fluid flows in a "once-through" configuration in a sequence of tubes, entering as lower-temperature fluid and exiting as higher temperature, possibly partially evaporated, two-phase flow. As noted above, once-through flow is beneficial, for example, in processing feedwater with substantial dissolved mineral contaminants to prevent accumulation and precipitation within the conduits.

Figure 6:
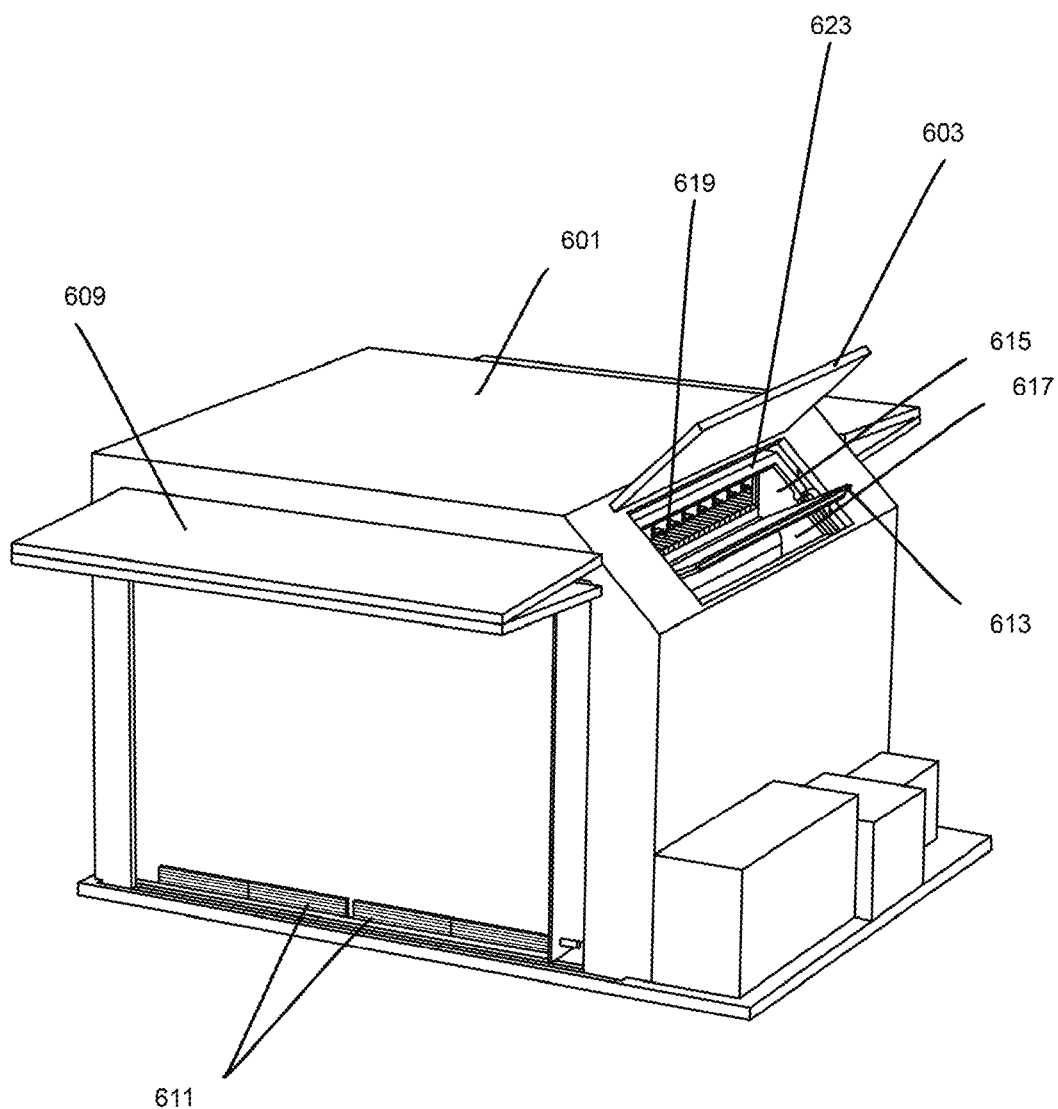

In an OTSG implementation, a first end of the conduit can be fluidically coupled to a water source. The system may provide for inflow of the fluids from the water source into a first end of the conduit and enable outflow of the received fluid or steam from a second end of the conduit. The system can include one or more pumps configured to facilitate inflow and outflow of the fluid through the conduit. The system can include a set of valves configured to facilitate controlled outflow of steam from the second end of the conduit to a second location for one or more industrial applications or electrical power generation. As shown in FIG. 6, an HRSG may also be organized as a recirculating drum-type boiler with an economizer and optional superheater, for the delivery of saturated or superheated steam.

The output of the steam generator may be provided for one or more industrial uses. For example, steam may be provided to a turbine generator that outputs electricity for use as retail local power. The control system may receive information associated with local power demands, and determine the amount of steam to provide to the turbine, so that local power demands can be met.

In addition to the generation of electricity, the output of the thermal storage structure may be used for industrial applications as explained below. Some of these applications may include, but are not limited to, electrolyzers, fuel cells, gas generation units such as hydrogen, carbon capture, manufacture of materials such as cement, calcining applications, as well as others. More details of these industrial applications are provided below.

Dynamic Insulation

It is generally beneficial for a thermal storage structure to minimize its total energy losses via effective insulation, and to minimize its cost of insulation. Some insulation materials are tolerant of higher temperatures than others. Higher-temperature tolerant materials tend to be more costly.

Figure 5:
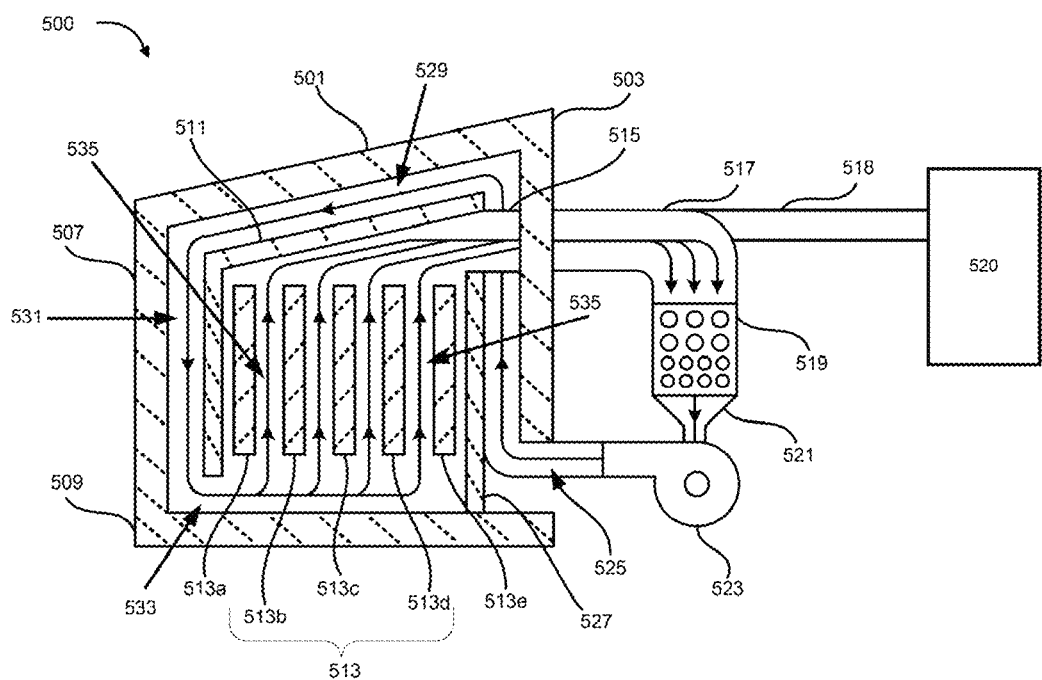

FIG. 5 provides a schematic section illustration 500 of an implementation of dynamic insulation. The outer container includes roof 501, walls 503, 507 and a foundation 509. Within the outer container, a layer of insulation 511 is provided between the outer container and columns of bricks in stack 513, the columns being represented as 513*a*, 513*b*, 513*c*, 513*d* and 513*e*. The heated fluid that is discharged from the upper portion of the columns of bricks 513*a*, 513*b*, 513*c*, 513*d* and 513*e* exits by way of an output 515, which is connected to a duct 517. Duct 517 provides the heated fluid as an input to a steam generator 519. Once the heated fluid has passed through steam generator 519, some of its heat is transferred to the water in the steam generator and the stream of fluid is cooler than when exiting the steam generator. Further, the heated fluid may be used directly in an industrial process 520 that is configured to receive the heated fluid, as shown at 518. Cooler recycled fluid exits a bottom portion 521 of the steam generator 519. An air blower 523 receives the cooler fluid, and provides the cooler fluid, via a passage 525 defined between the walls 503 and insulation 527 positioned adjacent the stack 513, through an upper air passage 529 defined between the insulation 511 and the roof 501, down through side passages 531 defined on one or more sides of the stack 513 and the insulation 511, and thence down to a passage 533 directly below the stack 513.

The air in passages 525, 529, 531 and 533 acts as an insulating layer between (a) the insulations 511 and 527 surrounding the stack 513, and (b) the roof 501, walls 503, 507 and foundation 509. Thus, heat from the stack 513 is prevented from overheating the roof 501, walls 503, 507 and foundation 509. At the same time, the air flowing through those passages 525, 529, 531 and 533 carries by convection heat that may penetrate the insulations 511 and/or 517 into air flow passages 535 of the stack 513, thus preheating the air, which is then heated by passage through the air flow passages 535.

The columns of bricks 513*a*, 513*b*, 513*c*, 513*d* and 513*e* and the air passages 535 are shown schematically in FIG. 5. The physical structure of the stacks and air flow passages therethrough in embodiments described herein is more complex, leading to advantages.

In some implementations, to reduce or minimize the total energy loss, the layer of insulation 511 is a high-temperature primary insulation that surrounds the columns 513*a*, 513*b*, 513*c*, 513*d* and 513*e* within the housing. Outer layers of lower-cost insulation may also be provided. The primary insulation may be made of thermally insulating materials selected from any combination of refractory bricks, alumina fiber, ceramic fiber, and fiberglass or any other material that might be apparent to a person of ordinary skill in the art. The amount of insulation required to achieve low losses may be large, given the high temperature differences between the storage media and the environment. To reduce energy losses and insulation costs, conduits are arranged to direct returning, cooler fluid from the HRSG along the outside of a primary insulation layer before it flows into the storage core for reheating.

The cooler plenum, including passages 525, 529, 531 and 533, is insulated from the outside environment, but total temperature differences between the cooler plenum and the outside environment are reduced, which in turn reduces thermal losses. This technique, known as "dynamic insulation," uses the cooler returning fluid, as described above, to recapture heat which passes through the primary insulation, preheating the cooler air before it flows into the stacks of the storage unit. This approach further serves to maintain design temperatures within the foundation and supports of the thermal storage structure. Requirements for foundation cooling in existing designs (e.g., for molten salt) involve expensive dedicated blowers and generators—requirements avoided by implementations according to the present teaching.

The materials of construction and the ground below the storage unit may not be able to tolerate high temperatures, and in the present system active cooling—aided by the unassisted flowing heat exchange fluid in the case of power failure—can maintain temperatures within design limits.

A portion of the fluid returning from the HRSG may be directed through conduits such as element 521 located within the supports and foundation elements, cooling them and delivering the captured heat back to the input of the storage unit stacks as preheated fluid. The dynamic insulation may be provided by arranging the bricks 513*a*, 513*b*, 513*c*, 513*d* and 513*e* within the housing so that the bricks 513*a*, 513*b*, 513*c*, 513*d* and 513*e* are not in contact with the outer surface 501, 503, 507 of the housing, and are thus thermally isolated from the housing by the primary insulation formed by the layer of cool fluid. The bricks 513*a*, 513*b*, 513*c*, 513*d* and 513*e* may be positioned at an elevated height from the bottom of the housing, using a platform made of thermally insulating material.

During unit operation, a controlled flow of relatively cool fluid is provided by the fluid blowing units 523, to a region (including passages 525, 529, 531 and 533) between the housing and the primary insulation (which may be located on an interior or exterior of an inner enclosure for one or more thermal storage assemblages), to create the dynamic thermal insulation between the housing and the bricks, which restricts the dissipation of thermal energy being generated by the heating elements and/or stored by the bricks into the outside environment or the housing, and preheats the fluid. As a result, the controlled flow of cold fluid by the fluid blowing units of the system may facilitate controlled transfer of thermal energy from the bricks to the conduit, and also facilitates dynamic thermal insulation, thereby making the system efficient and economical.

In another example implementation, the buoyancy of fluid can enable an unassisted flow of the cold fluid around the bricks between the housing and the primary insulator 511 such that the cold fluid may provide dynamic insulation passively, even when the fluid blowing units 523 fail to operate in case of power or mechanical failure, thereby maintaining the temperature of the system within predefined safety limits, to achieve intrinsic safety. The opening of vents, ports, or louvres (not shown) may establish passive buoyancy-driven flow to maintain such flow, including cooling for supports and foundation cooling, during such power outages or unit failures, without the need for active equipment.

In the above-described fluid flow, the fluid flows to an upper portion of the unit, down the walls and into the inlet of the stacking, depending on the overall surface area to volume ratio, which is in turn dependent on the overall unit size, the flow path of the dynamic insulation may be changed. For example, in the case of smaller units that have greater surface area as compared with the volume, the amount of fluid flowing through the stack relative to the area may utilize a flow pattern that includes a series of serpentine channels, such that the fluid flows on the outside, moves down the wall, up the wall, and down the wall again before flowing into the inlet. Other channelization patterns may also be used.

Additionally, the pressure difference between the return fluid in the insulation layer and the fluid in the stacks may be maintained such that the dynamic insulation layer has a substantially higher pressure than the pressure in the stacks themselves. Thus, if there is a leak between the stacks and the insulation, the return fluid at the higher pressure may be forced into the leak or the cracks, rather than the fluid within the stacks leaking out into the dynamic insulation layer. Accordingly, in the event of a leak in the stacks, the very hot fluid of the stacks may not escape outside of the unit, but instead the return fluid may push into the stacks, until the pressure between the dynamic insulation layer in the stacks equalizes. Pressure sensors may be located on either side of the blower that provide relative and absolute pressure information. With such a configuration, a pressure drop within the system may be detected, which can be used to locate the leak.

Earlier systems that store high temperature sensible heat in rocks and molten salts have required continuous active means of cooling foundations, and in some implementations continuous active means of heating system elements to prevent damage to the storage system; thus, continuous active power and backup power supply systems are required. A system as described herein does not require an external energy supply to maintain the safety of the unit. Instead, as described below, the present disclosure provides a thermal storage structure that provides for thermally induced flows that passively cools key elements when equipment, power, or water fails. This also reduces the need for fans or other cooling elements inside the thermal storage structure.

Forecast-Based System Control

As noted above, forecast information such as weather predictions may be used by a control system to reduce wear and degradation of system components. Another goal of forecast-based control is to ensure adequate thermal energy production from the thermal energy storage system to the load or application system. Actions that may be taken in view of forecast information include, for example, adjustments to operating parameters of the thermal energy storage system itself, adjustments to an amount of input energy coming into the thermal energy storage system, and actions or adjustments associated with a load system receiving an output of the thermal energy storage system.

Weather forecasting information can come from one or more of multiple sources. One source is a weather station at a site located with the generation of electrical energy, such as a solar array or photovoltaic array, or wind turbines. The weather station may be integrated with a power generation facility, and may be operationally used for control decisions of that facility, such as for detection of icing on wind turbines. Another source is weather information from sources covering a wider area, such as radar or other weather stations, which may be fed into databases accessible by the control system of the thermal energy storage system. Weather information covering a broader geography may be advantageous in providing more advanced notice of changes in condition, as compared to the point source information from a weather station located at the power source. Still another possible source of weather information is virtual or simulated weather forecast information. In general, machine learning methods can be used to train the system, taking into account such data and modifying behavior of the system.

As an example, historical information associated with a power curve of an energy source may be used as a predictive tool, taking into account actual conditions, to provide forecasting of power availability and adjust control of the thermal energy storage system, both as to the amount of energy available to charge the units and the amount of discharge heat output available. For example, the power curve information may be matched with actual data to show that when the power output of a photovoltaic array is decreasing, it may be indicative of a cloud passing over one or more parts of the array, or cloudy weather generally over the region associated with the array.

Forecast-related information is used to improve the storage and generation of heat at the thermal energy storage system in view of changing conditions. For example, a forecast may assist in determining the amount of heat that must be stored and the rate at which heat must be discharged in order to provide a desired output to an industrial application—for instance, in the case of providing heat to a steam generator, to ensure a consistent quality and amount of steam, and to ensure that the steam generator does not have to shut down. The controller may adjust the current and future output of heat in response to current or forecast reductions in the availability of charging electricity, so as to ensure across a period of future time that the state of charge of the storage unit does not reduce so that heat output must be stopped. By adjusting the continuous operation of a steam generator to a lower rate in response to a forecasted reduction of available input energy, the unit may operate continuously. The avoidance of shutdowns and later restarts is an advantageous feature: shutting down and restarting a steam generator is a time-consuming process that is costly and wasteful of energy, and potentially exposes personnel and industrial facilities to safety risks.

The forecast, in some cases, may be indicative of an expected lower electricity input or some other change in electricity input pattern to the thermal energy storage system. Accordingly, the control system may determine, based on the input forecast information, that the amount of energy that would be required by the thermal energy storage system to generate the heat necessary to meet the demands of the steam generator or other industrial application is lower than the amount of energy expected to be available. In one implementation, making this determination involves considering any adjustments to operation of the thermal energy storage system that may increase the amount of heat it can produce. For example, one adjustment that may increase an amount of heat produced by the system is to run the heating elements in a thermal storage assemblage at a higher power than usual during periods of input supply availability, in order to obtain a higher temperature of the assemblage and greater amount of thermal energy stored. Such "overcharging" or "supercharging" of an assemblage, as discussed further below, may in some implementations allow sufficient output heat to be produced through a period of lowered input energy supply. Overcharging may increase stresses on the thermal storage medium and heater elements of the system, thus increasing the need for maintenance and the risk of equipment failure.

As an alternative to operational adjustments for the thermal energy storage system, or in embodiments for which such adjustments are not expected to make up for a forecasted shortfall of input energy, action on either the source side or the load side of the thermal energy storage system may be initiated by the control system. On the input side, for example, the forecast difference between predicted and needed input power may be used to provide a determination, or decision-support, with respect to sourcing input electrical energy from other sources during an upcoming time period, to provide the forecasted difference. For example, if the forecasting system determines that the amount of electrical energy to be provided from a photovoltaic array will be 70% of the expected amount needed over a given period of time, e.g., due to a forecast of cloudy weather, the control system may effectuate connection to an alternative input source of electrical energy, such as wind turbine, natural gas or other source, such that the thermal energy storage system receives 100% of the expected amount of energy. In an implementation of a thermal energy storage system having an electrical grid connection available as an alternate input power source, the control system may effectuate connection to the grid in response to a forecast of an input power shortfall.

In a particular implementation, forecast data may be used to determine desired output rates for a certain number of hours or days ahead, presenting to an operator signals and information relating to expected operational adjustments to achieve those output rates, and providing the operator with a mechanism to implement the output rates as determined by the system, or alternatively to modify or override those output rates. This may be as simple as a "click to accept" feedback option provided to the operator, a dead-man's switch that automatically implements the determined output rates unless overridden, and/or more detailed options of control parameters for the system.

II. Heat Transport in TSU: Bricks and Heating Elements

A. Problems Solved by One or More Disclosed Embodiments

Traditional approaches to the formation of energy storage cells may have various problems and disadvantages. For example, traditional approaches may not provide for uniform heating of the thermal energy storage cells. Instead, they may use structures that create uneven heating, such as hot spots and cold spots. Non-uniform heating may reduce the efficiency of an energy storage system, lead to earlier equipment failure, cause safety problems, etc. Further, traditional approaches may suffer from wear and tear on thermal energy storage cells. For example, stresses such as mechanical and thermal stress may cause deterioration of performance, as well as destabilization of the material, such as cracking of the bricks.

B. Example Solutions Disclosed Herein

In some implementations, thermal storage blocks (e.g., bricks) have various features that facilitate more even distribution. As one example, blocks may be formed and positioned to define fluid flow pathways with chambers that are open to heating elements to receive radiative energy. Therefore, a given fluid flow pathway (e.g., oriented vertically from the top to bottom of a stack) may include two types of openings: radiation chambers that are open to a channel for a heating element and fluid flow openings (e.g., fluid flow slots) that are not open to the channel. The radiation chambers may receive infrared radiation from heater elements, which, in conjunction with conductive heating by the heater elements may provide more uniform heating of an assemblage of thermal storage blocks, relative to traditional implementations. The fluid flow openings may receive a small amount of radiative energy indirectly via the chambers, but are not directly open to the heating element. The stack of bricks may be used alone or in combination with other stacks of bricks to form the thermal storage unit, and one or more thermal storage units may be used together in the thermal energy storage system. As the fluid blower circulates the fluid through the structure during charge and discharge as explained above, a thermocline may be formed in a substantially vertical direction. Further, the fluid movement system may direct relatively cooler fluid for insulative purposes, e.g., along the insulated walls and roof of the structure. Finally, a venting system may allow for controlled cooling for maintenance or in the event of power loss, water loss, blower failure, etc., which may advantageously improve safety relative to traditional techniques.

Designs according to the present disclosure combine several key innovations, which together address these challenges and enable a cost-effective, safe, reliable high-temperature thermal energy storage system to be built and operated. A carefully structured solid media system according to the present teaching incorporates structured airflow passages which accomplish effective thermocline discharge; repeated mixing chambers along the direction of air flow which mitigate the thermal effects of any localized air channel blockages or nonuniformities; effective shielding of thermal radiation from propagating in the vertical direction; and a radiation chamber structure which uniformly and rapidly heats brick material with high heater power loading, low and uniform exposed surface temperature, and long-distance heat transfer within the storage media array via multi-step thermal radiation.

Innovative structures according to the present disclosure may comprise an array of bricks that form chambers. The bricks have structured air passages, such that in the vertical direction air flows upwards in a succession of open chambers and small air passages. In some embodiments, the array of bricks with internal air passages is organized in a structure such that the outer surface of each brick within the TSU core forms a wall of a chamber in which it is exposed to radiation from other brick surfaces, as well as radiation originating from an electrical heater.

The chamber structure is created by alternating brick materials into a checkerboard-type pattern, in which each brick is surrounded on all sides by open chambers, and each open chamber has adjacent bricks as its walls. In addition, horizontal parallel passages are provided that pass through multiple chambers. Electrical heating elements that extend horizontally through the array are installed in these passages. An individual heating element it may be exposed along its length to the interior spaces of multiple chambers. Each brick within such a checkerboard structure is exposed to open chambers on all sides. Accordingly, during charging, radiant energy from multiple heating elements heats all outer surfaces of each brick, contributing to the rapid and even heating of the brick, and reducing reliance on conductive heat transfer within the brick by limiting the internal dimensions of the brick.

The radiation chamber structure provides a key advance in the design and production of effective thermal energy storage systems that are charged by electrical energy. The large surface area, which is radiatively exposed to heaters, causes the average temperature of the large surface to determine the radiation balance and thus the surface temperature of the heater. This intrinsic uniformity enables a high wattage per unit area of heater without the potential of localized overheating. And exposed brick surfaces are larger per unit of mass than in prior systems, meaning that incoming wattage per unit area is correspondingly smaller, and consequently thermal stresses due to brick internal temperature differences are lower. And critically, re-radiation of energy—radiation by hotter brick surfaces that is absorbed by cooler brick surfaces—reduces by orders of magnitude the variations in surface temperature, and consequently reduces thermal stresses in brick materials exposed to radiant heat. Thus, the radiation chamber design effectively enables heat to be delivered relatively uniformly to a large horizontally oriented surface area and enables high wattage per unit area of heater with relatively low wattage per unit area of brick.

Note that while this configuration is described in terms of "horizontal" and "vertical", these are not absolute degree or angle restrictions. Advantageous factors include maintaining a thermocline and providing for fluid flow through the stack in a direction that results in convective heat transfer, exiting the stack at a relatively hotter portion of the thermocline. An additional advantageous factor that may be incorporated is to position the stack in a manner that encourages buoyant, hot air to rise through the stack and exit at the hot end of the thermocline; in this case, a stack in which the hot end of the thermocline is at a higher elevation than the cold end of the thermocline is effective, and a vertical thermocline maximizes that effectiveness.

An important advantage of this design is that uniformity of heating element temperature is strongly improved in designs according to the present disclosure. Any variations in brick heat conductivity, or any cracks forming in a brick that result in changed heat conductivity, are strongly mitigated by radiation heat transfer away from the location with reduced conductivity. That is, a region reaching a higher temperature than nearby regions due to reduced effectiveness of internal conduction will be out of radiation balance with nearby surfaces, and will as a result be rapidly cooled by radiation to a temperature relatively close to that of surrounding surfaces. As a result, both thermal stresses within solid media, and localized peak heater temperatures, are reduced by a large factor compared to previous teachings.

The system may include one or more air blowing units including any combination of fans and, blowers, and configured at predefined positions in the housing to facilitate the controlled flow of air between a combination of the first section, the second section, and the outside environment. The first section may be isolated from the second section by a thermal barrier. The air blowing units may facilitate the flow of air through at least one of the channels of the bricks from the bottom end of the cells to the upper end of the cells in the first section at the predefined flow rate, and then into the second section, such that the air passing through the bricks and/or heating elements of the cells at the predefined flow rate may be heated to a second predefined temperature, and may absorb and transfer the thermal energy emitted by the heating elements and/or stored by the bricks within the second section. The air may flow from the second section across a steam generator or other heat exchanger containing one or more conduits, which carry a fluid, and which, upon receiving the thermal energy from the air having the second predefined temperature, may heat the fluid flowing through the conduit to a higher temperature or may convert the fluid into steam. Further, the system may facilitate outflow of the generated steam from the second end of the conduit, to a predefined location for one or more industrial applications. The second predefined temperature of the air may be based on the material being used in conduit, and the required temperature and pressure of the steam. In another implementation, the air leaving the second section may be delivered externally to an industrial process.

Additionally, the example implementations described herein disclose a resistive heating element. The resistive heating element may include a resistive wire. The resistive wire may have a cross-section that is substantially round, elongated, flat, or otherwise shaped to admit as heat the energy received from the input of electrical energy.

Passive Cooling

FIG. 6 provides an isometric view of the thermal storage unit with multiple vent closures open, according to some implementations. Therefore, FIG. 6 may represent a maintenance or failsafe mode of operation. As shown, the thermal storage unit also includes an inner enclosure 623. The outer surface of inner enclosure 623 and the inner surface of the outer enclosure define a fluid passageway through which fluid may be conducted actively for dynamic cooling or passively for failsafe operation.

Inner enclosure 623 includes two vents 615 and 617 which include corresponding vent closures in some implementations (portions of vent door 613, in this example). In some implementations, vents 615 and 617 define respective passages between an interior of the inner enclosure 623 and an exterior of the inner enclosure. When the external vent closure 603 is open, these two vents are exposed to the exterior of the outer enclosure as well.

As shown, vent 615 may vent heated fluid from the thermal storage blocks conducted by duct 619. The vent 617 may allow entry of exterior fluid into the fluid passageway and eventually into the bottoms of the thermal storage block assemblies via louvers 611 (the vent closure 609 may remain closed in this situation). In some implementations, the buoyancy of fluid heated by the blocks causes it to exit vent 615 and a chimney effect pulls external fluid into the outer enclosure via vent 617. This external fluid may then be directed through louvers 611 due to the chimney effect and facilitate cooling of the unit. Speaking generally, a first vent closure may open to output heated fluid and a second vent closure may open to input external fluid for passive venting operation.

During passive cooling, the louvers 611 may also receive external fluid directly, e.g., when vent closure 609 is open. In this situation, both vents 615 and 617 may output fluid from the inner and outer enclosures.

Vent door 613 in the illustrated implementation, also closes an input to the steam generator when the vents 615 and 617 are open. This may prevent damage to steam generator components (such as water tubes) when water is cut off, the blower is not operating, or other failure conditions. The vent 617 may communicate with one or more blowers which may allow fluid to passively move through the blowers even when they are not operating. Speaking generally, one or more failsafe vent closure may close one or more passageways to cut off fluid heated by the thermal storage blocks and reduce or avoid equipment damage.

When the vent door 613 is closed, it may define part of the fluid passageway used for dynamic insulation. For example, the fluid movement system may move fluid up along one wall of the inner enclosure, across an outer surface of the vent door 613, across a roof of the inner enclosure, down one or more other sides of the inner enclosure, and into the thermal storage blocks (e.g., via louvers 611). Louvers 611 may allow control of fluid flow into assemblages of thermal storage blocks, including independent control of separately insulated assemblages in some implementations.

In the closed position, vent door 613 may also define an input pathway for heated fluid to pass from the thermal storage blocks to duct 619 and beneath the vent door 613 into the steam generator to generate steam.

In some implementations, one or more of vent door 613, vent closure 603, and vent closure 609 are configured to open in response to a nonoperating condition of one or more system elements (e.g., nonoperation of the fluid movement system, power failure, water failure, etc.). In some implementations, one or more vent closures or doors are held in a closed position using electric power during normal operation and open automatically when electric power is lost or in response to a signal indicating to open.

In some implementations, one or more vent closures are opened while a fluid blower is operating, e.g., to rapidly cool the unit for maintenance.

Thermoelectric Power Generation

1. Problems to be Solved

Gasification is the thermal conversion of organic matter by partial oxidation into gaseous product, consisting primarily of $H_2$, carbon monoxide (CO), and may also include methane, water, $CO_2$ and other products. Biomass (e.g., wood pellets), carbon rich waste (e.g. paper, cardboard) and even plastic waste can be gasified to produce hydrogen rich syngas at high yields with high temperature steam, with optimum yields attained at >1000° C. The rate of formation of combustible gases are increased by increasing the temperature of the reaction, leading to a more complete conversion of the fuel. The yield of hydrogen, for example, increases with the rise of reaction temperature.

Turning waste carbon sources into a useable alternative energy or feedstock stream to fossil fuels is a potentially highly impactful method for reducing carbon emissions and valorizing otherwise unused carbon sources.

2. Thermoelectric Power Generation

Indirect gasification uses a Dual Fluidized Bed (DFB) system consisting of two intercoupled fluidized bed reactors—one combustor and one gasifier—between which a considerable amount of bed material is circulated. This circulating bed material acts as a heat carrier from the combustor to the gasifier, thus satisfying the net energy demand in the gasifier originated by the fact that it is fluidized solely with steam, i.e., with no air/oxygen present, in contrast to the classical approach in gasification technology also called direct gasification. The absence of nitrogen and combustion in the gasifying chamber implies the generation of a raw gas with much higher heating value than that in direct gasification. The char which is not converted in the gasifying chamber follows the circulating bed material into the combustor, which is fluidized with air, where it is combusted and releases heat which is captured by the circulating bed material and thereby transported into the gasifier in order to close the heat balance of the system.

Referring to FIG. 4, in some example implementations, the thermal energy storage structure 403 can be integrated directly with a steam power plant to provide an integrated cogeneration system 400 for a continuous supply of hot air, steam and/or electrical power for various industrial applications. Thermal storage structure 403 may be operatively coupled to electrical energy sources 401 to receive electrical energy and convert and store the electrical energy in the form of thermal energy. In some implementations, at least one of the electrical energy sources 401 may comprise an input energy source having intermittent availability. However, electrical energy sources 401 may also include input energy sources having on-demand availability, and combinations of intermittent and on-demand sources are also possible and contemplated. The system 403 can be operatively coupled to a heat recovery steam generator (HRSG) 409 which is configured to receive heated air from the system 403 for converting the water flowing through conduits 407 of the HRSG 409 into steam for the steam turbine 415. In an alternative implementation, HRSG 409 is a once-through steam generator in which the water used to generate steam is not recirculated. However, implementations in which the water used to generate steam is partially or fully circulated as shown in FIG. 4 are also possible and contemplated.

A control unit can control the flow of the heated air (and more generally, a fluid) into the HRSG 409, based on load demand, cost per KWH of available energy source, and thermal energy stored in the system. The steam turbine 415 can be operatively coupled to a steam generator 409, which can be configured to generate a continuous supply of electrical energy. Further, the steam turbine 415 can also release a continuous flow of relatively lower-pressure 421 steam as output to supply an industrial process. Accordingly, implementations are possible and contemplated in which steam is received by the turbine at a first pressure and is output therefrom at a second, lower pressure, with lower pressure steam being provided to the industrial process. Examples of such industrial process that may utilize the lower pressure output steam include (but are not limited to) production of liquid transportation fuels, including petroleum fuels, biofuel production, production of diesel fuels, production of ethanol, grain drying, and so on.

The production of ethanol as a fuel from starch and cellulose involves aqueous processes including hydrolysis, fermentation and distillation. Ethanol plants have substantial electrical energy demand for process pumps and other equipment, and significant demands for heat to drive hydrolysis, cooking, distillation, dehydrating, and drying the biomass and alcohol streams. It is well known to use conventional electric power and fuel-fired boilers, or fuel-fired cogeneration of steam and power, to operate the fuel production process. Such energy inputs are a significant source of $CO_2$ emissions, in some cases 25% or more of total $CO_2$ associated with total agriculture, fuel production, and transportation of finished fuel. Accordingly, the use of renewable energy to drive such production processes is of value. Some ethanol plants are located in locations where excellent solar resources are available. Others are located in locations where excellent wind and solar resources are available.

The use of electrothermal energy storage may provide local benefits in such locations to grid operators, including switchable electricity loads to stabilize the grid; and intermittently available grid electricity (e.g., during low-price periods) may provide a low-cost continuous source of energy delivered from the electrothermal storage unit.

The use of renewable energy (wind or solar power) as the source of energy charging the electrothermal storage may deliver important reductions in the total. $CO_2$ emissions involved in producing the fuel, as up to 100% of the driving electricity and driving steam required for plant operations may come from cogeneration of heat and power by a steam turbine powered by steam generated by an electrothermal storage unit. Such emissions reductions are both valuable to the climate and commercially valuable under programs which create financial value for renewable and low-carbon fuels.

The electrothermal energy storage unit having air as a heat transfer fluid may provide other important benefits to an ethanol production facility, notably in the supply of heated dry air to process elements including spent grain drying. One useful combination of heated air output and steam output from a single unit is achieved by directing the outlet stream from the HRSG to the grain dryer. In this manner, a given amount of energy storage material (e.g., brick) may be cycled through a wider change in temperature, enabling the storage of extra energy in a given mass of storage material. There may be periods where the energy storage material temperature is below the temperature required for making steam, but the discharge of heated air for drying or other operations continues.

In some implementations thermal storage structure 403 may be directly integrated to industrial processing systems in order to directly deliver heat to a process without generation of steam or electricity. For example, thermal storage structure 403 may be integrated into industrial systems for manufacturing lime, concrete, petrochemical processing, or any other process that requires the delivery of high temperature air or heat to drive a chemical process. Through integration of thermal storage structure 403 charged by VRE, the fossil fuel requirements of such industrial process may be significantly reduced or possibly eliminated.

The control unit can determine how much steam is to flow through a condenser 419 versus steam output 421, varying both total electrical generation and steam production as needed. As a result, the integrated cogeneration system 400 can cogenerate steam and electrical power for one or more industrial applications.

If implemented with an OTSG as shown in FIG. 3 instead of the recirculating HRSG shown in FIG. 5, the overall integrated cogeneration system 400 can be used as thermal storage once-through steam generator (TSOTG) which can be used in oil fields and industries to deliver wet saturated steam or superheated dry steam at a specific flow rate and steam quality under automated control. High temperature delivered by the bricks and heating elements of the system 403 can power the integrated heat recovery steam generator (HRSG) 409. A closed air recirculation loop can minimize heat losses and maintain overall steam generation efficiency above 98%.

The HRSG 409 can include a positive displacement (PD) pump 411 under variable frequency drive (VFD) control to deliver water to the HRSG 409. Automatic control of steam flow rate and steam quality (including feed-forward and feed-back quality control) can be provided by the TSOTG 400. In an exemplary example implementation, a built-in Local Operator Interface (LOI) panel operatively coupled to system 400 and the control unit can provide unit supervision and control. Further, thermal storage structure 403 can be connected to a supervisory control and data acquisition system (SCADA)) associated with the steam power plant (or other load system). In one implementation, a second electrical power source is electrically connected to the steam generator pumps, blowers, instruments, and control unit.

In some implementations, system 400 may be designed to operate using feedwater with substantially dissolved solids; accordingly, a recirculating boiler configuration is impractical. Instead, a once-through steam generation process can be used to deliver wet steam without the buildup of mineral contaminants within the boiler. A serpentine arrangement of conduits 407 in an alternative once-through configuration of the HRSG 409 can be exposed to high-temperature air generated by the thermal storage structure 403, in which preheating and evaporation of the feedwater can take place consecutively. Water can be forced through the conduits of HRSG 409 by a boiler feedwater pump, entering the HRSG 409 at the "cold" end. The water can change phase along the circuit and may exit as wet steam at the "hot" end. In one implementation, steam quality is calculated based on the temperature of air provided by the thermal storage structure 403, and feedwater temperatures and flow rates, and is measured based on velocity acceleration at the HRSG outlet. Embodiments implementing a separator to separate steam from water vapor and determine the steam quality based on their relative proportions are also possible and contemplated.

In the case of an OTSG implementation, airflow (or other fluid flow) can be arranged such that the hottest air is nearest to the steam outlet at the second end of the conduit. An OTSG conduit can be mounted transversely to the airflow path and arranged in a sequence to provide highly efficient heat transfer and steam generation while achieving a low cost of materials. As a result, other than thermal losses from energy storage, steam generation efficiency can reach above 98%. The prevention of scale formation within the tubing is an important design consideration in the selection of steam quality and tubing design. As water flows through the serpentine conduit, the water first rises in temperature according to the saturation temperature corresponding to the pressure, then begins evaporating (boiling) as flow continues through heated conduits.

As boiling occurs, volume expansion causes acceleration of the rate of flow, and the concentration of dissolved solids increases proportionally with the fraction of liquid phase remaining. Maintaining concentrations below precipitation concentration limits is an important consideration to prevent scale formation. Within a bulk flow whose average mineral precipitation, localized nucleate and film boiling can cause increased local mineral concentrations at the conduit walls. To mitigate the potential for scale formation arising from such localized increases in mineral concentration, conduits which carry water being heated may be rearranged such that the highest temperature heating air flows across conduits which carry water at a lower steam quality, and that heating air at a lower-temperature flows across the conduits that carry the highest steam quality flow.

Returning to FIG. 6, various implementations are contemplated in which a fluid movement device moves fluid across a thermal storage medium, to heat the fluid, and subsequently to an HRSG such as HRSG 409 for use in the generation of steam. In one implementation, the fluid is air. Accordingly, air circulation through the HRSG 409 can be forced by a variable-speed blower, which serves as the fluid movement device in such an embodiment. Air temperature can be adjusted by recirculation/mixing, to provide inlet air temperature that does not vary with the state of charge of the bricks or other mechanisms used to implement a thermal storage unit. The HRSG 409 can be fluidically coupled to a steam turbine generator 415, which upon receiving the steam from the HRSG 409, causes the production of electrical energy using generator 417. Further, the steam gas turbine 415 in various embodiments releases low-pressure steam that is condensed to a liquid by a condenser 419, and then de-aerated using a deaerator 413, and again delivered to the HRSG 409.

III. Steam Cracking System

Section III of the Detailed Description relates to the newly added disclosure of this continuation-in-part application. In the following description, the thermal energy storage system, thermal storage medium, processes for use and variations thereon may be any of the range of implementations described throughout this continuation-in-part application, including in any combination with the variations discussed above that were described in the aforementioned U.S. Pat. No. 11,603,776.

Conventional Steam Cracking

Steam cracking is a common petrochemical process that breaks down saturated hydrocarbons such as naphtha or ethane into smaller, usually unsaturated hydrocarbons. It is the primary industrial process in producing lighter alkenes such as propylene and ethylene which are very common chemical building blocks for a variety of products such as plastics (polyethylene). For this reason, many petrochemical plants have a steam cracker unit on site. Steam cracking involves mixing a saturated hydrocarbon with steam and exposing the mixture to very high temperatures for very short periods of time in the absence of oxygen and sometimes in the presence of a catalyst. Reaction temperatures vary on the desired product and the feedstock used, but are often above 850° C. Once the mixture has reached the reaction temperature, the mixture is quenched (cooled rapidly) to stop the reaction. The reaction residence time is in the order of milliseconds and flow rates in the reaction zone approach the speed of sound. The process is mature and very sensitive to change. The composition of the feedstock, the ratio of feedstock to steam in the mixture, the cracking temperature, and residence time determine the chemical product produced by the reaction. The process occurs in steam cracking furnaces. Because of the sensitivity of the reaction, there is not much drastic variation in the designs of operating steam cracking furnaces.

A conventional steam cracking process often includes two main zones: the "radiant zone" and a "convective" zone. The feed stream (often naphtha or ethane with steam) is cracked in the "radiant zone" of the reactor furnace. This entails a highly preheated feed stream flowing at rates that approach the speed of sound, exposed to high-temperature radiant heat from hydrocarbon fuel-fired burners, with residence times on the order of milliseconds. The burners supplying the radiant heat conventionally use some fuel (natural gas, fuel grade waste gas from downstream) with air. High flame temperatures are required to supply sufficient heat rates to heat the feedstock stream to reaction temperature very quickly. The high-temperature flames heat reaction tubes containing the feedstock. Often, the radiant zone and convective zone are vertically stacked upon one another with the radiant zone at the bottom such that heat contained in the exhaust (flue) gas produced by burners in the radiant zone is recovered in the convective zone.

The furnace can take the form of a tower with flue gas temperatures decreasing with height as heat is recovered in the convective zone to maximize exergetic efficiency. The radiant zone at the bottom contains burners that emit a large amount of heat. The radiant reaction tubes pick up a fraction of the heat released by the burners for the cracking reaction. This fraction is referred to as the box efficiency. A box efficiency may be under 50% such as 41%. In conventional systems, the combination of the high temperature and the high heat rate requirements lead to low box efficiencies and consequentially large amounts of waste heat. The unabsorbed heat in the radiant zone exits as high temperature (~1100° C.) flue gas (the combustion products include $H_2O$, $CO_2$, and other emissions).

The flue gas of the combustion in the radiant zone burners are carried up the plant or tower where the heat of the flue gas is absorbed in the "convection" (also referred to as "convective" in this writeup) zone of the steam cracking plant. The flue gas is typically cooled to as low a temperature as is practical (such as ~100° C.) to maximize the use of input fuel, through an array of heat exchangers in the convection zone, before being released to the environment. An array of convective coils or convection banks contain various streams that absorb heat for use in the steam cracking reaction or for another use elsewhere in the plant. The thermal integration of these plants is generally very good, with overall thermal efficiencies typically above 90%.

Conventionally, in order to minimize exergy loss, the streams to capture heat are ordered such that streams that are heated to lower temperatures interact with the cooler flue gas toward the top of the furnace, and the streams that are heated to a higher temperature are located lower down, closer to the radiant zone where the flue gas is hottest.

Figure 7:
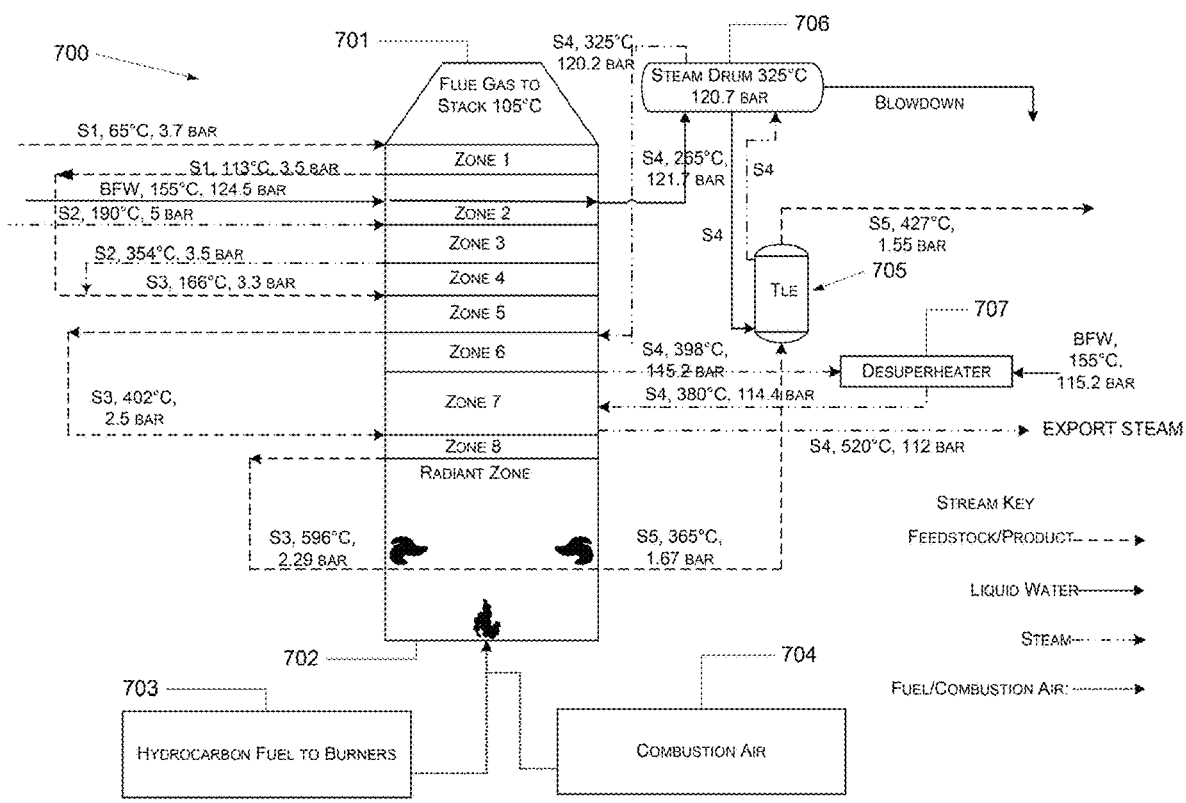
FIGS. 7 to 17 include new disclosure of this continuation-in-part application.

An example flow diagram of a conventional steam-cracking furnace is designated generally by reference number 700 in FIG. 7, depicting how the streams heated in the convection banks are located based on temperature. This is described in greater detail below.

Conventionally, the following may be heated in this order, with some variations possible: the hydrocarbon feedstock (typically Naphtha or ethane); boiler feedwater; dilution steam to be mixed with the feedstock; high-pressure steam for use elsewhere in a plant; and the steam/feedstock mixture. Often high-pressure steam is generated for use in a steam turbine to supply power for a plant. Export steam generated may be used for some other industrial process in the plant. There is a large demand for export steam, since steam crackers are usually in petrochemical plants with several other adjacent steam consuming processes. Waste heat is also recovered from the produced, cracked gas.

Once the feedstock reaches reaction temperature, the product is rapidly quenched, typically in a transfer line heat exchanger, by high-pressure boiler feedwater or in a quenching header using quench oil. Whether quench oil or water is used as a cooling medium for the quench, heat is further recovered from the heated-up quench fluid. When water is used for the quench, steam is generated and often sent to a steam drum where generated steam can be further superheated in the convection zone. The quenched cracked gas is often sent to a fractionator to separate out the desired product from undesired or unconverted feedstock. This unconverted or undesired waste gas can be directed to the burners to supply additional heat to the radiant zone.

Conventional Steam Cracking Furnace

FIG. 7 shows a simplified flowsheet example of a conventional steam cracking furnace 700. The figure shows a tower which is broken up into a flue stack exit at the top 701, 8 zones and a radiant zone. The 8 zones are for illustrative purposes and represent sections of the convective zone that have different temperature flue gas. Different streams are numbered differently (S1, S2, etc.) and BFW refers to liquid boiler feedwater. The temperatures and pressures of the streams as illustrated in the figure are based on an example, conventional processes and are provided as example values to give a sense of how the streams in the convective section operate. Example flow rates are omitted from the figure for readability but may contribute to confusing temperature swings of certain streams. Some streams shown have significantly different flow rates than others.

At the bottom 702 of the furnace, hydrocarbon fuel 703 and combustion air 704 are brought together and combusted in the furnace. The flame icons represent side and bottom fired burners supplying heat to the feedstock/steam stream S3 that exits the bottom left of convective zone 8 at an example temperature and pressure of 596° C. and 2.29 bar. The reaction tubes are not explicitly shown, but the S3 stream crossing the radiant zone is where the cracking reaction occurs to become cracked gas product stream S5 at example reaction temperature and pressure of, respectively, 865° C. and 1.67 bar. Although not shown, flue gas generated by combustion in the burners rises from the radiant zone to enter zone 8 where the flue gas may be at an example temperature of 1120° C. The flue gas then travels up through the convection section from zone 8 to zone 1, where example flue temperatures at the bottom of the zone are 1120° C., 920° C., 780° C., 660° C., 420° C., 360° C., and 170° C. After exiting zone 1, the flue gas may leave the stack at a temperature of 105° C.

Starting from the top left of zone 1, the pressurized hydrocarbon feedstock (naphtha in this case) stream S1 enters the convection bank at 65° C. and 3.7 bar in order to be preheated. S1 then exits at the bottom left of zone 1 at a temperature of 113° C. and 3.5 bar. Not shown in the simplified figure are the heat exchange coils or piping that make up the convection bank where flue gas indirectly transfers heat to the streams. Entering in the middle left of zone 2, high pressure boiler feedwater (BFW) from the petrochemical plant's BFW system at 155° C. and 124.5 bar gets preheated so as to enter the export steam drum at 265° C. and 121.7 bar. Dilution process steam S2 enters the convection bank at the top left of zone 3 at 190° C. and 5 bar and gets superheated to exit at the bottom left of zone 3 at 354° C. and 3.5 bar. Superheated dilution steam S2 is then mixed with the hydrocarbon feedstock S1 to form a feedstock/steam mixture S3 at 166° C. and 3.3 bar. S3 enters the convection bank at the top left of zone 5 for further preheating. S3 exits at the bottom left of zone 5 at 402° C. and 2.5 bar. S3 then gets preheated for a final time in zone 8, exiting zone 8 at 596° C. and 2.29 bar. The hydrocarbon/steam mixture is raised to the highest temperature possible before undesired side reactions occur. The fully preheated S3 is then sent to the radiant zone where the cracking reaction occurs. The product stream S5 is cracked product gas at the reaction temperature of 865° C. and 1.67 bar that contains the desired chemical product and unconverted feedstock and steam. S5 is immediately quenched in a transfer line heat exchanger (TLE) 705. Here high-pressure saturated liquid boiler feedwater from the steam drum 706 indirectly exchanges heat with the hot product stream S5. The transfer line heat exchanger is configured such that the cracked gas product first exchanges heat with high-pressure boiler feedwater at near saturated liquid conditions. The feed water and the product gas S5 move through the heat exchanger in the same direction such that the feed water gets vaporized into a saturated vapor/liquid mix as it moves through the heat exchanger. Because the cooling water side of the heat exchanger is changing phases as heat is added, the water/steam coolant remains at a constant temperature of about 325° C. throughout a large portion of heat exchange with the cracked gas. The water side may exit as saturated steam or superheated steam. S5 eventually exits the TLE at 427° C. and 1.55 bar. This cracked gas stream is quenched and ready to enter the next step in its chemical processing, often fractionization. The generated steam exits the TLE to return to the steam drum providing heat to the steam drum. Saturated steam S4 at 325° C. and 120.2 bar exits the steam drum to enter zone 6 for superheating. S4 exits zone 6 at 398° C. and 115.2 bar and then enters a desuperheater 707 where boiler feed water (BFW) at a matching pressure and lower temperature of 155° C. joins the stream. S4 then has an increased flow rate but with a lower degree of superheat as the temperature is reduced to 380° C. S4 then enters zone 7 to get superheated again so that S4 exits zone 7 at 520° C. and 112 bar. S4 is then used elsewhere in the plant, likely in a steam turbine to generate plant or export power. Once expanded across the turbine, the steam may either be condensed to maximize power generation or not condensed such that lower pressure and temperature steam can be used elsewhere in the plant such as a source for dilution steam S2 entering the steam cracking furnace at zone 3. The order of heat exchange in streams is designed to maximize heat recovery of the waste heat from the burner exhaust flue.

Despite the exceptional heat recovery, this prevalent and important process in systems currently in use emits a large amount of greenhouse gas emissions. Given the global push for rapid decarbonization to slow the damaging effects of climate change, several proposals to reduce the carbon intensity of the steam cracking process have been explored and tested with some adapted. However, given the high level of plantwide thermal integration that is standard in operating steam cracking furnaces, new technology is difficult to incorporate into existing, mature plant designs. A large part of the reason for this is that existing plants are designed around utilizing the heating duty of the flue gas from combustion in the radiant zone. Many sustainable innovations in steam cracking involve reducing (or eliminating) flue gas emissions produced in burners in the radiant zone.

There is accordingly a demand for technology that replaces the reduced or eliminated heat duty from flue gas without contributing to carbon emissions and without being overly intrusive to the conventional process. One of the more promising ways to reduce emissions and replace heat otherwise supplied via hydrocarbon combustion is with electricity. Electrical energy can be converted to thermal energy at 100% efficiency and at high temperatures that compete with flame temperatures. Additionally, electricity can be renewably generated without any direct emissions. Renewable generation technologies such as solar PV and wind turbines have seen a massive decrease in capital costs over the last couple of decades. Perhaps the largest downside of renewables such as solar and wind turbines is that they are intermittent resources. A solar field will not generate when the sun is not out, and wind turbines will not generate when the wind is not blowing. Many industrial processes, including steam cracking, run continuously, only shutting down for required maintenance. If intermittent renewable energy is to be used in such processes, the generated energy must be stored when the energy is available but delivered on a continuous basis. Electrochemical storage, such as lithium-ion batteries, is one option for this. Another option is a thermal energy storage (TES) system as described throughout this disclosure. A thermal energy storage system may be able to charge with intermittent electricity while continuously or (optionally) intermittently discharging heat for a use. There are several advantageous integrations of a thermal energy storage system with both conventional steam cracking processes and newer, sustainable steam cracking process improvements.

In the following description, it will be seen that TES (sometimes referred to herein as "heat battery") can be used as a supplementary hot gas generator to enable emission reducing technology in steam cracking processes. Such hot gas can replace flue gases and/or can preheat streams before contacting flue gas in a convective section. This disclosure also describes manners of TES integration with an electric cracker in a steam cracking process. Unless otherwise noted, FIGS. 8-15 include all the same streams (S1, S2, S3, BFW, etc.) and zones as illustrated in the flow diagram of the conventional steam cracking plant of FIG. 7. In addition, process components having the same two digit ending (e.g., 705, 805, 905, etc.) are considered identical or very similar in function.

As mentioned above, in a conventional steam cracker, the feed stream is cracked in the radiant zone of the reactor furnace. The burners supplying the radiant heat are conventionally fired by a hydrocarbon fuel (such as natural gas or fuel grade waste gas from downstream) with air. High flame temperatures are required to supply sufficient heat very quickly to the material stream. The flue gas from the combustion in the burners is released to the environment after recovering heat.

Several issues arise here. The high flame temperatures in the presence of relatively high concentration of nitrogen gas from air leads to the formation of NOx, a strictly regulated emission that imposes hard limitations on plant operations worldwide. Often, the flame temperature is limited by concerns about NOx formation when air is used for combustion air. Given the importance of heating rate in the radiant section, a constraint on flame temperature can have a significant disadvantage. In order to achieve a sufficient heating rate of the feedstock, more fuel must be burned at a lower flame temperature. As flame temperature increases, heating rate can be retained with far less fuel given that radiant heat transfer rate scales with temperature to the power of 4 (per the Stefan-Boltzmann law).

Secondly, the combustion of air and fuel creates flue gas with low $CO_2$ compositions and high nitrogen compositions. This makes the isolation and capture of carbon dioxide for sequestration in this process very difficult and energy intensive. Carbon capture and sequestration is being considered and adopted in several other high-temperature industrial processes as a way to reduce the carbon intensity of a process. Oxyfuel technology includes the external production of oxygen, in an air separation unit (ASU), so that the fuel is burned in an atmosphere with much lower concentrations of nitrogen, which inhibits the formation of NOx. Instead, the flue gas is composed of almost pure $CO_2$ and water, the primary stoichiometric products of combustion.

The flame temperature is also much higher since non-reactive nitrogen and argon are not consuming combustion energy. It is possible to recirculate flue gas to be mixed with a nearly pure oxygen and fuel mixture to control the flame temperature while maintaining a flue stream with easily separable $CO_2$. This is a way to mimic conventional air-fuel burner conditions to minimize modifications to the existing plant. If the product is captured, water can be easily condensed and knocked out of the stream, leading to a high purity stream of carbon dioxide to be captured and transported, thus reducing emissions to the atmosphere. Oxyfuel combustion also leads to higher box efficiencies (efficiency of heat transfer in the radiant zone) and smaller combustor units, resulting in dramatic decrease in flue gas volume compared to conventional fuel-fired furnaces.

Some disadvantages of oxyfuel burners are, first, that the flame characteristics change considerably due to the new chemical composition of the flame. Heat and mass transfer as well as reaction kinetics are different compared to the conventional case leading to new designs. Flame instabilities can also arise. Another is the electricity demand to produce nearly pure oxygen in an air separation unit (ASU). It requires a large amount of electricity to separate oxygen from air which can be costly for a facility. Finally, if retrofitting an existing steam cracking process with ox-fuel burners, there may be less flue gas than a conventional plant setup. This means that there is less heat available to the convection section, meaning feedstock preheating and export, high-pressure steam production may suffer.

The present invention includes a thermal battery (heat battery) that can address these issues in a variety of ways. The first is replacing the duty of the reduced flue gas in the convective section. By directly supplying hot gas that is generated by stored cheap grid electricity or intermittent renewables such as wind and solar, the plant can reap the benefits without needing to replace the missing heat from the reduced flue gas heat. Additionally, in some implementations the thermal storage system may circulate any gas composition which may aid in recirculating produced flue gas at higher temperatures, which improves overall energy efficiency. For example, the heat battery could recirculate nearly pure $CO_2$ after water vapor is removed or the full flue stream of $CO_2$ and water, maintaining a high $CO_2$ purity flue concentration in the convection section exit stream while also using the recirculated flue to stabilize the flame.

Figure 9:
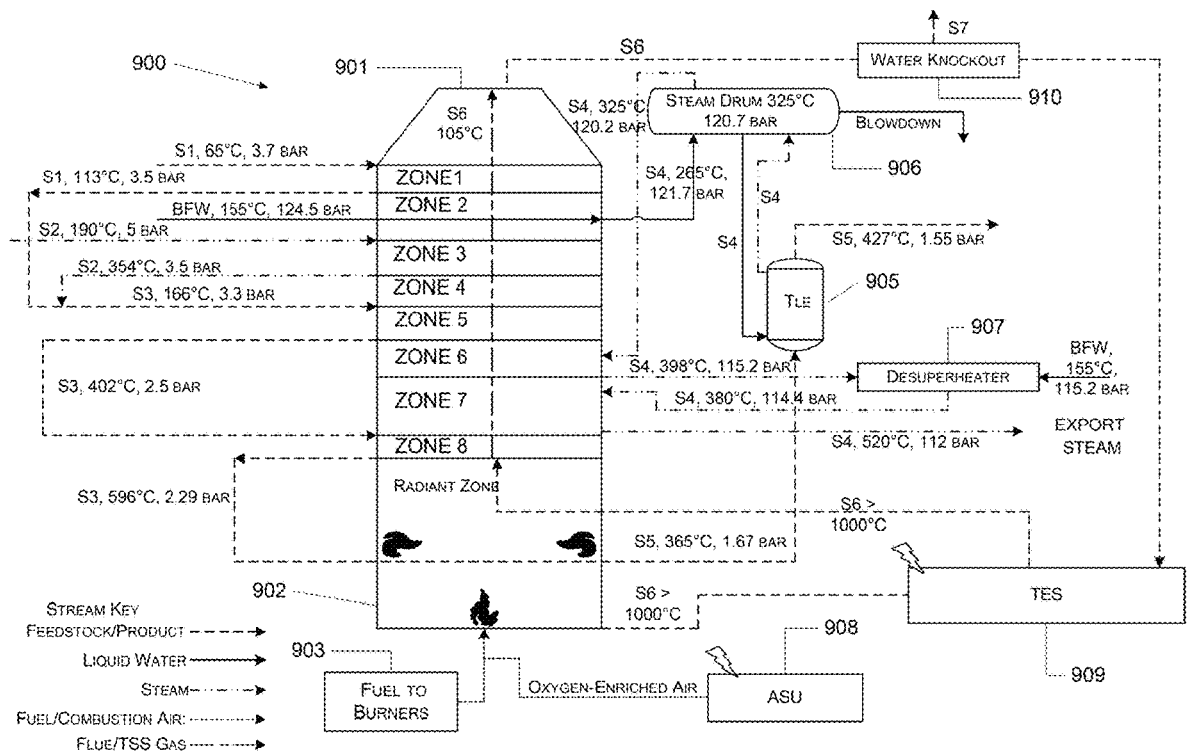

In FIG. 9, an example implementation of a thermal energy storage system (TES) 909 supporting the adoption of oxyfuel fired technology. An air separation unit (ASU) 908 uses electricity to supply oxygen-enriched air (or pure oxygen) to the fuel burners 903. The fuel may be hydrocarbon and/or hydrogen. The heat battery or thermal energy storage system (TES) 909 supplies heat in the form of hot gas S6 to the cracking furnace at the burners in the radiant zone and/or just before entering the convection section (zones 1-8). The hot gas may be injected into the burners in order to stabilize the flame. Although not shown in the figure, the TES 909 may also preheat the oxygen and/or fuel prior to entering the burner to raise the flame temperature that is no longer limited by the risk of NOx production.

Metallurgical constraints may still limit the flame temperature. The hot gas heated by the TES 909 may be recirculated $CO_2$ or flue gas from the exit of the convection section. Once the hot gas from the TES 909 is injected into the furnace, the flue gas from combustion and the hot gas continues up the convection zone of the furnace. The TES 909 may discharge hot gas at specific temperatures and/or flow rates such that the combined flue gas stream mimics the heat transfer characteristics of a conventional process. This enables the adoption of oxy-fired technology without a modification to the convection zone of a conventional steam cracking process. The combined flue and hot gas stream (S6 at the top of the furnace in the diagram) may be at a temperature of 105° C. at the outlet of the convection zone.

In one embodiment, the TES hot gas is recirculated as shown (stream S6), and the composition of this stream S6 is nearly pure $CO_2$ and water vapor. The stream S6 may be cooled for the purpose of removing water vapor via condensation (shown as water knockout 910 in FIG. 9). A portion of the now nearly pure $CO_2$ stream may be exported as stream S7 at the top of the figure. This export $CO_2$ may be compressed in order to be transported via pipeline for commercial use such as carbonated beverage production, for enhanced oil recovery, or for geologic sequestration. The remainder of the stream may be recirculated back to the TES 909 to continue the cycle.

Figure 10:
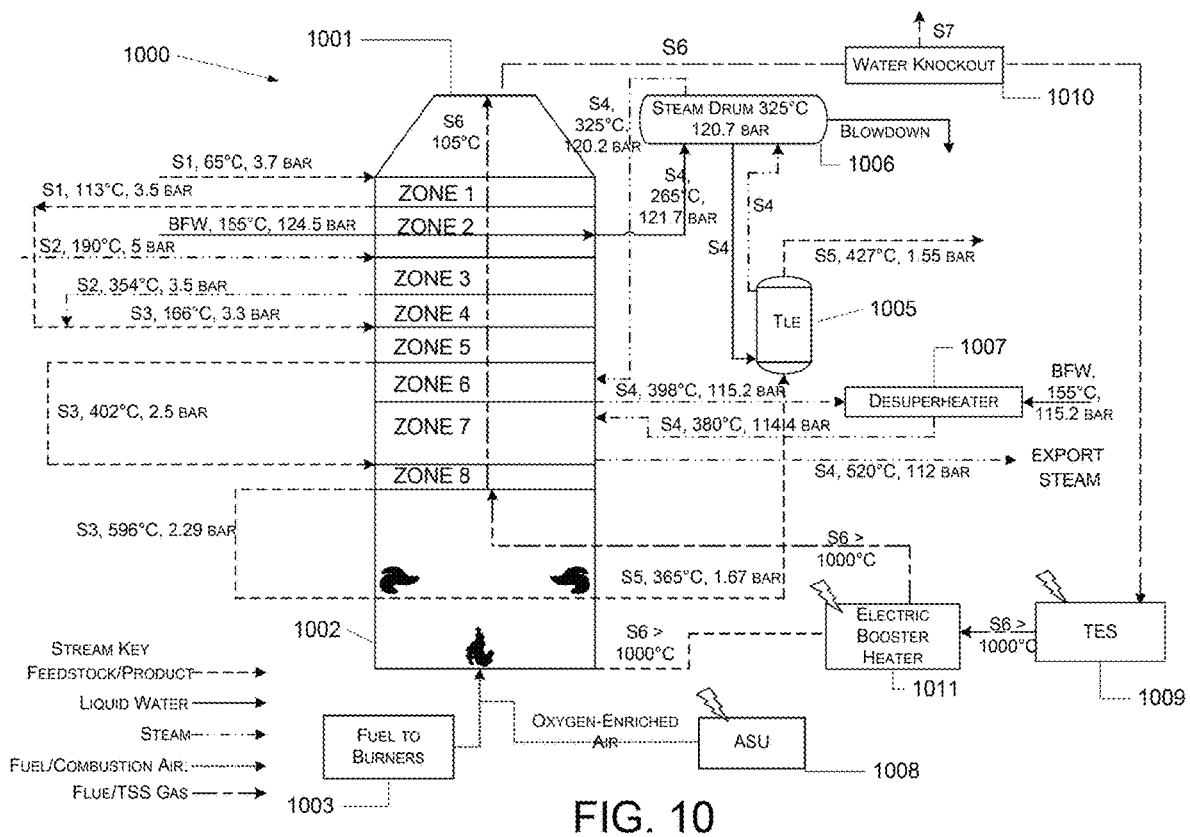

FIG. 10 shows a similar integration with an oxyfuel fired system of FIG. 9 with the only change being the use of an electric booster heater 1011 to further raise the temperature of the gas heated by the TES 1009 to higher temperatures.

New heat recovery methods (e.g., high-emissivity coatings) have been designed in way that reduce fuel consumption and carbon emissions of conventional steam-cracking furnaces by up to 30%. However, again this comes at the cost of a reduced convective section heat duty since the design aims at directing as much energy as possible to the process duty of cracking in the radiant section. Another innovation that is beginning to be used is applying high-emissivity coating to the radiant zone reactor tubes. The coatings allow uniform emissivity over wide temperature ranges. This allows for more effective radiant heat transfer from the flame to the process material which ultimately improves the box efficiency. The advantage of this is that less fuel needs to be burned in order to crack the same amount of process material. More heat from the combustion is absorbed by the radiant coils where the cracking reaction is occurring meaning that less energy is spent heating the furnace refractory lining (thus lowering the exterior temperature of the furnace and having less energy lost to the environment), and less energy is lost in the flue gas. The main advantage of this is lower fuel consumption in the radiant section which reduces total plant emissions. Some other reported advantages are a higher ethylene yield, higher furnace thermal efficiency, and increase in overall furnace performance. The reduced temperature of the furnace's refractory lining also minimizes shrinkage and reduces maintenance. A disadvantage of this technology is that less heat exits with the flue gas stream.

As mentioned with the oxyfuel case, the convection sections (see zones 1-8 in FIGS. 8-10) are conventionally designed to generate high-pressure steam and preheat the reaction feedstock material. As a result, with this modification the flue gas contains less heat. Embodiments of the present invention can replace this heat in various manners. For example, hot gas heated by the thermal energy storage system (TES) may be injected in line with the flue stream from the radiant zone. This increases the total flue gas volume and matches the temperature of the combined flue stream, to mimic the conditions of a conventional convection zone. This allows an existing steam cracking furnace to lower fuel consumption in the radiant section without diminishing the heat in the convection section. A thermal energy storage system according to the present disclosure can replace the heat conventionally supplied by burning hydrocarbon fuel. Since the TES is able to store heat derived from electrical energy that may be renewably sourced, direct carbon emissions can be reduced.

In another implementation, the TES or heat battery injects gas along the refractory linings. This allows for a uniform, cooler refractory wall temperature, decreasing heat losses from the furnace lining, improving furnace thermal efficiency and increasing lifetime in the refractory by minimizing hotspots and lowering temperature, while still providing enough gas to provide the designed amount heat to the steam and preheat coils. An embodiment of the present invention may also be configured such that the TES injects a variety of gas compositions, such as pure $CO_2$ (for oxyfuel case), recirculated flue gas (to minimize losses in exit stream), or air.

The above-described reduction in the amount of heat in the flue gas available in the convection section can result in lower production of high-pressure steam, which can have significant impacts on the normal operation of a petrochemical plant in which the steam cracking furnace is located. Export, high-pressure steam generated can used in steam turbines which can generate electricity or mechanically drive the refrigeration compressors and/or the main compressors for the separation process of the cracked gas downstream. Export steam can also be used as a feedstock or heating agent in other petrochemical processes in the larger plant. The current invention allows the process to achieve the enhanced energy and emissions savings of an improved design, by being able to continuously supply high-pressure steam with stored intermittent renewable electricity stored as heat, while realizing the benefits of the emission-reduction technologies discussed above (high-emissivity coatings, oxyfuel combustion and/or the use of hydrogen fuel).

Figure 8:
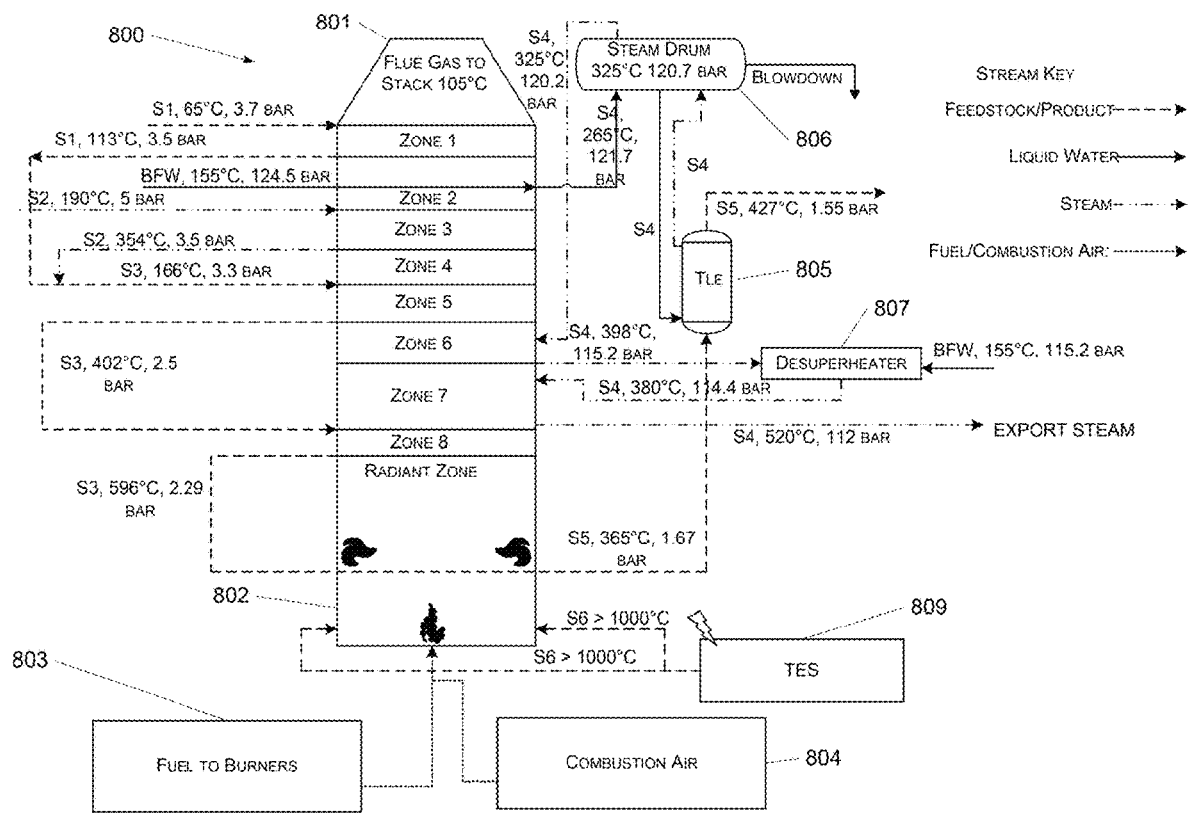

FIG. 8 shows a simplified example system of a thermal energy storage system (TES) 809 replacing heat from an efficiency improvement in the radiant zone. The conventional steam cracker may otherwise be the same as shown in FIG. 7. Less hydrocarbon fuel is burned and an electrically charged thermal storage system continuously supplies hot gas S6 somewhere in the radiant zone or at the bottom of the convection zone at temperatures and flow rates such that the combined flue and hot gas stream has the same temperature and flow rate of a conventional steam cracker with no sustainable innovations adopted. Although not shown, the hot gas heated by TES 809 may be heated to higher temperatures by an auxiliary electric resistive heater after discharge from the thermal storage system and before injection to the steam cracking furnace.

The second way a heat battery or thermal energy storage system can address the issue is by leaving the existing steam cracker furnace the same with a reduced heat duty in the convection section. The consequence is that some streams may not be heated to sufficient temperatures. The streams to be further heated are directed to the TES system where the TES heats the streams to a sufficient temperature. In another implementation, the TES heats streams to a higher temperature than was possible in a conventional system. For example, superheated steam could be generated at a higher pressure or superheated to a higher temperature for advantages in power generation.

Another sustainable innovation in the steam cracking process is using electrically heated catalysis reaction tubes to drive the cracking reaction. Here, a preheated mixture of steam and hydrocarbon feedstock is directed to reactor tubes that are lined with a catalyst. Heat is supplied by running electric current through the tube material generating heat to raise the feedstock mixture to reaction temperature. The reaction is then quenched as before to stop the reaction when the desired product is produced. Since no fuel is burned in the radiant section, there may be a missing demand to supply heat to preheat the feedstock material and/or supply heat for steam generation. The thermal storage system may fill this demand to minimize the effect on the other plant processes that would otherwise depend on the recovered waste heat. As before with the reaction proceeding in the conventional radiant tubes, there is a demand to maximize preheating in order to minimize continuous electrical heating duty in the electric cracker.

Figure 12:
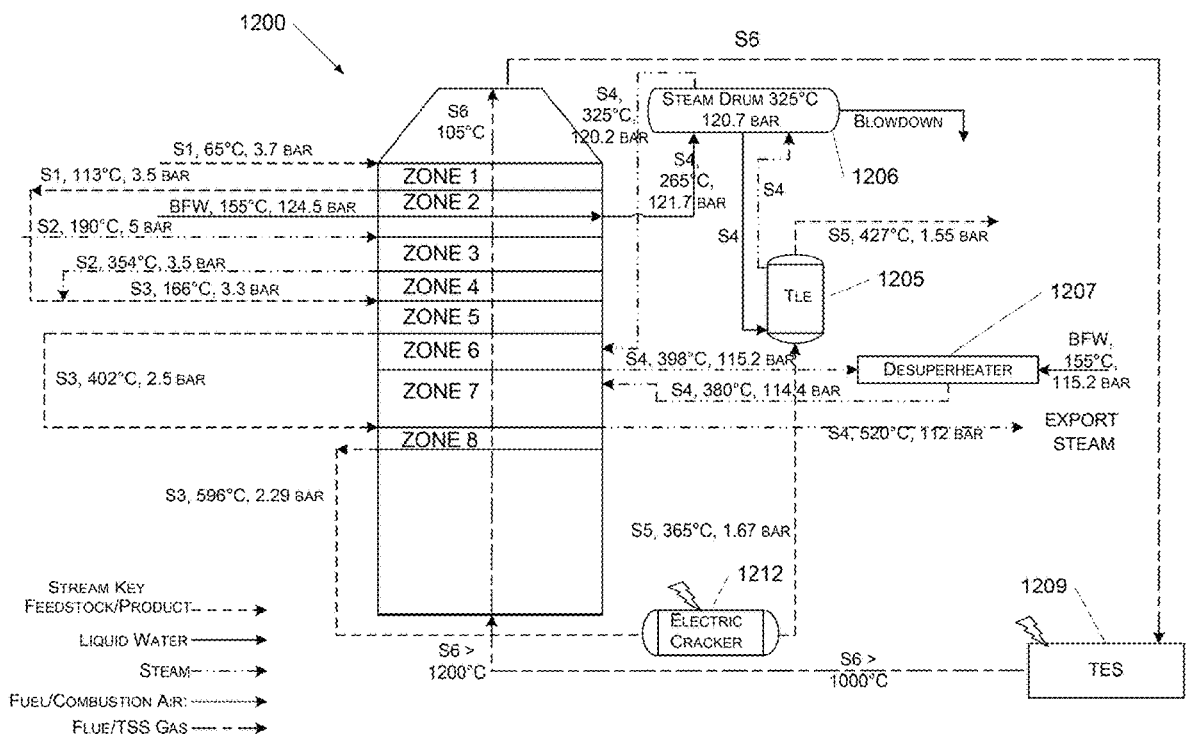
Figure 12A:
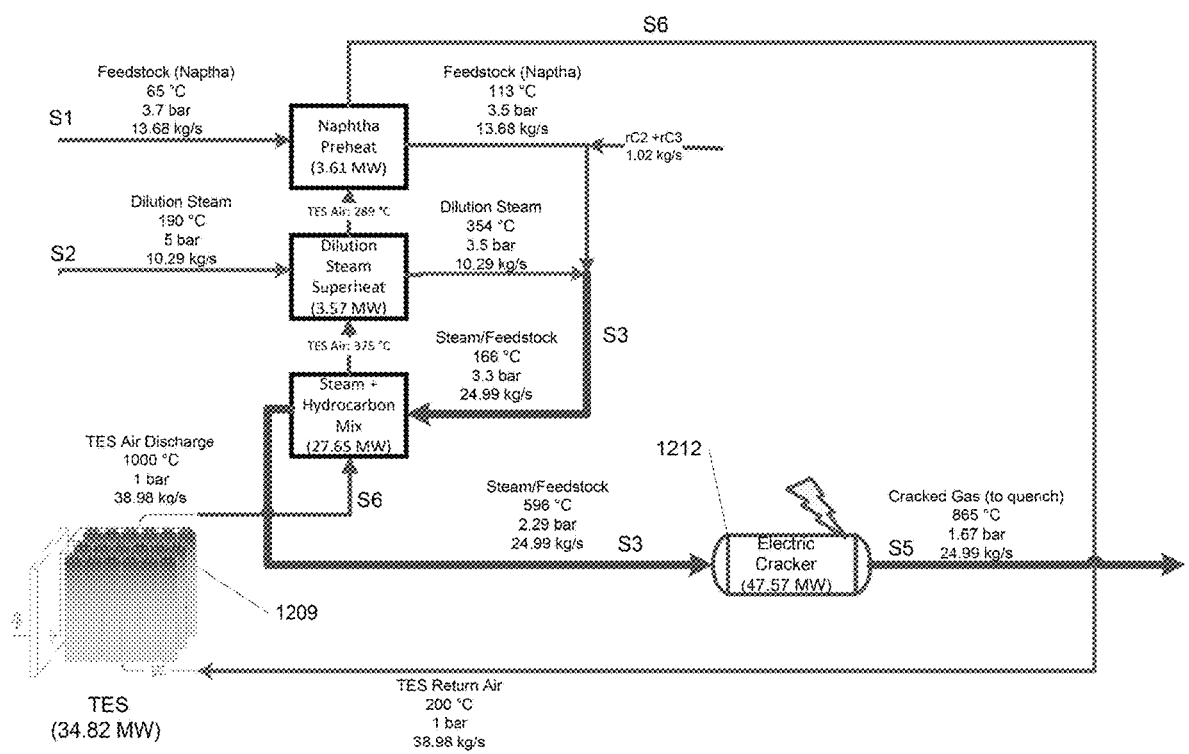
FIG. 12A illustrates a simplified block diagram of the system of FIG. 12 showing the TES replacing all the preheating of a steam cracking system that uses and electric cracker to perform the cracking reaction.
Figure 12B:
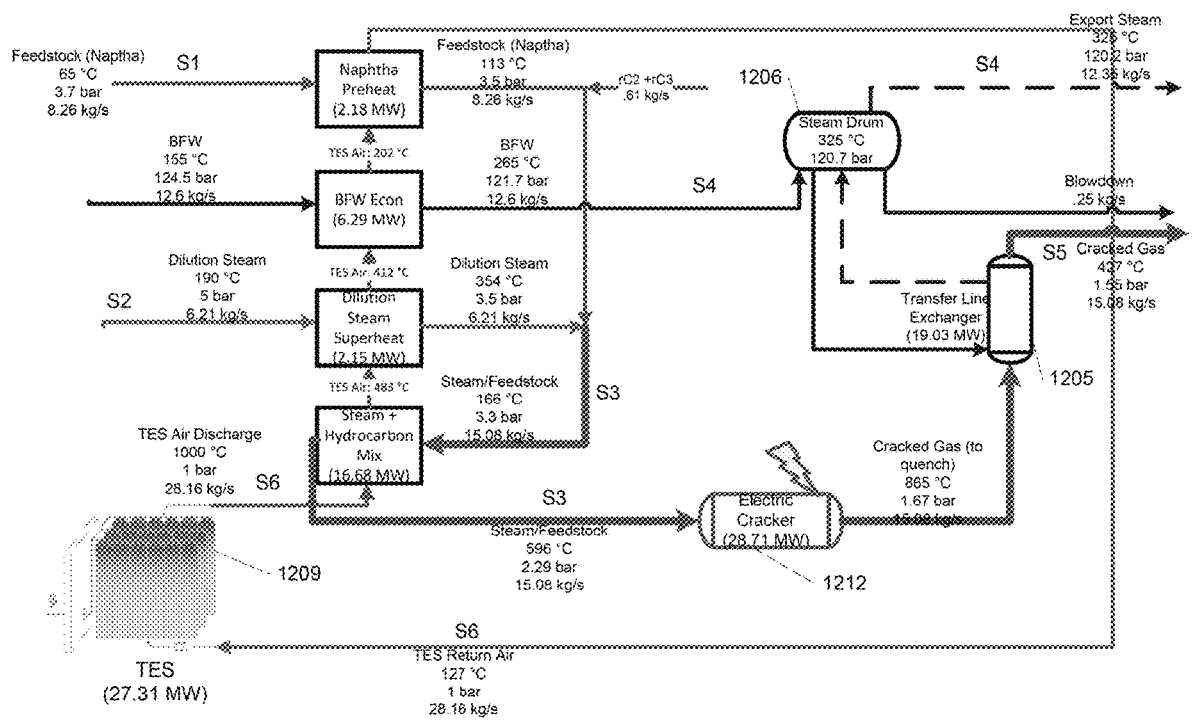
FIG. 12B illustrates a simplified block diagram of the system of FIG. 12 showing the TES replacing all the preheating and a portion of the export steam heating duty of a steam cracking system that uses and electric cracker to perform the cracking reaction.
Figure 12C:
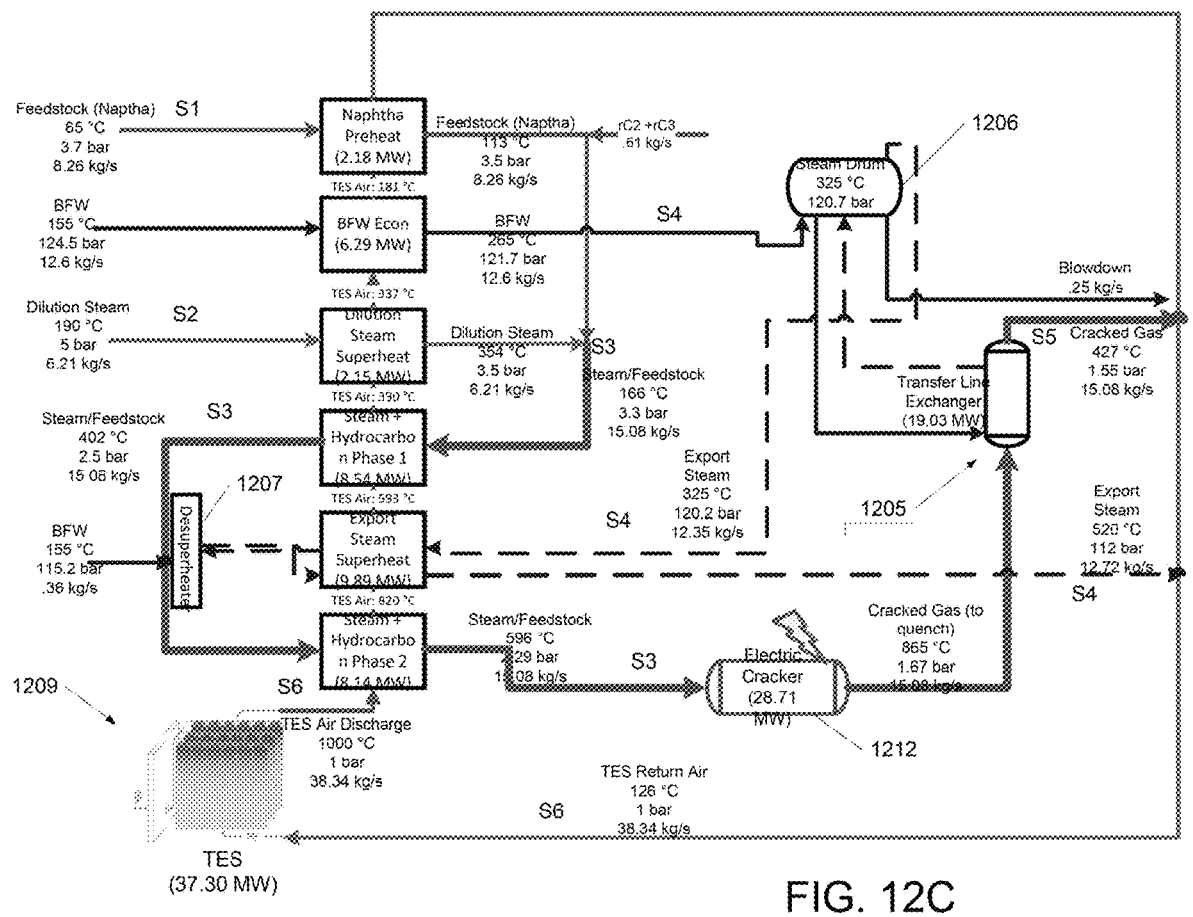
FIG. 12C illustrates a simplified block diagram of the system of FIG. 12.

FIG. 12 shows an abstracted schematic of a heat battery or TES 1209 replacing all the heat duty of a conventional convection zone (zones 1-8). The TES 1209 supplies heat in the form of hot gas S6 such as air to a conventional convection zone. Instead of exiting to the environment, the heat or hot gas from the TES 1209 at the end of the convection zone may be recirculated at a temperature higher than ambient temperature to the TES 1209 to minimize waste heat lost to the environment. An electric steam cracker 1212 fulfills the heat duty of the "radiant zone" in a conventional process where preheated feedstock is subjected to rapid heating to cracking temperature before being promptly cooled or quenched. FIG. 12A shows the simplest process integration where hot gas from the TES 1209 indirectly preheats all feedstock components prior to cracking in an electric cracker reactor. FIG. 12B shows a more complex level of integration as a partial fulfillment of heat recovery steam generation of a conventional process. Conventionally, steam cracking processes have been designed to recover the large amount of heat contained in flue gasses from the high temperature cracking reaction in the "radiant zone." Often times, waste heat is used to generate steam for use in another process or for power generation. In this process integration, high pressure boiler feedwater which is ultimately used to quench the cracked product gas, is heated, in-line with feedstock components, to near saturated liquid conditions with hot gas from TES units. The integrated system provides saturated steam in addition to quenched cracked gas. The process integration of FIG. 12C shows an electrified, drop-in replacement of a conventional steam cracker. The process produces steam of the same quantity and conditions of the reference, conventional process. It takes the high-pressure saturated steam of the prior integration and superheats it in-line with the feedwater economizer and feedstock preheating. The resulting product is high-pressure, superheated steam ready for power generation in a steam turbine. The heat and mass flow rates shown in FIGS. 12A-12C are exemplary only and are not limited to a specific steam cracking system.

Figure 11:
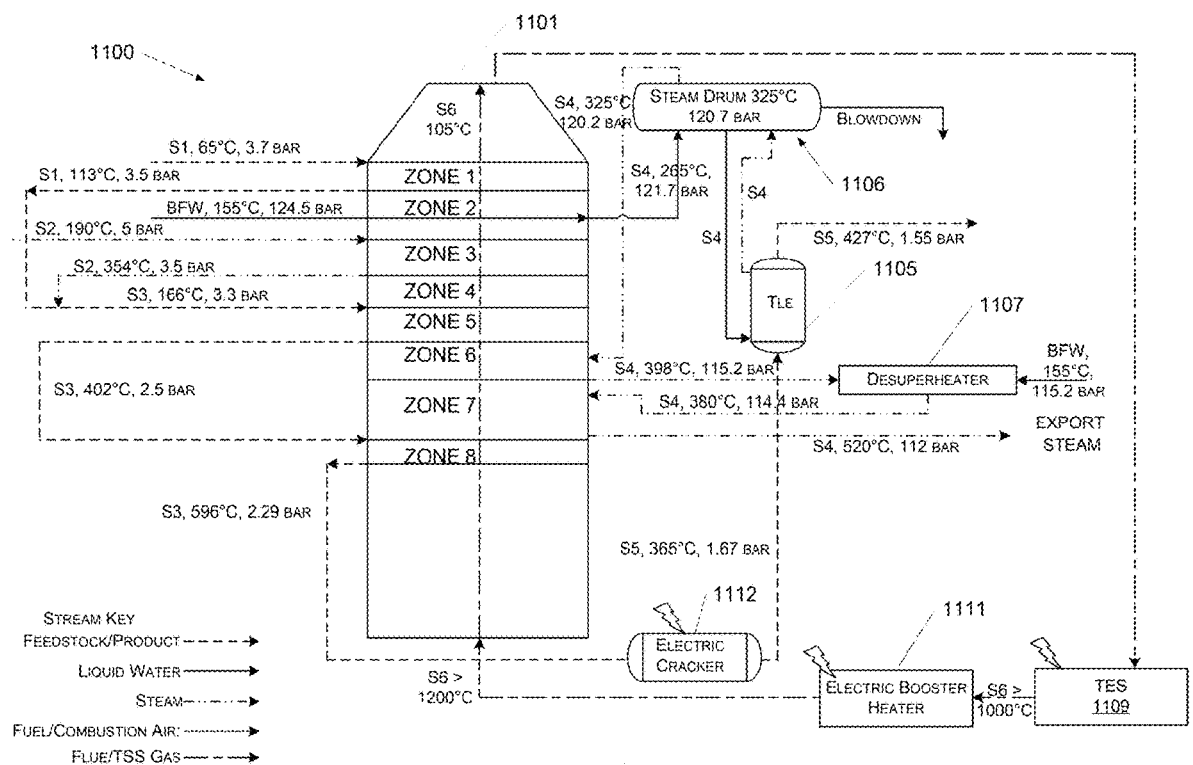

FIG. 11 is the same heat battery integration process as that shown in FIG. 12 except that it includes the addition of an electric booster heater 1111 to produce higher temperature gas than the TES 1109 alone may be able to supply.

Figure 13:
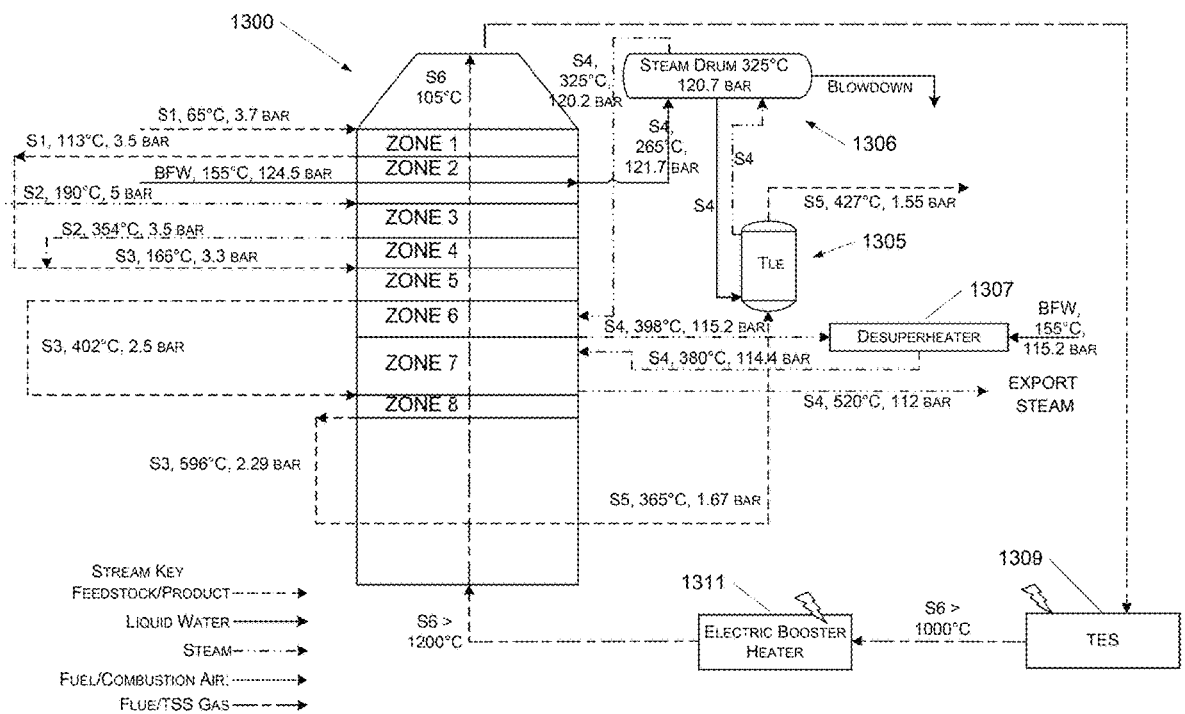
Figure 14:
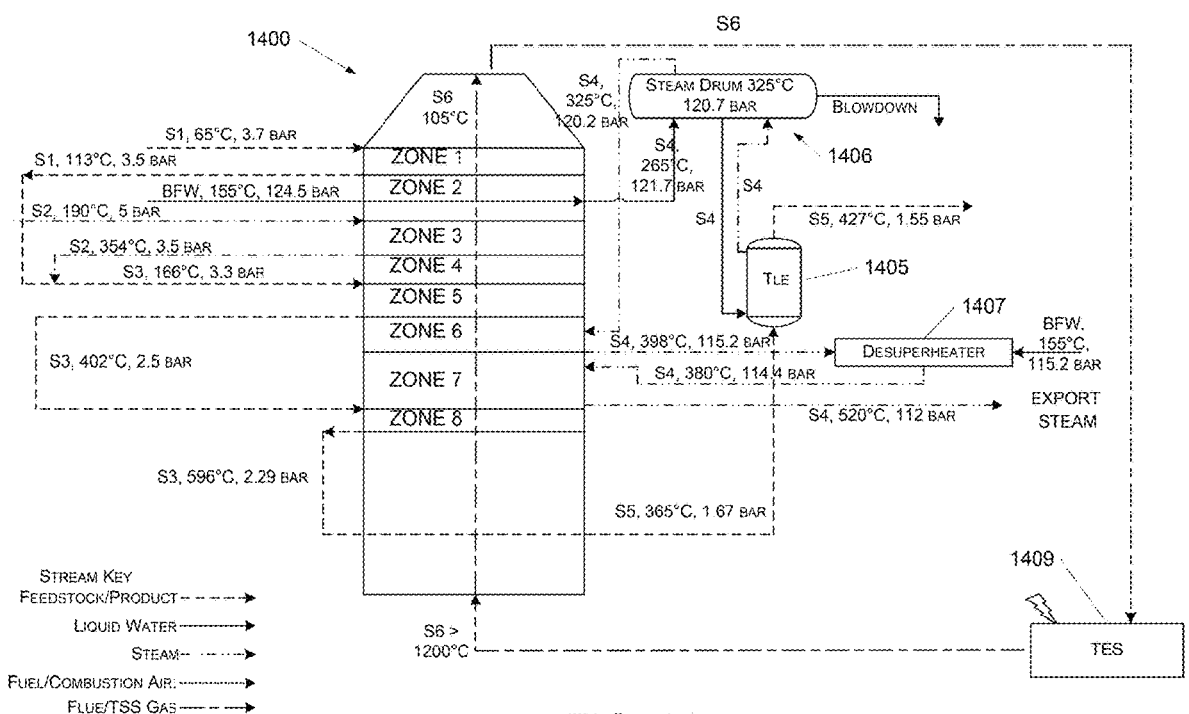

The TES may also be configured to replace all thermal energy in a conventional cracking furnace. Shown in FIG. 14, the TES 1409 heats high temperature fluid S6 at temperatures sufficient for the cracking reaction otherwise occurring in the conventional radiant zone. An optional electric booster (not shown in FIG. 14 but designated by reference numeral 1311 in FIG. 13) may be used to further boost the temperature of the heating fluid to higher temperatures than the thermal energy storage system 1409 can provide. The hot fluid heated by the thermal energy storage system 1409 may follow a similar path of the conventional process where the highest temperature fluid first exchanges heat with the feedstock mixture to drive the cracking reaction before continuing to exchange heat with successively lower temperature thermal loads. The heat transfer mode may be primarily convection as hot fluids directly contact the reaction tubes. If the heating fluid is made up of molecules that can contribute to radiant heat transfer such as water vapor or $CO_2$, radiant heat transfer may be an additional mode of heat transfer. As shown in FIGS. 13 and 14, the heating fluid S6 may be recirculated back to the thermal storage system after being sufficiently cooled in heat exchange. This allows for an increase in thermal efficiency over conventional systems as low temperature heat contained in the cooled hot gas is not vented to the environment and is recirculated to the thermal storage system at a temperature above ambient.

Figure 15:
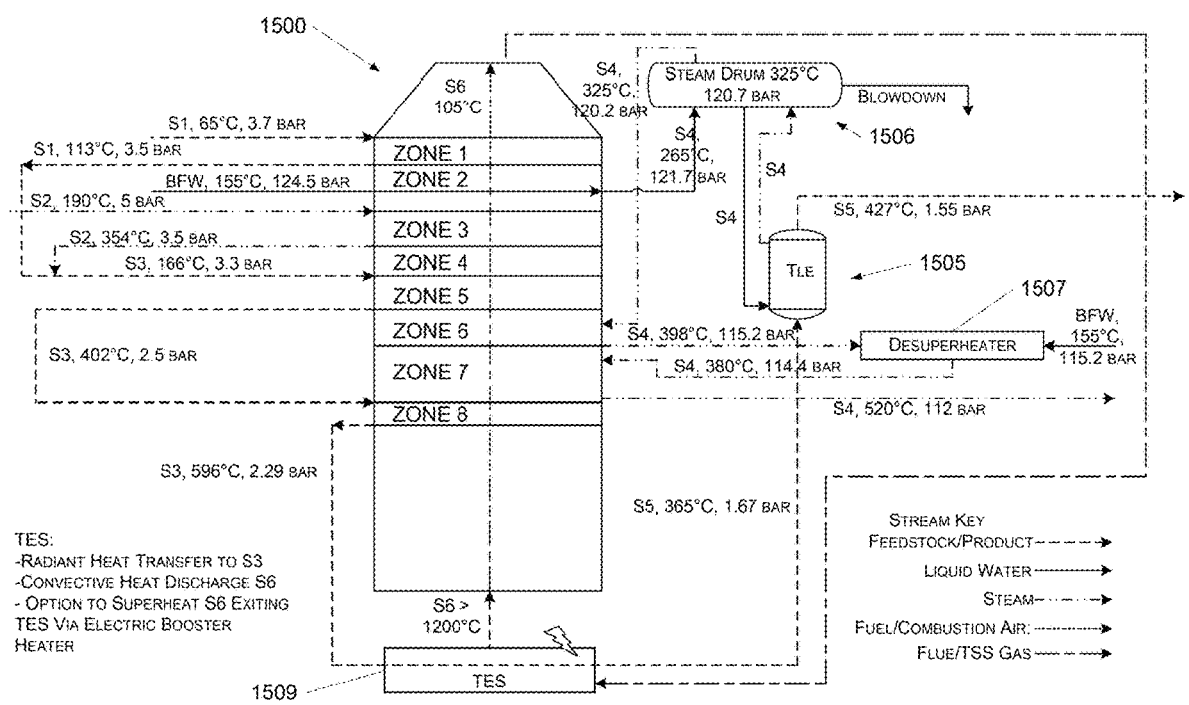

Another variation of a TES 1509 supplying all heat for the steam cracking process is shown in FIG. 15. Here the thermal energy storage system 1509 has extra tubing where the preheated feedstock mixture ready for cracking enters. The thermal energy storage system 1509 rapidly heats the feedstock mixture primarily via radiation between the reaction tubing. The thermal storage medium such as solid metal, carbon or refractory material is maintained at high temperatures by the intermittent charging of the TES. The drastic temperature difference between the temperature of the radiant reaction tubes and the storage medium drives radiative heat exchange. In addition, hot fluid may be circulating through the thermal energy storage system. This may have an effect of keeping the radiative surface of the storage medium at a constant temperature to supply continuous radiative heat transfer. The circulating hot fluid S6 may exit the TES 1509 at some high temperature and flow rate that may mimic the heating capabilities of flue gas in conventional systems. The hot fluid flows through the convection zone transferring heat to all or some of the streams that would be heated in a conventional convection section. The hot fluid may only preheat feedstock and steam for use in the reaction. The hot fluid may also heat boiler feedwater and additional steam for use elsewhere in another plant process or in a thermal power cycle such as a steam turbine. The now cooled fluid stream exits the convection zone (used in an abstract sense here for easy comparison; note that the heat transfer configuration may not be performed in a traditional steam cracking furnace as shown in the diagram, but some other heat exchange configuration) where it may be recirculated back to the TES 1509 for reheating. Although not shown, an electric booster heater may be used to elevate the temperature of the hot fluid to higher temperatures. Additionally, the radiant heat transfer inside the TES 1509 to the reaction tubes may also be boosted by electric booster heaters to supply heat at elevated temperatures or aid in supplying more uniform heat transfer across the reaction vessel.

Figure 15A:
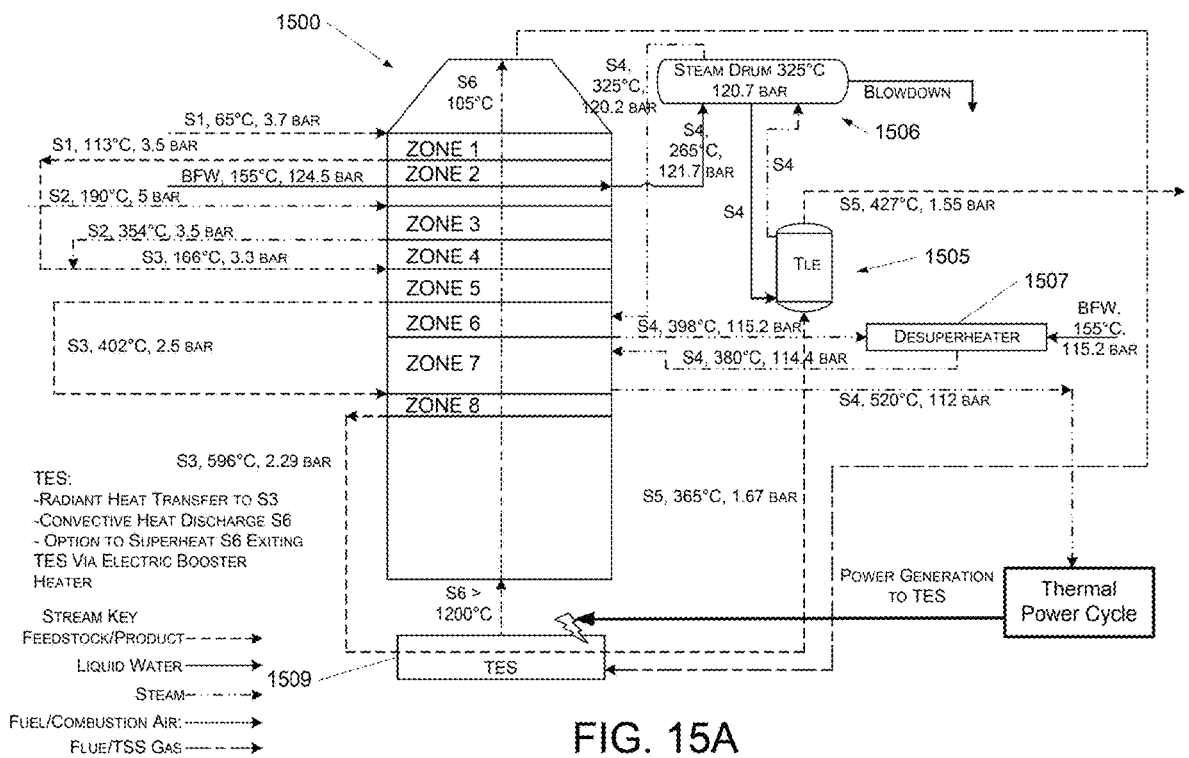
FIG. 15A illustrates the integrated system of FIG. 15 in which export steam is provided to a thermal power cycle to generate electricity that is directed back to the TES.

FIG. 15A shows the system of FIG. 15 in which the export steam is provided to a thermal power cycle for generation of electricity which is used to power the TES and/or may also be exported for some other use.

Figure 16:
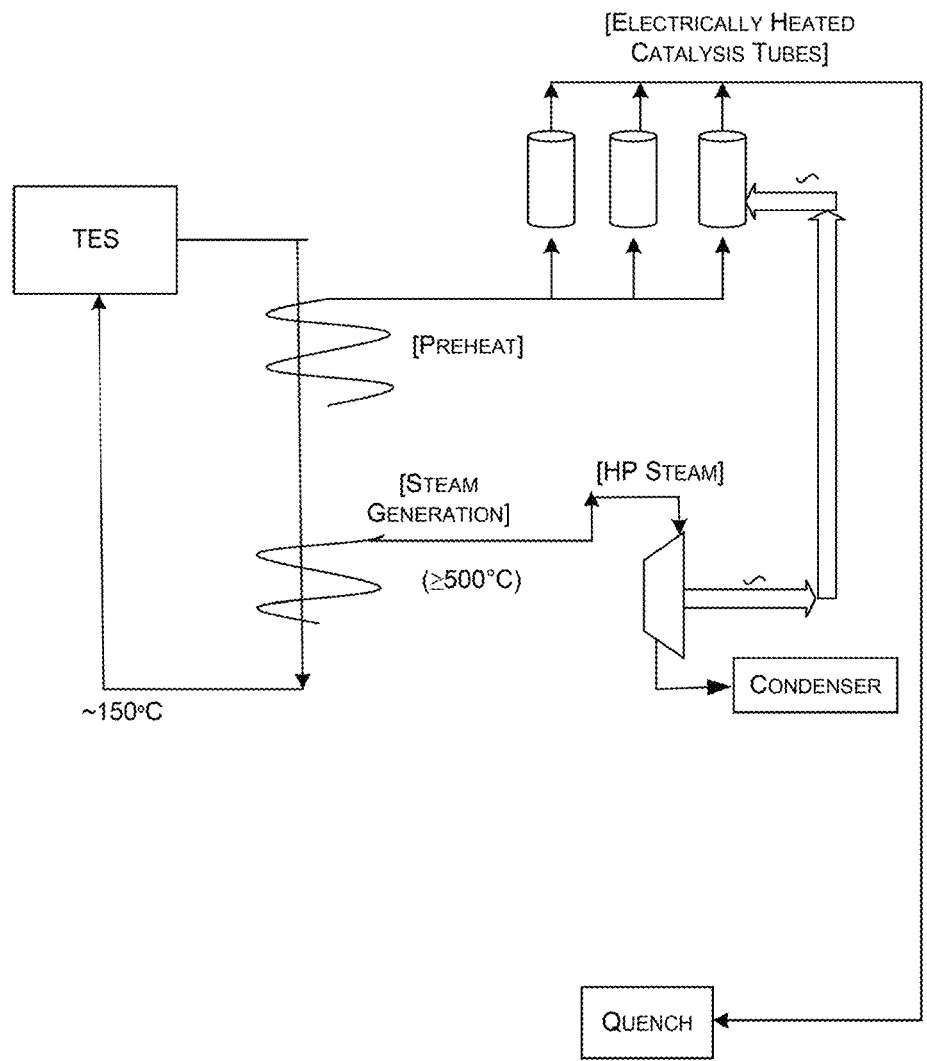
Figure 17:
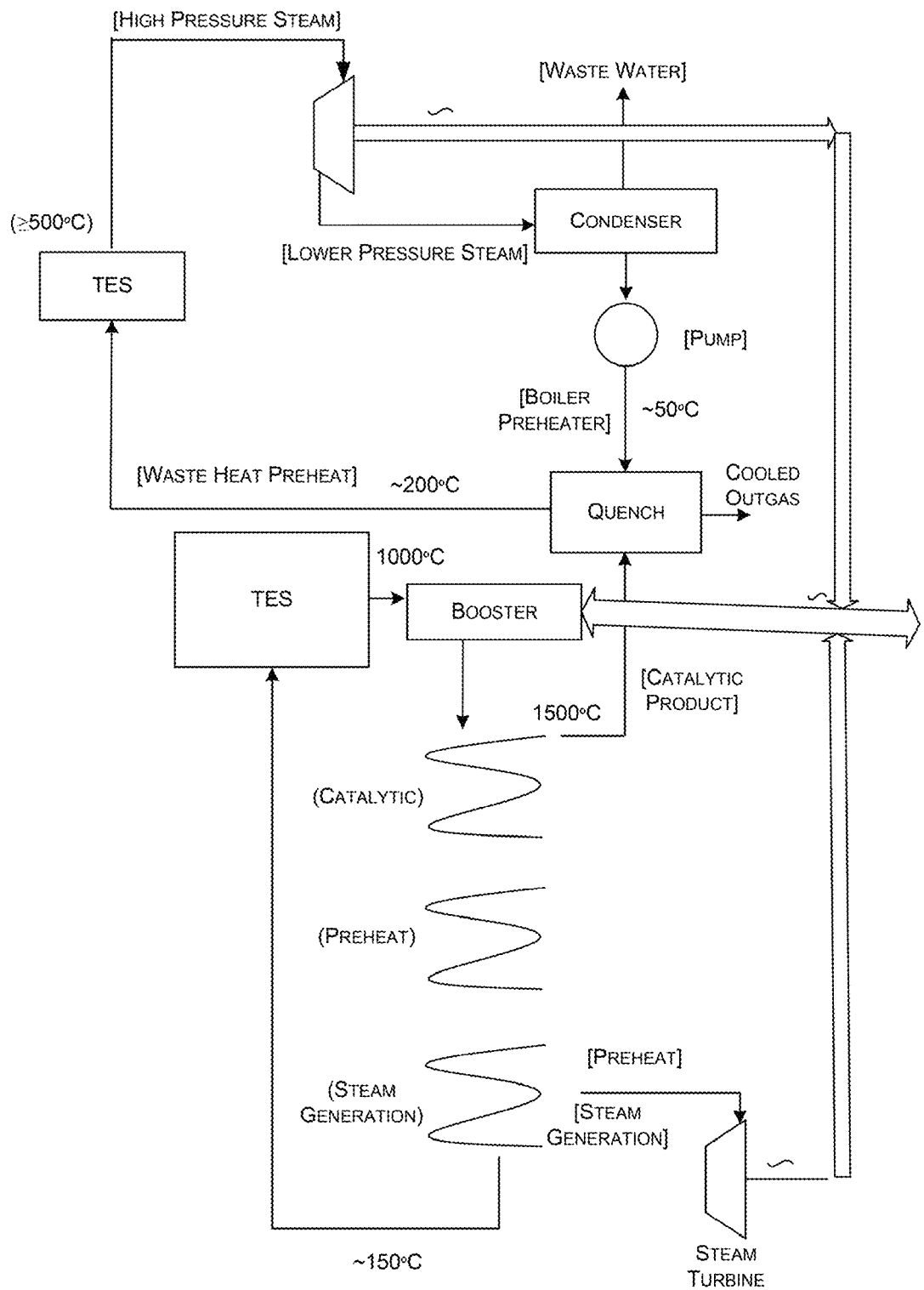

A thermal energy storage system can enable the adoption of new, sustainable technology in a conventional steam cracking process. As mentioned, often part of the concern with adopting a new technology in a steam cracking facility is not how well the technology works, but what consequences can it have for adjacent processes designed around a conventional steam cracking process. As discussed above, the TES can replace all or a portion of the heat otherwise supplied by the burning of fossil fuels. The TES can also integrate with adjacent plant processes in conjunction with its integration in the steam cracking process. FIGS. 16 and 17 show a simplified, yet more macroscopic, example of a TES integration to other plant components (thermal power generation cycles in these figures).

FIG. 16 shows an integrated system comprising a thermal energy storage (TES) system, electric cracker and thermal power cycle in which: the TES system supplies heat for feedstock preheating and steam generation; the electric cracker converts preheated feedstock mixture into cracked gas; and the thermal power cycle generates electricity for the electric cracker. The lines with [Preheat] and [Steam generation] represent some heat exchange structure similar in function to the convection path in FIG. 12. The hot gas from the TES passes through the heat exchangers before returning to the TES as cooled gas labeled in the figure at an example temperature of 150 C. Exiting the upper heat exchanger is preheated feedstock for entry into electrically heated catalysis tubes. Again, this resembles, in function, the process depicted in more detail in FIG. 12. In FIG. 12, superheated export steam (S4 exiting the process in FIG. 12) is generated by hot gases from the TES before exiting the convection zone of the cracking process as superheated steam at a temperature of 520° C. In FIG. 16, an example path of this superheated steam is shown exiting to the right of the lower heat exchanger. The superheated steam is expanded across a steam turbine which generates power. The expanded stream may be condensed or may be non-condensed and used for some other process in the plant. This power may be used to power the electrically catalytic cracking tubes.

FIG. 17 shows a more integrated view of the process depicted in FIG. 13 where the TES supplies hot gas which is further raised in temperature using an electric booster heat in order to supply heat to both the steam cracking reaction and feedstock and export steam streams that are common in conventional cracking processes. Again, the TES supplies hot gas at some elevated temperature to an electric booster heater which raises the gas temperature further. The hot gas from the TES travels downwards (in the Figure) first contacting the reaction tubing which may contain catalytic material where the steam cracking reaction takes place. After the hottest temperature gas contacts the cracking tubes, the hot gas continues through a series of heat exchangers to generate export steam and preheat the feedstock. The thermal power cycle shown in the upper left portion of FIG. 17 depicts a TES system that provides high temperature heat to steam generated in the quench cooling of the cracked gas. All generated export steam can be expanded across a steam turbine which generates electricity which may be used to power the electric booster heater and/or exported to some other use.

To the extent a term used in a claim is not defined below, it should be given the broadest definition persons in the pertinent art have given that term as reflected in printed publications and issued patents at the time of filing. For example, the following terminology may be used interchangeably, as would be understood to those skilled in the art:

A Amperes
AC Alternating current
DC Direct current
DFB Dual Fluidized Bed
EAR Enhanced Oil Recovery
EV Electric vehicle
GT Gas turbine
HRSG Heat recovery steam generator
kV kilovolt
kW kilowatt
MED Multi-effect desalination
MPPT Maximum power point tracking
MSF Multi-stage flash
MW megawatt
OTSG Once-through steam generator
PEM Proton-exchange membrane
PV Photovoltaic
RSOC Reversible solid oxide cell
SOEC Solid oxide electrolyzer cell
SOFC Solid oxide fuel cell
ST Steam turbine
TES Thermal Energy Storage
TSU Thermal Storage Unit Additionally, the term "heater" is used to refer to a conductive element that generates heat. For example, the term "heater" as used in the present example implementations may include, but is not limited to, a wire, a ribbon, a tape, or other structure that can conduct electricity in a manner that generates heat. The composition of the heater may be metallic (coated or uncoated), ceramic or other composition that can generate heat.

While foregoing example implementations may refer to "air", including $CO_2$, the inventive concept is not limited to this composition, and other fluid streams may be substituted therefor for additional industrial applications. For example but by way of limitation, enhanced oil recovery, sterilization related to healthcare or food and beverages, drying, chemical production, desalination and hydrothermal processing (e.g. Bayer process.) The Bayer process includes a calcination step. The composition of fluid streams may be selected to improve product yields or efficiency, or to control the exhaust stream.

In any of the thermal storage units, the working fluid composition may be changed at times for a number of purposes, including maintenance or re-conditioning of materials. Multiple units may be used in synergy to improve charging or discharging characteristics, sizing or ease of installation, integration or maintenance. As would be understood by those skilled in the art, the thermal storage units disclosed herein may be substituted with other thermal storage units having the necessary properties and functions; results may vary, depending on the manner and scale of combination of the thermal storage units.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided with respect to certain example implementations herein is intended merely to better illuminate the example implementation and does not pose a limitation on the scope of the example implementation otherwise claimed. No language in the specification should be construed as indicating any non-claimed element essential to the practice of the example implementation.

Groupings of alternative elements or example implementations of the example implementation disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all groups used in the appended claims.

In the specification, reference may be made to the spatial relationships between various components and to the spatial orientation of various aspects of components as the devices are depicted in the attached drawings. However, as will be recognized by those skilled in the art after a complete reading of the present application, the devices, members, devices, etc. described herein may be positioned in any desired orientation. Thus, the use of terms such as "above," "below," "upper," "lower," "first", "second" or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

In interpreting the specification, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refer to at least one of something selected from the group consisting of A, B, C . . . and N, the text should be interpreted as requiring only one element from the group, not A plus N, or B plus N, etc.

While the foregoing describes various example implementations of the example implementation, other and further example implementations of the example implementation may be devised without departing from the basic scope thereof. The scope of the example implementation is determined by the claims that follow. The example implementation is not limited to the described example implementations, versions or examples, which are included to enable a person having ordinary skill in the art to make and use the example implementation when combined with information and knowledge available to the person having ordinary skill in the art.

What is claimed is:

1. A steam cracking system for converting a hydrocarbon feedstock into cracked gas, including:
   a thermal energy storage (TES) system configured to store thermal energy derived from electricity generated by an energy source and converting the electricity into heat for storage in a thermal energy storage medium; and
   a radiant section including radiant tubing configured to direct a preheated hydrocarbon mixture to the TES system and to expose the tubing i- to thermal radiation from the thermal energy storage medium to effectuate a cracking reaction.

2. The steam cracking system of claim 1, further including a preheating section configured to preheat a hydrocarbon feedstock and/or dilution steam, to produce a preheated mixture of the hydrocarbon feedstock and the dilution steam.

3. The steam cracking system of claim 2, further including a heat exchange system configured to provide thermal energy from the TES to the preheating section.

4. The steam cracking system of claim 1, further including a cooling section including at least one quench exchanger configured to quench the cracked gas.

5. The steam cracking system of claim 4, further including an export steam generation subsystem, wherein the steam cracking system is configured to provide heat to the export steam generation subsystem from both the cooling section and from the TES system.

6. The steam cracking system of claim 5, further including a thermal power cycle subsystem configured to receive steam from the export steam generation subsystem and to generate electricity to be provided to the TES system.

7. The steam cracking system of claim 1, further including an export steam generation subsystem, wherein the steam cracking system is configured to provide heat to the export steam generation subsystem from the TES system.

8. The steam cracking system of claim 7, further including a thermal power cycle subsystem configured to receive steam from the export steam generation subsystem and to generate electricity to be provided to the TES system.

9. A steam cracking system according to any of claims 4, 5, 6, 7 and 8, further including:
   a preheating section configured to preheat a hydrocarbon feedstock and/or dilution steam, to produce a preheated mixture of the hydrocarbon feedstock and the dilution steam; and
   a heat exchange system configured to provide thermal energy from the TES to the preheating section.

10. The steam cracking system of claim 1, further including a fluid movement system configured to circulate a fluid through the thermal energy storage system.

11. The steam cracking system of claim 9, further including:
    an export steam generation subsystem, wherein the steam cracking system is configured to provide heat to the export steam generation subsystem from the TES system; and
    a fluid movement system configured to circulate a fluid through the thermal energy storage system and provide the circulated fluid to the export steam generation subsystem and/or preheating section.

12. The steam cracking system of claim 1, wherein the energy source is a variable renewable energy source having intermittent availability.

13. The steam cracking system of claim 10, which includes an electric booster heater configured to increase the temperature of the fluid.

14. The steam cracking system of claim 2, wherein heated fluid exhausted from the preheating section is directed back as an input to the TES system for reheating.

15. The steam cracking system of claim 14, wherein the heated fluid is cooled to remove water vapor via condensation prior to input to the TES system.

16. The steam cracking system of claim 11, which further includes a first heat exchanger configured to preheat the feedstock using the heated fluid provided by the fluid movement system.

17. The steam cracking system of claim 11, which further includes additional heat exchangers configured to produce superheated dilution steam and/or other material streams heated in a conventional steam-cracking process using the heated fluid provided by the fluid movement system.

18. The steam cracking system of claim 1, wherein the storage medium comprises refractory material.

19. A steam cracking method for converting a hydrocarbon feedstock into cracked gas, including the steps of:
    converting electricity from an energy source into thermal energy;
    storing the thermal energy in a thermal storage medium of a thermal energy storage (TES) system;

directing a preheated hydrocarbon mixture to a radiant section including tubing exposed to the TES system; and radiating thermal energy to the tubing from the thermal energy storage medium of the TES system to effectuate a cracking reaction of the hydrocarbon mixture into a cracked gas.

20. The steam cracking method of claim 19, which includes heating in a preheating section a hydrocarbon feedstock and/or dilution steam, to produce the preheated hydrocarbon mixture prior to reaching the radiant section.

21. The steam cracking method of claim 20, which further includes directing thermal energy from the TES system via a heat exchange system to the preheating section.

22. The steam cracking method of claim 19, which further includes quenching the cracked gas in a cooling section, wherein the cooling section includes at least one quench exchanger.

23. The steam cracking method of claim 22, which further includes providing heat from the TES system and heat from the cooling section to an export steam generation subsystem.

24. The steam cracking method of claim 23, which further includes directing steam from the export steam generation subsystem to a thermal power cycle subsystem configured to generate electricity to be provided to the TES system.

25. The steam cracking method of claim 19, which further includes providing heat from the TES system to an export steam generation subsystem.

26. The steam cracking method of claim 25, which further includes directing steam from the export steam generation subsystem to a thermal power cycle subsystem configured to generate electricity to be provided to the TES system.

27. A steam cracking method according to any of claims 22, 23, 24, 25 and 26, which further includes:

preheating a hydrocarbon feedstock and/or dilution steam in a preheating section, to produce the preheated hydrocarbon mixture; and directing thermal energy from the TES system via a heat exchange system to the preheating section.

28. The steam cracking method of claim 19, which further includes circulating a fluid via a fluid movement system through the TES system.

29. The steam cracking method of claim 27, further includes:

providing heat from the TES system to an export steam generation subsystem; and circulating a fluid via a fluid movement system through the TES system and providing the circulated fluid to the export steam generation subsystem and/or a convection section.

30. The steam cracking method of claim 19, wherein the energy source is a variable renewable energy source having intermittent availability.

31. The steam cracking method of claim 28, which includes increasing the temperature of the heated fluid via an electric booster heater.

32. The steam cracking method of claim 19, which includes directing heated fluid exhausted from a convection section as an input to the TES system for reheating.

33. The steam cracking method of claim 32, wherein the heated fluid is cooled to remove water vapor via condensation prior to input to the TES system.

34. The steam cracking method of claim 29, which further includes preheating the feedstock via a first heat exchanger using the heated fluid provided by the fluid movement system.

35. The steam cracking method of claim 34, which further includes additional heat exchangers configured to produce superheated dilution steam and/or other material streams heated in a conventional steam-cracking process using the heated fluid provided by the fluid movement system.

36. The steam cracking method of claim 19, wherein the storage medium comprises refractory material.

* * * * *